United States Patent
Stoye et al.

(10) Patent No.: US 12,555,177 B2
(45) Date of Patent: Feb. 17, 2026

(54) METHOD AND SYSTEMS FOR HANDLING PROCESSING OF GRAPHICS FRAGMENTS

(71) Applicant: Arm Limited, Cambridge (GB)

(72) Inventors: William Robert Stoye, Cambridge (GB); Olof Henrik Uhrenholt, Lomma (SE); Wing-Tsi Henry Wong, Lund (SE); Edward Hardy, Cambridge (GB); Toni Viki Brkic, Staffanstorp (SE); Ole Magnus Ruud, Oslo (NO)

(73) Assignee: Arm Limited, Cambridge (GB)

( * ) Notice: Subject to any disclaimer, the term of this patent is extended or adjusted under 35 U.S.C. 154(b) by 187 days.

(21) Appl. No.: 18/357,461

(22) Filed: Jul. 24, 2023

(65) Prior Publication Data
US 2024/0037692 A1   Feb. 1, 2024

(30) Foreign Application Priority Data
Jul. 29, 2022   (GB) .................... 2211099

(51) Int. Cl.
*G06T 1/20*   (2006.01)
*G06T 11/00*  (2006.01)

(52) U.S. Cl.
CPC .............. *G06T 1/20* (2013.01); *G06T 11/001* (2013.01)

(58) Field of Classification Search
CPC ......... G06T 1/20; G06T 11/001; G06T 11/40; G06T 11/00; G06T 15/00
USPC ......... 345/522, 545, 553, 540, 613; 382/284
See application file for complete search history.

(56) References Cited

U.S. PATENT DOCUMENTS

| | | | | |
|---|---|---|---|---|
| 6,650,791 B1* | 11/2003 | Cullen | ............... | G06T 3/4038 |
| | | | | 382/284 |
| 10,204,391 B2* | 2/2019 | Heggelund | ............ | G06T 1/20 |
| 11,532,115 B2 | 12/2022 | Yang | | |
| 11,551,401 B2 | 1/2023 | Yang | | |
| 11,699,258 B2 | 7/2023 | Yang | | |
| 2002/0171651 A1* | 11/2002 | Kurihara | ............. | G06T 11/40 |
| | | | | 345/540 |
| 2010/0177105 A1* | 7/2010 | Nystad | ............... | G06T 15/005 |
| | | | | 345/553 |
| 2014/0267377 A1* | 9/2014 | Halstvedt | ............. | G06T 11/40 |
| | | | | 345/613 |

(Continued)

OTHER PUBLICATIONS

Combined Search and Examination Report under Sections 17 and 18(3), dated Feb. 1, 2023, GB Patent Application No. 2211099.3.

(Continued)

*Primary Examiner* — Prabodh M Dharia
(74) *Attorney, Agent, or Firm* — Pearl Cohen Zedek Latzer Baratz LLP

(57) ABSTRACT

When performing tile-based rendering in a graphics processing system, lists indicative of fragments to be processed are maintained for respective sub-regions of tiles to be rendered, with each list entry including, inter alia, at least an indication of the coverage within the tile sub-region of the group of fragments that the list entry represents, and an indication of whether the group of fragments that the list entry represents is eligible to undergo particular processing operations. The coverage information and eligibility information for the list entries is then used to control the processing of fragments for sub-regions of a tile, in such a way as to ensure that processing order dependencies are enforced and met.

17 Claims, 20 Drawing Sheets

(56) References Cited

U.S. PATENT DOCUMENTS

| | | | |
|---|---|---|---|
| 2014/0354664 A1* | 12/2014 | Brown | G06F 3/1415 |
| | | | 345/545 |
| 2015/0161814 A1 | 6/2015 | Engh-Halstvedt et al. | |
| 2017/0221177 A1 | 8/2017 | Worchester et al. | |
| 2017/0316601 A1 | 11/2017 | Kakarlapudi et al. | |
| 2017/0337656 A1 | 11/2017 | Vembu et al. | |
| 2018/0137677 A1* | 5/2018 | Jeong | G06T 15/005 |
| 2018/0144437 A1* | 5/2018 | Kakarlapudi | G06T 15/005 |
| 2019/0057536 A1* | 2/2019 | Fenney | G06T 3/18 |
| 2020/0202481 A1 | 6/2020 | Brigg et al. | |
| 2020/0402297 A1* | 12/2020 | Brigg | G06T 15/20 |
| 2021/0248806 A1* | 8/2021 | Yang | G06T 1/20 |
| 2021/0256746 A1* | 8/2021 | Jesus | G06T 15/04 |
| 2021/0279936 A1* | 9/2021 | Yang | G06T 11/20 |
| 2022/0237730 A1 | 7/2022 | Brkic | |

OTHER PUBLICATIONS

Combined Search and Examination Report under Sections 17 and 18(3), dated Feb. 1, 2023, GB Patent Application No. 2211098.5.
Non-final Office Action dated Jun. 18, 2025, U.S. Appl. No. 18/357,481, filed Jul. 24, 2023.
Response to Office Action dated Sep. 18, 2025, U.S. Appl. No. 18/357,481, filed Jul. 24, 2023.
Notice of Allowance dated Nov. 6, 2025, U.S. Appl. No. 18/357,481, filed Jul. 24, 2023.

* cited by examiner

Entry Table

| | |
|---|---|
| 170 | QuadID |
| 171 | Next |
| 172 | Coverage |
| 173 | Col |
| 174 | ZS |
| 175 | ROSID |
| 176 | TileID |
| 177 | Col Dep |
| 178 | ZS Dep |
| 179 | ROS Dep |
| 1710 | Retire |

FIG. 17

| Position | (Head) | Tail | TileID | ROSID | ROSIDchange | Active |
|---|---|---|---|---|---|---|
| 180 | 181 | 182 | 183 | 184 | 185 | 186 |
| | | | | | | |
| | | | | | | |
| | | | | | | |
| | | | | | | |

FIG. 18

METHOD AND SYSTEMS FOR HANDLING PROCESSING OF GRAPHICS FRAGMENTS

CROSS-REFERENCE TO RELATED APPLICATION

This application is related to co-pending U.S. patent application Ser. No. 18/357,461, entitled, "GRAPHICS PROCESSING," filed Jul. 24, 2023 and published as U.S. Publication No. 2024/0037853-A1 on Feb. 1, 2024, by Stoye et al., incorporated by reference herein in its entirety.

BACKGROUND

The technology described herein relates to performing graphics processing, and particularly to managing dependencies of fragment-related processing operations when generating a render output.

Graphics processing is normally carried out by first splitting a scene (e.g. a 3D model) to be displayed into a number of similar basic components or "primitives", which primitives are then subjected to the desired graphics processing operations. The graphics "primitives" are usually in the form of simple polygons, such as triangles.

Once primitives have been generated and defined, they may be further processed in order to generate the desired graphics processing output (render output), such as a frame for display.

This usually involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively.

When performing rasterisation when generating a render output, primitives are rasterised to generate graphics fragments for processing based on the coverage of the primitives.

The rasterisation process is typically carried out by testing sets of one, or of more than one, sampling position against a primitive being rasterised, and then generating for each set of sampling positions found to include a sampling position that is inside (covered by) the primitive in question (being tested), a fragment on which the graphics processing operations (such as rendering) are carried out. Covered sampling positions are thus, in effect, processed as fragments that will be used to render the primitive at the sampling positions in question. The "fragments" are the graphical entities that pass through the rendering process (the rendering pipeline). Each fragment that is generated and processed may, e.g., represent a single sampling position or a set of plural sampling positions, depending upon how the graphics processor is configured.

(A "fragment" is therefore effectively (has associated with it) a set of primitive data as interpolated to a given output space sample position or positions of a primitive. It may also include per-primitive and other state data that is required to shade the primitive at the sample position(s) (fragment position) in question. Each graphics fragment may typically be the same size and location as a "pixel" of the (displayed) output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final sampling position output may depend upon plural or all fragments at that sampling position.)

The graphics fragments generated by the rasteriser are then rendered according to various fragment processing operations (e.g. such as fragment shading operations) so as to generate data for sampling positions (e.g. pixels) of the render output.

The fragment processing operations to be performed for fragments may include, for example, depth and colour processing (shading) operations to determine depth and colour values for sampling position(s) to which the fragments apply. These operations may require accessing, reading from and writing to, a depth (ZS) buffer and colour buffer for sampling position(s) to which the fragments apply.

It is normally desirable to process different fragments concurrently (as far as possible), e.g. for throughput reasons. However, certain processing operations (such as depth and colour updates) are normally required (e.g. by the graphics API) to be done in a strict primitive order. This then has the effect that fragments from different primitives, e.g. that relate to the same sampling positions, may be required to be processed in a particular order. As a result, fragment processing operation ordering dependencies may arise between different fragments, e.g. from different primitives but for the same sampling position(s). For example, it may be necessary to ensure that fragments update the colour and/or depth buffers in a particular fragment order.

There is accordingly a need to manage and enforce such ordering dependencies for fragment processing, e.g. to ensure that fragments from different primitives access the depth and/or colour buffers in the desired (and correct) order.

Further complications can arise with regards to managing and enforcing ordering dependencies of fragment processing operations when so-called variable rate shading (VRS) is being used, as in that case different fragments of a render output being generated may represent sets of different numbers of sampling positions (such that the render output "footprint" of fragments for a given render output can vary).

"Variable Rate Shading" (VRS) (e.g. as defined in the DirectX and Vulkan specifications) is a technique that allows the area of a render output, e.g. frame, that a single colour is sampled (rendered) for, i.e. the "shading rate", to vary within the render output. Thus, in Variable Rate Shading (VRS), different shading rates can be used to render a render output such that, for example, a single sampled (rendered) colour may be used for a single output pixel in some parts of the output, whereas elsewhere in the output, a single sampled (rendered) colour may be used for each output pixel in a block of plural output pixels (thereby reducing the processing effort for those pixels). This then has the effect that the render output area a given fragment (rendering a single sampled colour value) is being used to render can differ for different fragments within the same render output (depending upon the shading rate being used).

Using VRS can accordingly increase the difficultly of managing and enforcing fragment processing operation ordering dependencies.

The Applicant accordingly believes that there remains scope for improvements to managing and enforcing ordering dependencies of fragment processing operations when generating a render output.

BRIEF DESCRIPTION OF THE DRAWINGS

A number of embodiments of the technology described herein will now be described by way of example only and with reference to the accompanying drawings, in which:

FIG. 17 shows an exemplary tile sub region fragment list entry in an embodiment of the technology described herein;

FIG. 18 shows an exemplary record of tile sub region fragment lists in an embodiment of the technology described herein;

Like reference numerals are used for like components where appropriate in the drawings.

DETAILED DESCRIPTION

Figure 1:
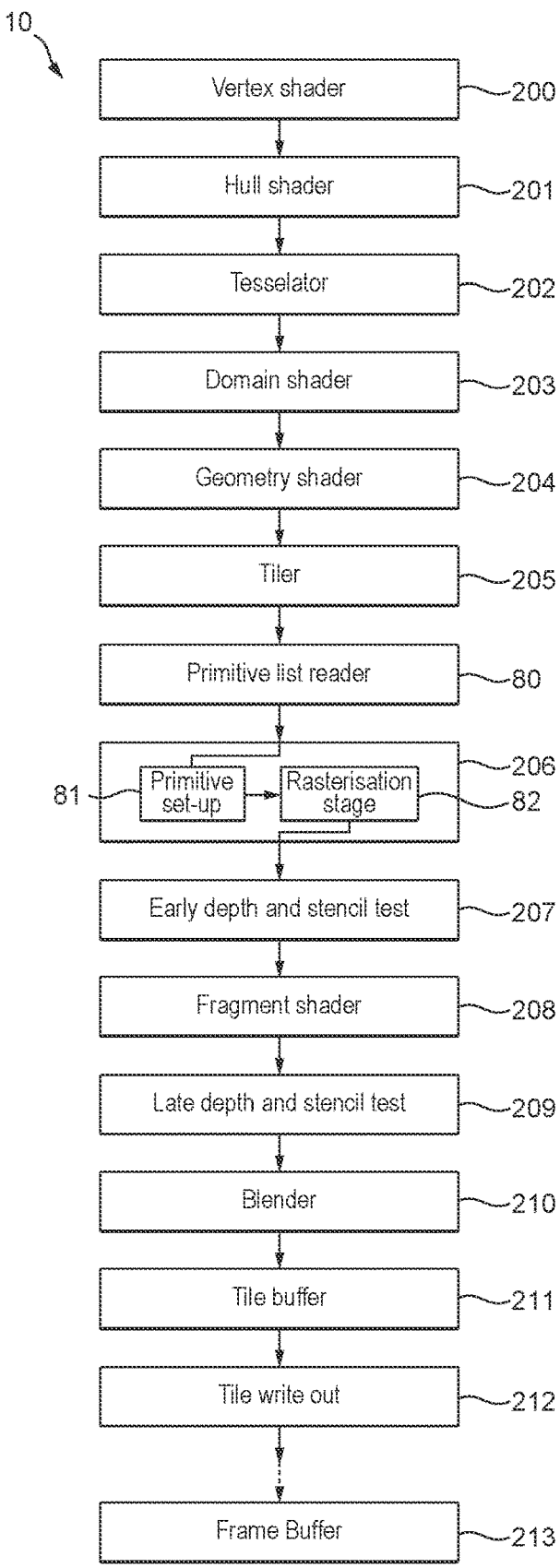
FIG. 1 illustrates schematically an exemplary graphics processing pipeline.

In one embodiment, the technology described herein comprises a method of operating a graphics processor when rendering an output using tile based rendering, in which a plurality of tiles of a render output being generated are rendered separately, and the rendered tiles are combined to form the render output, the method comprising:

for a tile of a render output being generated:
maintaining for each of plural sub-regions of the tile, each sub-region of the tile relating to plural sampling positions of the tile being generated, a list indicative of fragments that are to be processed for the sub-region of the tile for generating the render output, each entry in the list representing a group of one or more fragments;
wherein each entry in the list for a sub-region has associated with it:
information indicating which part of the sub-region the one or more fragments that the entry represents apply to; and
information indicating whether one or more processing operations are eligible to be performed for the one or more fragments that the entry represents;
the method further comprising:
controlling the processing of fragments to be processed for a sub-region of the tile based on the information in the list indicative of fragments that are to be processed for the sub-region of the tile indicating which part of the sub-region fragments that entries in the list represent apply to and the information indicating whether one or more processing operations are eligible to be performed for fragments that entries in the list represent.

In another embodiment, the technology described herein comprises a graphics processor configured to perform tile-based rendering, in which a plurality of tiles of a render output being generated are rendered separately, and the rendered tiles are combined to form the render output, the graphics processor comprising:

a fragment dependency list managing circuit configured to:
maintain for each of plural sub-regions of a tile of a render output being generated, each sub-region of the tile relating to plural sampling positions of the tile being generated, a list indicative of fragments that are to be processed for the sub-region of the tile for generating the render output, each entry in the list representing a group of one or more fragments;
wherein each entry in the list for a sub-region has associated with it:
information indicating which part of the sub-region the one or more fragments that the entry represents apply to; and
information indicating whether one or more processing operations are eligible to be performed for the one or more fragments that the entry represents;

the graphics processor further comprising:
a control circuit configured to control the processing of fragments to be processed for a sub-region of a tile;
wherein the fragment dependency list managing circuit and the control circuit are configured to control the processing of fragments to be processed for a sub-region of a tile based on the information in a list indicative of fragments that are to be processed for the sub-region of the tile indicating which part of the sub-region fragments that entries in the list represent apply to and the information indicating whether one or more processing operations are eligible to be performed for fragments that entries in the list represent.

The technology described herein relates to the managing and enforcing of dependencies of fragment processing operations in tile-based graphics processing. The fragment processing operations may relate to, e.g. fragment shading, such as determining and updating a colour value and/or a depth value for a sampling position or positions.

In the technology described herein, each tile for a render output is subdivided into plural sub-regions (sub-areas) (for the purposes of fragment dependency tracking), and a list indicative of fragments to be processed is maintained for each sub-region.

As will be discussed further below, the Applicant has recognised in this regard that a (single) list provided for a sub-region of a tile can provide a relatively area-efficient structure (in terms of e.g. memory requirements) for tracking and managing and enforcing fragment processing dependencies.

As noted above, dependency issues may arise when fragments from different primitives are to be processed for the same sampling position(s) of a render output. In the technology described herein, the lists for the sub-regions of the tiles are configured and handled in a manner which can (more) efficiently identify and enforce such dependencies.

In particular, in the technology described herein, each entry in the list for a tile sub-region represents a group of one or more fragments (e.g. a (2×2) quad of fragments) to be processed. Each entry has associated with it information indicating which part of the sub-region the group of one or more fragments represented by the entry apply to (cover) (are to be used to render). As will be discussed further below, this can allow, and is in an embodiment used to allow, fragments having overlapping positions in the tile sub-region to be identified (and any resulting dependencies to be determined).

Each entry in the list also has associated with it information indicating whether one or more processing operations are eligible to be performed for the group of fragments represented by the entry.

As will be discussed further below, the Applicant has found that providing such eligibility information associated with entries in the list can provide an efficient mechanism for enforcing fragment processing order dependencies, and in particular to allow (or prevent) performing of processing operations for fragment groups (and thereby enforce any fragment processing order dependencies accordingly).

The render output being generated (and which is generated) may comprise any suitable useful render output that a graphics processor may be used to generate, such as frame for display, a render to texture output, etc. In an embodiment it comprises an image. It may also comprise a "non-graphics" output that may be generated by a graphics processor, such as in the case of so-called compute shading for example, but which is generated in an analogous manner (by generating and processing fragments) (and for which fragment processing dependencies may need to be tracked and enforced).

The render output being generated will comprise an array of sampling positions (i.e. data elements), each sampling position having appropriate render output data associated with it, such as colour value data (e.g. a set of red, green and blue (RGB) values and a transparency (alpha, a) value), a depth (Z) value, etc.

The technology described herein relates to tile-based graphics processing. Thus the render output being generated will be divided into plural rendering tiles for rendering purposes (is processed on a tile-by-tile basis).

Each tile of the render output being generated should, and in an embodiment does, correspond to a (respective, and in an embodiment different) sub-region (area) of the render output (and in an embodiment corresponds to a set of sampling positions (data elements) of the render output). The tiles that the render output is divided into for rendering purposes can be any suitable and desired such tiles. The size and shape of the rendering tiles may be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment rectangular, and in an embodiment square. The size and number of tiles can be selected as desired. Each tile in an embodiment corresponds to an array of contiguous sampling positions (data elements), for example each tile being 16×16 or 32×32 or in an embodiment 64×64 sampling positions (data elements) in size. The render output may be divided into however many such tiles are required to span the render output, for the size and shape of the render output that is being generated.

In the technology described herein, to assist with managing and enforcing dependencies that may exist for fragment processing operations, lists indicative of fragments that are to be rendered for respective sub-regions of a tile being rendered are maintained. In an embodiment this is done for each tile of a render output being generated.

The Applicant has recognised that such lists for sub-regions of a tile may provide an effective way of monitoring the fragments to be processed and also for handling dependencies for fragment processing operations. Such an arrangement using lists for respective tile sub-regions may be more efficient, for example, than monitoring the fragments to be processed for the tile as a whole, or conversely monitoring fragments for each and every sampling position individually.

Each sub-region of a tile (for which a list is maintained) should, and in an embodiment does correspond to a different (respective) sub-region (area) of the tile. In an embodiment, each sub-region of the tile corresponds (relates) to a respective (different) set of sampling positions of the tile.

In an embodiment, the sub-regions of a tile for which fragment lists are maintained do not overlap (relate to non-overlapping areas of the tile). In an embodiment, the sub-regions of the tile together encompass the entire tile. In an embodiment, each sampling position of the tile is represented in (falls within) a (single) sub-region of the tile (only).

The sub-regions of a tile (for which respective lists are maintained) are in an embodiment all the same size and shape (i.e. regularly sized and shaped sub-regions are in an embodiment used). The sub-regions of the tile are in an embodiment rectangular, and in an embodiment square.

The size and number of sub-regions may be selected as desired. This may, and in an embodiment does, depend, for example on the tile size and the number of sub-region lists it is desired to support/store. In embodiments, a (and each) tile is divided into 2×2, 4×4, 8×8 or 16×16 sub-regions. Correspondingly, the size of the sub-regions will depend upon the tile size and the number of sub-regions that the tile is divided into.

Each sub-region of the tile in an embodiment corresponds to an array of contiguous sampling positions. In embodiments, each sub-region has a size of 2×2, 4×4, 8×8, or 16×16 sampling positions.

The boundaries (edges) of the sub-regions are in an embodiment aligned with fragment boundaries, and the sub-regions are in an embodiment sized and configured and aligned such that any given fragment will fall entirely within a single sub-region only (and no fragment will span (fall within) plural sub-regions) (even when variable rate shading is being used).

Where plural (and in an embodiment all) of the tiles for a render output are being handled in the manner of the technology described herein, then in an embodiment each tile for which sub-region lists are maintained is divided into the same number, and layout and configuration, of sub-regions as all the other tiles. Thus, for example, each tile is in an embodiment sub-divided into the same layout of 8×8 sub-regions.

In the technology described herein the lists maintained for respective sub-regions of a tile are indicative of fragments that are to be processed for the sub-region of the tile.

The fragments to be processed for a tile will be generated by rasterising primitives to be processed for the tile in question. This can be done in any suitable and desired manner, such as, and in an embodiment, using, and in accordance with, the "normal" rasterisation operation for the graphics processor and graphics processing system in question.

Each fragment will correspond to a set of one or more sampling positions in a tile. Each fragment could correspond to a single sampling position in a tile (and in one embodiment that is the case). In an embodiment, each fragment corresponds to a set of plural sampling positions in a tile.

In this regard, in an embodiment, the graphics processor and graphics processing system are configured to (be able to) use multisampling (multisample anti-aliasing (MSAA)). In this case, when multisampling is used, a (and each) fragment will relate to a corresponding set of plural sampling positions in the tile as set by the multisampling rate (MSAA rate), such as a 2×2 quad of sampling positions.

In an embodiment, the graphics processor and graphics processing system is configured to (be able to) use variable rate shading (VRS), wherein the shading rate may vary among respective fragments.

When VRS is not used (or a VRS shading rate of 1×1 is used) for a fragment (which can thus be thought of as, and referred to as, a VRS "fine" fragment), that (fine) fragment will correspond to the "normal" number of sampling positions for a fragment (which is, e.g., one sampling position where multisampling is not used, or a number of sampling positions set by the MSAA rate where multisampling is used).

However, when a VRS shading rate larger than 1×1 is used for a fragment (which can thus be thought of as, and referred to as, a VRS "coarse" fragment, consisting of multiple "fine" fragments), then the number of sampling positions to which the (coarse) fragment corresponds and the area of the tile to which the (coarse) fragment applies will depend on (increase in accordance with) the shading rate being used. For example, for a VRS shading rate of 2×2, a coarse fragment will apply to, and be used to render, an area of the tile corresponding to 2×2 "fine" fragments.

The VRS shading rates that the graphics processor is configured to use are in an embodiment of the form X×Y (with X and Y integers), and are in an embodiment from 1×1 to 4×4 (such as one or more (or all) of 1×1, 1×2, 2×1, 2×2, 4×2, 2×4, and 4×4). Other VRS shading rates could be used if desired.

In embodiments where VRS and MSAA are both used, the total number of sampling positions which a fragment corresponds to will accordingly be the MSAA rate multiplied by the VRS shading rate.

In an embodiment, the number of sampling positions that respective fragments correspond to may, and in an embodiment does, vary (as between respective fragments). This may particularly be the case when variable rate shading is being used.

Each fragment that is generated by the rasteriser for a primitive will represent and be used to render one or more sampling positions of the set of sampling position(s) that the fragment corresponds to that the primitive in question has been determined to cover. As it can be the case that a primitive may not cover all the sampling positions that a fragment corresponds to, each fragment in an embodiment has associated with it, e.g. by the rasteriser, suitable "coverage" information, such as a coverage mask, indicating which of the sampling positions that the fragment corresponds to, are actually covered by the primitive that the fragment is for (the sampling positions that the primitive in question should be rendered for).

It would be possible for the lists for the tile sub-regions to be indicative of all the fragments that are generated for the tile sub-regions by the rasteriser. However, in an embodiment, the lists are indicative (and have included in them) only those fragments that are actually to be subjected to fragment processing (fragment shading). Thus, for example, and in an embodiment, any fragments that are culled (e.g. due to early depth and stencil testing) before they fall to be rendered (fragment shaded) are in an embodiment not included in the tile sub-region lists. Thus, in an embodiment, the tile sub-region lists are indicative of fragments that survive any early (e.g. depth) culling testing, and that have been determined as actually needing to be rendered (fragment shaded) for the tile in question.

The tile sub-region lists are indicative of fragments that are to be processed for the sub-region of the tile in question. They could in this regard identify and list the actual fragments themselves.

In an embodiment, in the case where the graphics processor and graphics processing system is configured to perform fragment processing operations by executing appropriate fragment shader programs for fragments to be processed, such that fragments will be processed by generating (spawning) respective execution threads for processing respective fragments, with the execution threads then executing the desired fragment shader programs to perform the desired fragment processing for the fragments that they correspond to, the tile sub-region lists and the respective tile sub-region entries identify and indicate groups (sets) of one or more respective execution threads (which will accordingly correspond to groups of one or more corresponding fragments) to be executed for the tile sub-region in question. Thus in this case, the tile sub-region lists will indicate and be indicative of the fragments to be processed for the tile sub-region, by listing (and including) the corresponding execution threads that are to be executed (processed) for the sub-region of the tile for processing (performing the fragment processing (shading) for) the fragments for the sub-region of the tile.

Thus, in an embodiment, the graphics processor and graphics processing system is configured to perform fragment processing operations by executing appropriate fragment shader programs for fragments to be processed. Thus respective execution threads will be generated for processing respective fragments, with the execution threads then executing the desired fragment shader programs to perform the desired fragment processing for the fragments that they correspond to. In this case therefore, and in an embodiment, fragments generated by the rasteriser (and, e.g., that survive any early culling testing) will be forwarded to a thread creator, which will generate corresponding execution threads for performing fragment shading for the fragments in question. Each execution thread will correspond to a (single) respective fragment, and have the corresponding properties of the fragment, such as the position of the fragment, associated with it.

Thus, in an embodiment, the preparation of the tile sub-region fragment lists is performed using and in response to appropriate execution threads being generated for fragments. Correspondingly, the entries in the tile sub-region fragment lists in an embodiment identify and list respective sets of one or more execution threads (corresponding to one or more fragments) that are to be processed (executed) for the tile sub-region in question.

Thus, in an embodiment, the maintaining for each of plural sub-regions of the tile, each sub-region of the tile relating to plural sampling positions of the tile being generated, a list indicative of fragments that are to be processed for the sub-region of the tile for generating the render output, each entry in the list representing a group of one or more fragments;
  wherein each entry in the list for a sub-region has associated with it:
    information indicating which part of the sub-region the one or more fragments that the entry represents apply to; and
    information indicating whether one or more processing operations are eligible to be performed for the one or more fragments that the entry represents;
  comprises:
  maintaining for each of plural sub-regions of the tile, each sub-region of the tile relating to plural sampling positions of the tile being generated, a list of execution threads that are to be processed for the sub-region of the tile for generating rendered output data for fragments that are to be processed for the sub-region of the tile, each entry in the list representing a set of one or more execution threads;
  wherein each entry in the list for a sub-region has associated with it:
    information indicating which part of the sub-region the one or more execution threads that the entry represents apply to; and
    information indicating whether one or more processing operations are eligible to be performed for the one or more execution threads that the entry represents.

Similarly, in an embodiment, controlling the processing of fragments to be processed for a sub-region of the tile based on the information in the list indicative of fragments for the sub-region of the tile indicating which part of the sub-region fragments that entries in the list represent apply to and the information indicating whether one or more processing operations are eligible to be performed for fragments that entries in the list represent comprises:
  controlling the processing of execution threads to be processed for a sub-region of the tile based on the information in the list of execution threads for the sub-region of the tile indicating which part of the sub-region execution threads that entries in the list represent apply to and the information indicating whether one or more processing operations are eligible to be performed for execution threads that entries in the list represent.

Correspondingly, the fragment dependency list managing circuit is in an embodiment configured to:
  maintain for each of plural sub-regions of a tile of a render output being generated, each sub-region of the tile relating to plural sampling positions of the tile being generated, a list of execution threads that are to be processed for the sub-region of the tile for generating rendered output data for fragments that are to be processed for the sub-region of the tile, each entry in the list representing a set of one or more execution threads;
  wherein each entry in the list for a sub-region has associated with it:
    information indicating which part of the sub-region the one or more execution threads that the entry represents apply to; and
    information indicating whether one or more processing operations are eligible to be performed for the one or more execution threads that the entry represents.

Similarly, the fragment dependency list managing circuit and the control circuit are in an embodiment configured to control the processing of execution threads to be processed for a sub-region of a tile based on the information in a list of execution threads for the sub-region of the tile indicating which part of the sub-region execution threads that entries in the list represent apply to and the information indicating whether one or more processing operations are eligible to be performed for execution threads that entries in the list represent.

Correspondingly, an embodiment the technology described herein comprises a method of operating a graphics processor when rendering an output using tile based rendering, in which a plurality of tiles of a render output being generated are rendered separately, and the rendered tiles are combined to form the render output, the method comprising:
  for a tile of a render output being generated:
  maintaining for each of plural sub-regions of the tile, each sub-region of the tile relating to plural sampling positions of the tile being generated, a list of execution threads that are to be processed for the sub-region of the tile for generating rendered output data for fragments that are to be processed for the sub-region of the tile, each entry in the list representing a set of one or more execution threads;
  wherein each entry in the list for a sub-region has associated with it:
    information indicating which part of the sub-region the one or more execution threads that the entry represents apply to; and
    information indicating whether one or more processing operations are eligible to be performed for the one or more execution threads that the entry represents;
  the method further comprising:
  controlling the processing of execution threads to be processed for a sub-region of the tile based on the information in the list of execution threads for the sub-region of the tile indicating which part of the sub-region execution threads that entries in the list represent apply to and the information indicating whether one or more processing operations are eligible to be performed for execution threads that entries in the list represent.

In another embodiment, the technology described herein comprises a graphics processor configured to perform tile-based rendering, in which a plurality of tiles of a render output being generated are rendered separately, and the rendered tiles are combined to form the render output, the graphics processor comprising:

a fragment dependency list managing circuit configured to:
maintain for each of plural sub-regions of a tile of a render output being generated, each sub-region of the tile relating to plural sampling positions of the tile being generated, a list of execution threads that are to be processed for the sub-region of the tile for generating rendered output data for fragments that are to be processed for the sub-region of the tile, each entry in the list representing a set of one or more execution threads;
wherein each entry in the list for a sub-region has associated with it:
information indicating which part of the sub-region the one or more execution threads that the entry represents apply to; and
information indicating whether one or more processing operations are eligible to be performed for the one or more execution threads that the entry represents;
the graphics processor further comprising:
a control circuit configured to control the processing of execution threads to be processed for a sub-region of a tile;
wherein the fragment dependency list managing circuit and the control circuit are configured to control the processing of execution threads to be processed for a sub-region of a tile based on the information in a list of execution threads for the sub-region of the tile indicating which part of the sub-region execution threads that entries in the list represent apply to and the information indicating whether one or more processing operations are eligible to be performed for execution threads that entries in the list represent.

As will be appreciated by those skilled in the art, embodiments of the technology described herein can, and in an embodiment do, include any one or more or all of the features described herein, as appropriate.

The tile sub-region that a fragment is to be processed for (and thus should be listed for) can be determined in any suitable and desired manner.

This is in an embodiment determined based on (and using) the position within the tile of the fragment (of the set of sampling position(s) that the fragment corresponds to). In an embodiment which tile sub-region the fragment (the sampling positions for the fragment) falls within is determined based on (and using) the position within the tile of the fragment (of the set of sampling position(s) that the fragment corresponds to). (Thus the list for a tile sub-region will indicate (be indicative of) fragments that fall within the tile sub-region in question.)

This determination may, e.g., be done as part of the rasterisation process (by the rasteriser). Thus the rasteriser and rasterisation process may determine which tile sub-region a fragment falls within as part of the rasterization operation (in an embodiment as it generates the fragment).

In an embodiment, the determination of the tile sub-region that a fragment is to be processed for (and that it should be listed for), and the corresponding managing and maintaining of the tile sub-region fragment lists, is performed after fragments have been generated by the rasteriser, and in an embodiment as and when corresponding execution threads and execution thread groups are generated (created) for processing fragments (and in an embodiment for performing fragment shading for fragments) (as discussed above).

Thus, in an embodiment the particular tile sub-region that a fragment is to be processed for (and that the fragment should be listed for) is in an embodiment determined based on (and using) the position in the tile that the execution thread that has been generated for the fragment applies to.

In an embodiment a record (a list) of tile sub-region fragment lists that currently exist is maintained, e.g., and in an embodiment, indexed by corresponding positions within the tile that the lists relate to, such that the appropriate list to which a fragment or fragments (thread or thread group) should be added can be identified by using the position of the fragment/associated with the corresponding execution thread (or fragment group/corresponding execution thread group) as an index into the list (record) of tile sub-region fragment lists.

Other arrangements would, of course, be possible.

Once a fragment/execution thread has been generated and the tile sub-region it relates to determined, then the fragment/execution thread can be, and is in an embodiment, added to the list of fragments/execution threads to be processed for the tile sub-region in question. This can be done in any suitable and desired manner.

For example, the rasteriser could "add" the fragment to the appropriate tile sub-region list, or provide an indication of the tile sub-region (and the fragment) to an appropriate list managing process/circuit, as desired.

In an embodiment, there is an appropriate tile sub-region fragment list managing circuit, in an embodiment in the form of a fragment dependency manager circuit/process, that is operable to and configured to maintain the tile sub-region fragment lists, and, to, in particular, add appropriate entries to the tile sub-region fragment lists as new fragments/execution threads fall to be processed.

In an embodiment, this fragment dependency manager/process is part of the execution thread management circuit/process of the graphics processor, and so will operate as and when an execution thread manager receives newly created execution threads to be processed, to correspondingly update and prepare the tile sub-region fragment lists as and when new execution threads, corresponding to new fragments, are created for performing the desired fragment processing operations.

It would be possible in this regard to add fragments/execution threads to the sub-region lists one-by-one (singly), e.g. as they (or the corresponding execution threads) are generated, or groups of plural fragments/threads could be added at a time, if desired.

In an embodiment, the addition of fragments to a tile sub-region fragment list is performed for respective groups of plural fragments at a time, for example for respective 2×2 "quads" of fragments (and correspondingly for respective execution thread quads corresponding to such groups of plural fragments). In this case therefore, the fragment "group" ("quad") position (the thread quad position) is in an embodiment considered and used to determine which tile sub-region the corresponding fragment group (thread group) is to be processed for.

Thus, in an embodiment, groups of plural fragments are added to the sub-tile fragment lists at a time (i.e. a (and in an embodiment each) new entry in a tile sub-region fragment list corresponds to a group of plural fragments (a group of corresponding execution threads)).

It would be possible to add to, and include in, the sub-region lists, only those fragments/threads that may have processing (order) dependencies. Thus, for example, where it can be determined that the processing operations for a fragment/thread will not lead to any risk of a fragment processing order dependency, that fragment/thread may not need to be added to any of the tile sub-region fragment lists.

In an embodiment, (at least) each and every fragment (execution thread) that is to undergo rendering for a tile is added to a (the appropriate) sub-region fragment list. Thus, in an embodiment, each and every fragment (thread) (that falls to be sent to the rendering process) is added to a sub-region fragment list. This may simplify the management and handling of the lists, for example.

The list indicative of fragments to be processed for a tile sub-region should and in an embodiment does, include one or more, and in an embodiment plural, list "entries", with each entry representing a group of one or more fragments (of one or more execution threads) to be processed for the tile sub-region in question.

An (and each) entry in a list (maintained for a sub-region of a tile) may represent a single fragment/thread to be processed for the tile sub-region. In one embodiment each list entry can only and does only represent a single fragment/thread.

In an embodiment, an (and in an embodiment each) entry in a list (maintained for a sub-region of a tile) can, and in an embodiment does, represent a group of plural fragments/execution threads to be processed for the tile sub-region. Thus, in an embodiment, each list entry represents a group of plural fragments/execution thread.

In these cases, each list entry could be configured and constrained to represent the same (plural) number of fragments/threads (and in one embodiment that is the case). For example, each list entry could represent a 2×2 group (quad) of fragments/threads. However, in an embodiment, different list entries can represent different numbers of (plural) fragments/threads.

In an embodiment, each list entry corresponds at least to a group of 4 fragments/threads, and in an embodiment a 2×2 "quad" of fragments/threads. This is in embodiments done where the graphics processor and graphics processing pipeline is otherwise configured to handle and process fragment groups, such as fragment (thread) quads. (It may be advantageous to process fragments as groups for certain fragment processing operations, as this may, for example, facilitate derivative determinations.) In an embodiment, a (and each) list entry can comprise an integer number of 2×2 fragment/thread quads, such as a single quad or plural quads. In this case, the fragments/threads of a (any) 2×2 fragment/thread quad in an embodiment relate to (are derived from) the same primitive.

Correspondingly, it could be the case that the group of fragments/threads that a list entry relates to cannot be changed once the entry has been created. In one embodiment, that is the case. However, in an embodiment, it is possible to change the group of fragments/threads that an existing entry relates to, for example, and in an embodiment, to add newer fragments/threads to the entry. This would then allow later fragments/threads to be "merged" into existing list entries (where it is appropriate and desirable to do that).

Fragments/threads could be added to (merged into) an existing entry singly. Alternatively, groups of fragments/threads (e.g. one or more "quads" of fragments/threads) could be added to (merged into) an existing entry. In embodiments, fragment/thread "quads" which are added to (merged into) an existing entry may relate to (be derived from) the same primitive as the existing fragment/thread "quad(s)" represented by that entry. Alternatively (or additionally), fragment/thread "quads" which are added to (merged into) an existing entry may relate to (be derived from) one or more different primitives compared to the existing fragment/thread "quad(s)" represented by that entry, provided those primitives do not overlap (at least at the positions (part) of the tile to which the entry relates).

Conversely, in embodiments, fragments/threads can be removed from an existing entry (no longer represented by an entry), such that the number of fragments/threads represented by an entry is reduced. Fragments/threads could be removed singly, or (in an embodiment) groups of fragments/threads (e.g. one or more "quads" of fragments/threads) could be removed from a list entry. Removal of fragment(s)/thread(s) from a list entry may be performed in response to determining that those fragment(s)/thread(s) no longer require processing to be performed (e.g. when the processing for those fragments/threads is complete, or when those fragments/threads are otherwise desired to be terminated), as will be discussed in further detail below.

Where a list entry represents a group of plural fragments/threads, then in an embodiment none of the fragments/threads in the group overlap (in position) with each other (a list entry can only include non-overlapping fragments/threads) (and correspondingly, where a list entry relates to plural fragment/thread "quads", in an embodiment a list entry can only include non-overlapping fragment/thread quads). This will avoid there being any processing dependencies between fragments/threads represented by the same list entry.

Where a list entry represents a group of plural fragments/threads, then in an embodiment, all fragments/threads represented by a list entry relate to (are derived from) the same primitive. In other embodiments, the fragments/threads represented by a list entry may relate to (be derived from) different primitives, provided those primitives do not overlap (at least the positions (part) of the tile to which the entry relates). This may also assist in avoiding there being processing dependencies between fragments/threads represented by the same list entry. (Fragments/threads represented by different list entries can relate to different primitives.)

In the case where the graphics processor is configured to process fragments as respective groups ("warps") of execution threads, then in an embodiment a list entry can only relate to (can only include) fragments/threads from the same fragment thread group (warp) (cannot include fragments/execution threads from different fragment thread groups (warps)).

The list indicative of fragments to be processed for a tile sub-region can take any suitable and desired form. In an embodiment a (and each) list (maintained for a sub-region of a tile) is a linked list, with each entry in the list linked to (at least one) other entry in the list. Each entry in the list thus in an embodiment has an associated (comprises a) pointer to at least one other entry in the list (to link it to that entry or entries).

In an embodiment, a (and each) list (maintained for a sub-region of a tile) is a singly-linked list, in which each entry in the list has associated with it (comprises) only a single pointer to another (next) entry in the list (in the direction towards the end (tail) of the list). The singly-linked list is (therefore) unidirectional, and can be traversed in only one direction (from the start (head) to the end (tail) of the list). In this case, new entries are in an embodiment added to the end (tail) of the list.

In this regard, and as will be discussed in further detail below, the Applicant has recognised that a singly-linked list may be sufficient for (and may be relatively efficient for) monitoring and enforcing fragment processing dependencies among fragments represented by entries in the list (whilst reducing memory and processing burden).

In an alternative embodiment, a (and each) list (maintained for a sub-region of a tile) is a doubly-linked list, in which each entry in the list has associated with it) a pointer to a previous entry in the list (in the direction towards the start (head) of the list) and a pointer to the next entry in the list (in the direction towards the end (tail) of the list).

A (and each) list maintained for a sub-region of a tile may be of any suitable and desired length (may contain any suitable and desired number of entries), and is in an embodiment able to list (represent) any fragments that are desired to be (and are yet to be) processed for the tile sub-region in question. As will be discussed further below, the graphics processor is in an embodiment configured so as to be able to, and to, add and remove entries from the sub-region lists as new fragments/execution threads are generated and as fragments/threads are processed, respectively. The graphics processor and graphics processing system are accordingly in an embodiment operable to, and configured to, provision (assign) appropriate storage and processing resource, etc., for maintaining and using the lists.

The graphics processor is in an embodiment configured to use (provision for) a number of tile sub-region lists up to the (maximum) number of sub-regions that a tile can be subdivided into (e.g. such as up to 64 lists, for 64 respective tile sub-regions).

In an embodiment, an amount of storage for list entries is provided (provisioned) based on (corresponding to) the (maximum) number of threads that the graphics processor (its execution core(s)) can support/handle at any given time. For example, the graphics processor may be configured to use up to e.g. 2048 threads, and accordingly may support (up to) 512 list entries (wherein each list entry may represent one or more quads of threads, so as to support the overall number of e.g. 2048 threads). The supported number of list entries may be distributed among lists as required (e.g. according to which sub-regions of the tile fragments fall within), e.g. with a single list having 512 entries, to 64 lists with 8 entries each, or anything in between.

In the technology described herein, each entry in a list for a tile sub-region has associated with it (comprises) information indicating which part of the sub-region the group of one or more fragments/execution threads represented by the entry applies to (covers). As will be discussed further below, this information may be, and is in an embodiment, used for identifying entries representing overlapping fragments, and which may therefore have fragment processing operation dependencies which should be enforced.

The information indicating which part of the tile subregion a group of fragments/threads represented by an entry applies to can take any suitable and desired form. It in an embodiment indicates, and/or can be used to determine, the sampling positions of the tile sub-region that the group of fragment(s) applies to (covers). This could be indicated at a resolution of individual sampling positions, for example, or for respective groups of plural sampling positions in the tile sub-region, as desired. In an embodiment the fragment group coverage is indicated for respective 2×2 sampling position quads within the tile sub-region in question (i.e. at a resolution of individual (VRS fine) fragment positions). In another embodiment the fragment group coverage is indicated for respective 2×2 (VRS fine) fragment quads within the tile sub-region in question (i.e. at a resolution of (VRS fine) fragment quad positions). Other arrangements would, of course, be possible.

In an embodiment, the information indicating which part of a sub-region the group of fragments/threads represented by a list entry applies to comprises a coverage mask for the list entry. In other words, in an embodiment an (and in an embodiment each) entry in a (and each) list for a (and each) tile sub-region has associated with it (comprises) a coverage mask indicating which part of the tile sub-region the fragment(s) represented by the entry in question apply to (cover).

In an embodiment, the coverage mask for a list entry comprises an array of data elements, each data element corresponding to a different part of the tile sub-region. In an embodiment, a value for a (each) data element of the coverage mask is operable to be set (and in an embodiment is set) based on whether the corresponding part of the sub-region is covered (at least in part) by a (by any) fragment of the group of fragments represented by the entry. The value for the data elements of the coverage mask are in an embodiment binary, for example being 0 or 1. For example, a data element value set to 0 may indicate that the corresponding part of the tile sub-region is not covered by a fragment represented by the entry, whereas a value set to 1 may indicate that the corresponding part of the tile sub-region is covered (or vice versa).

In this case, each element in the coverage mask could, for example, correspond to a single sampling position of the tile sub-region (and in one embodiment that is the case), or it could correspond to a set of plural sampling positions (e.g. a quad of 2×2 sampling positions) (and in another embodiment, this is the case).

In an embodiment, each element in the coverage mask corresponds to a respective (VRS fine) fragment position. In an embodiment, each element in the coverage mask corresponds to a respective 2×2 (VRS fine) fragment quad within the tile sub-region in question. Other arrangements would, of course, be possible.

The information, e.g. coverage mask, indicating which part of a sub-region the group of fragments represented by a list entry applies to can be set in any suitable and desired manner. This may be, and in an embodiment is, based, for example, simply on the sets of sampling position(s) that the fragment(s)/threads in the group correspond to (irrespective of the actual coverage of those sampling positions by the primitive in question) (the fragment/thread positions), or it could (also) take account of the actual primitive coverage of the actual sampling positions (e.g. as determined and indicated by the rasteriser) as well (such that the information, e.g. coverage mask, indicating which part of a sub-region the group of fragments represented by a list entry applies to is based on the sampling positions that are actually covered by the primitive(s) in question).

Correspondingly, where the information, e.g. coverage mask, indicating which part of a sub-region the group of fragments/threads represented by a list entry applies to indicates the coverage at a resolution of sets of more than one sampling position, then if any of the sampling positions in the relevant set are covered by the fragment(s)/primitive(s) in question, it should be indicated that the set of sampling positions is "covered".

In embodiments where VRS is used, the area of the tile (positions) that a fragment/thread applies to (covers) may vary (e.g. be expanded) based on the VRS shading rate, and so the information (e.g. coverage mask) indicating which part of a sub-region the group of fragments/threads represented by a list entry applies to in an embodiment correspondingly indicates the (expanded) coverage of those fragments/threads (as set by the VRS shading rate). Since fragments/threads may relate to an expanded area of the tile when using VRS, it may occur that processing dependencies arise between fragments/threads represented by different list entries due to their overlapping coverage of the tile (even if the primitives from which those fragment(s)/thread(s) were derived did not originally overlap). Setting the coverage of the list entries based on the fragment/thread coverage may help to enforce such dependencies (in addition to dependencies arising from primitives which originally overlap).

In the technology described herein, in addition to information indicating which part of the tile sub-region the one or more fragments represented by an entry in the tile sub-region fragment list apply to, each entry in a tile sub-region fragment list also has associated with it information indicating whether one or more processing operations are eligible to be performed for the one or more fragments/execution threads that the entry represents.

The one or more processing operations for which "eligibility" information is provided for a list entry may comprise any suitable and desired fragment processing operations. Such "eligibility" information could be provided for all of fragment processing operations that the one or more fragments/threads of the entry are to undergo, or for only some but not all (a subset) of the overall set of fragment processing operations that the fragment(s)/thread(s) that the entry represents are to undergo. Thus, in an embodiment, eligibility information is provided (only) for particular, in an embodiment selected, in an embodiment predetermined, fragment processing operations (and not for all fragment processing operations).

In an embodiment, the fragment processing operations for which "eligibility" information is provided comprise operations relating to fragment shading (operations which are to be performed for generating data for sampling positions of the render output).

In an embodiment, the processing "eligibility" information is provided (at least) for a fragment processing operation or operations for which an ordering dependency could exist, such as, and in an embodiment, for fragment processing operations that (include) accessing data storage, and in an embodiment that include writing to and/or reading from storage (storing data and/or reading stored data). In an embodiment, processing "eligibility" information is provided for fragment processing operations for which an ordering dependency could exist, but not for other fragment processing operations for which there will not be (and should not be) any ordering dependency.

In an embodiment, the one or more fragment processing operations for which eligibility information is provided relate to determining and/or updating a colour value and/or a depth value for a sampling position of positions. In an embodiment, the one or more fragment processing operations for which eligibility information is provided comprise operations that access (that require access to) the colour and/or depth buffers when rendering a tile (i.e. relate to colour shading and/or depth processing (which are to be performed for generating colour data values and/or depth data values respectively for sampling positions of the render output)).

Thus in an embodiment, the fragment processing operation(s) for which eligibility information is provided (at least) comprise one or more of, and in an embodiment both of: operations that write a colour value for a sampling position for a tile when rendering the tile (colour buffer writes/updates); and operation that write a depth value for a sampling position for a tile when rendering the tile (depth buffer writes/updates).

In an embodiment, (additional) eligibility information is (separately) provided for fragment processing operation(s) that (only) read (determine) a colour value for a sampling position for a tile when rendering the tile (colour buffer reads).

In this regard, the Applicant has recognised that situations may arise where dependencies exist between various fragments/threads for colour buffer write operations (e.g. such that various fragments/threads must perform colour buffer write operations in a particular order), but no dependency exists for colour buffer read operations for those fragments/threads (such that those fragments/threads can perform colour buffer read operations in any order). In this regard, the Applicant has recognised that providing additional (separate) eligibility information for colour value read operations (compared to eligibility information for colour value write operations), can help to avoid falsely enforcing dependencies for colour value read operations. In this sense, the additional (separate) eligibility information for colour value read operations may be used to avoid a colour processing dependency for colour buffer read operations, even if a dependency otherwise exists for colour buffer write operations.

In comparison, in an embodiment the eligibility information which is provided for depth (z) processing applies to both read and write operations (such that no separate eligibility information is provided for depth buffer read operations).

In an embodiment, the fragment processing operation(s) for which eligibility information is provided comprise one or more of, and in an embodiment all of: operations that write a colour value for a sampling position for a tile when rendering the tile (colour buffer updates); operations that read a colour value for a sampling position for a tile when rendering the tile (without also writing to the colour buffer) (colour buffer reads); and operations that access the depth buffer (irrespective of whether they read from or write to the depth buffer) (depth buffer accesses).

The fragment processing operation eligibility information can take any suitable and desired form. In an embodiment it is in the form of an indicator, such as, and in an embodiment, a flag or flags, associated with the list entry, that can be set to indicate whether the processing operation(s) are eligible to be performed (or not).

It would be possible to provide a single "eligibility" indication for all the operations for a group of fragments that a list entry relates to (and for which eligibility information is to be provided).

However, in an embodiment, plural eligibility indications can be, and are in an embodiment, provided, with each "eligibility" indication in that case relating to a different set of one or more fragment processing operations. Thus, in an embodiment, a (and in an embodiment each) entry in a fragment list for a tile sub-region has associated with it a plurality of fragment processing operation eligibility indications (e.g. flags), each indicating whether a respective (and in an embodiment different) set of one or more fragment processing operations is eligible to be performed for the group of one or more fragments that the list entry relates to.

In this case, the separate eligibility indications can be provided for any suitable and desired sub-division of the fragment processing operations.

In an embodiment, a (first) indication is provided for indicating whether operations that access (use) the colour buffer (that perform colour shading) (that relate to determining or updating a colour value for a sampling position or positions) are eligible to be performed, and another (separate) (second) indication is provided for indicating whether operations that access (use) the depth buffer (that perform depth processing) (that relate to determining or updating a depth value for a sampling position or positions) are eligible to be performed.

The Applicant has recognised in this regard that colour and depth processing operations generally are not dependent on one another, and their dependencies can generally be handled separately. Providing separate (first and second) indications relating to colour and depth processing operations required for fragments represented by a list entry can provide a relatively efficient mechanism (in terms of memory and processing requirements) for tracking and managing dependencies that may arise separately for colour and depth processing operations.

In this case, in an embodiment, the first and second indications for a list entry indicate eligibility to perform any operation relating to colour and depth, respectively, and in general (without indicating exactly which sub-operations such as accessing, reading from, and writing to, the colour or depth buffer, respectively, are eligible to be performed). Thus in this case, the indications will apply equally to, and be used for, both reads and writes to the colour or depth buffer (respectively).

It would also be possible to provide finer-grained "eligibility" indications, for example relating specifically to reading or writing operations (and particular data types), if desired. For example, separate eligibility indications could be provided for colour writes and for colour reads, etc.

In an embodiment, separate eligibility indications are provided for colour buffer writes and for colour buffer reads. Thus, in an embodiment, another (separate) (third) indication is provided for indicating whether operations that (only) read the colour buffer (that relate to determining a colour value for a sampling position or positions) (without also writing to the colour buffer) are eligible to be performed.

As noted above, providing separate indications for eligibility of colour buffer write and read operations, can help to avoid falsely enforcing colour buffer read dependencies when other colour shading operation dependencies (e.g. such as colour buffer write dependencies) exist.

Where a (third) eligibility indication is provided for colour read operations, then the (first) eligibility indication is in an embodiment considered to relate (and used to control) (only) operations that involve colour writes (that relate to updating a colour value for a sampling position or positions).

In an embodiment, (even when a third eligibility indication is provided for colour read operations), the (second) eligibility indication for depth operations relates to eligibility of both (does not distinguish between) depth read and/or write operations. In this regard, the Applicant has recognised that depth buffer read and write operations should be performed in the same order, and so depth operations can be tracked using a single depth processing eligibility indication.

Hence, in an embodiment, a (and in an embodiment each) list entry is provided with one or more (or in an embodiment all of) the following eligibility indications in respect of processing to be performed for the fragment(s)/thread(s) represented the list entry:
  a (first) eligibility indication indicating eligibility to perform colour write operations;
  a (second) eligibility indication indicating eligibility to perform depth processing (read and write) operations; and
  a (third) eligibility indication indicating eligibility to perform colour read operations (that do not involve any writing to the colour buffer).

Additional (separate) indications may also be, and are in an embodiment, provided, for example relating to other types of fragment processing operations or relating more specifically to sub-operations required for colour and/or depth processing.

Where a sub-region list entry represents and corresponds to more than one fragment/execution thread, then while it would be possible to have separate and respective eligibility information (indications) for different fragments/threads that the entry relates to, in an embodiment a single set of eligibility information (of eligibility indications) is provided for a list entry as a whole (i.e. such that the eligibility information (each eligibility indication) for a list entry applies to all of the fragments/threads (to each of the fragments/threads) that the list entry relates to).

In other words, the eligibility indication(s) for processing operations are in an embodiment provided per-entry in the list (and not per-fragment/thread).

In this regard, the Applicant has recognised that as the fragments/threads represented by an entry may typically, and desirably, be grouped together for processing (as discussed above), providing eligibility information per-entry in the lists can allow fragment processing dependencies to be adequately tracked and managed.

It would be possible for different list entries to have eligibility information (eligibility indications) for different processing operations to each other, if desired. However, in an embodiment, each list entry indicates the "eligibility" for performing the same set of processing operations (to all the other list entries). Thus, each list entry in an embodiment has the same set of one or more eligible for processing indications associated with it, with the indications being set appropriately for each list entry depending on whether the respective processing operation(s) that an indication relates to is eligible (permitted) to be performed for (all of) the fragments/threads that the list entry relates to.

Thus, in an embodiment each list entry has associated with it (at least) a (first) indication for indicating whether operation(s) that access (and in an embodiment that write to) the colour buffer are eligible to be performed, and another (separate) (second) indication for indicating whether operation(s) that access (and in an embodiment that read from and/or write to) the depth buffer are eligible to be performed. In an embodiment, each list entry also has associated with it a (third) indication for indicating whether operation(s) that (only) read from the colour buffer (without also writing to the colour buffer) are eligible to be performed.

The eligibility information (indications) associated with sub-region list entries indicate whether particular processing operations are eligible (are permitted) to be performed for the group of fragments/execution threads that the entry in question relates to. Thus these indications will be set to indicate that the respective processing operation or operations can be performed for the group of fragments/threads that a sub-region fragment list entry relates to when it is permitted for the operation or operations in question to be performed for the group of fragments/threads that the entry relates to, but will be set to indicate that the processing operation or operations are not eligible to be performed (are not permitted to be performed) for the group of fragments/threads when it is not (when it is other than) permitted for the processing operation or operations in question to be performed for the fragment group/execution threads in question.

The setting of the eligibility information will be discussed in more detail below.

In an embodiment, as well as having eligibility information (indications) relating to a processing operation or operations as discussed above, each entry in a sub-region fragment list also has associated with it information indicating whether the entry applies to (should be considered for) the particular processing operation or operations for which eligibility information is provided (and so should, for example, and in an embodiment, be considered (or not) when setting the eligibility information for list entries for the processing operation in question).

This fragment processing operation "should be considered for" (is applicable to) information can again take any suitable and desired form. In an embodiment it is in the form of one or more "should be considered for" indications, such as, and in an embodiment, a flag or flags, associated with the list entry, that can be set appropriately to indicate whether the list entry should be considered for the operation or operations that the indication in question relates to or not.

The processing operation or operations for which such "should be considered for" information is provided for a list entry may comprise any suitable and desired fragment processing operations, for example, and in an embodiment, as discussed above in respect of the "eligibility" information. Thus it may, for example, and in an embodiment, relate to processing operations that access data storage, and in particular that access (and in an embodiment that write to) the colour and/or depth buffers.

It would be possible to provide a single "should be considered for" indication applicable to (and used for) all the processing operations for which eligibility information is to be provided. However, in an embodiment, plural "should be considered for" indications can be, and are in an embodiment, provided, with each "should be considered for" indication in that case relating to a different set of one or more fragment processing operations for which a respective "eligibility" indication is provided.

Thus, in an embodiment, a separate "should be considered for" information (indication) is provided for (at least some of) the same processing operation or operations for which separate "eligibility" information is provided. Thus, in an embodiment, for one or more (or all) of the processing operation or operations for which an "eligibility" indication is provided for a sub-region fragment list entry, a corresponding "should be considered for" indication is provided.

Thus, for example, and in an embodiment, a sub-region fragment list entry will have associated with it both an "eligible to be performed" indication (e.g. flag) and a corresponding "should be considered for" indication (e.g. flag), for one or more respective (different) fragment processing operations, and in an embodiment at least for operations that access (and in an embodiment that write to) the colour buffer and, separately, for operations that access (and in an embodiment, that write to) the depth buffer.

Thus, in an embodiment, a (first) "should be considered for" indication is provided and used for indicating whether the list entry should be considered when setting the eligibility information for operations that access the colour buffer (that perform colour shading) (that relate to determining or updating a colour value for a sampling position or positions), and another (separate) (second) "should be considered for" indication is provided and used for indicating whether the list entry should be considered when setting the eligibility information for operations that access the depth buffer (that perform depth processing) (that relate to determining or updating a depth value for a sampling position or positions).

As noted above, in embodiments, a (third) "eligibility" indication is provided (specifically) in respect of colour buffer read operations. In this regard, it would be possible to provide a corresponding "should be considered for" indication for operations which (only) require the colour buffer to be read (as opposed to requiring the colour buffer to be written to).

Alternatively, a single (the (first)) "should be considered for" indication could be used to indicate whether the list entry should be considered when setting the eligibility information for any operations that access the colour buffer (regardless of whether the operations relate to reading from and/or writing to the colour buffer). In such embodiments, no separate "should be considered for" indication for colour buffer read operations will be used/provided.

The "should be considered for" information (indications) for a given fragment processing operation(s) is in an embodiment set for a list entry when the entry is added to the list, and in an embodiment in dependence upon whether the particular processing operation or operations is to be performed for the group of fragments/threads (list entry), or not.

The processing operation "should be considered for" information (indications) is in an embodiment (at least) used to determine whether a list entry should be taken into account when setting the corresponding eligibility information for list entries (i.e. is in an embodiment used when updating the eligibility information for entries in the tile sub-region fragment lists).

In an embodiment, each list entry (also) has associated with it an appropriate indication, such as, and in an embodiment, a flag, that can be set to indicate when the list entry can be deleted (can be removed from the list). In this case, this "deletion" (retire) indication could be and is in an embodiment, set to indicate that the list entry can be deleted (removed), when there are no processing operations for which corresponding eligibility information is provided still to be (remaining to be) performed for the list entry.

In this case, this "deletion" indication could also be, and in an embodiment can also be, and is, set when a group of fragments/execution threads for a list entry otherwise no longer need to be processed (e.g. because they have otherwise been culled from processing), so that again the list entry can be identified as needing to be removed, and can be removed, from the relevant sub-region fragment list.

As well as the coverage information, eligibility information and "should be considered for" information, a list entry for a group of one or more fragments/execution threads can contain any other suitable and desired information, e.g. relating to the group of one or more fragments/threads that the list entry relates to.

In an embodiment, each list entry at least also includes an identification of the group of fragments/execution threads that the list entry relates to (an identifier for the group of fragments/threads that the list entry relates to). This identifier can take any suitable and desired form, that can allow the fragments/threads that the list entry relates to to be identified. At least in the case where, as discussed above, list entries are generated and handled after corresponding execution threads have been generated for processing fragments, the identifier for the group of fragments/threads that a list entry relates to comprises the identity of (an identifier for) the corresponding execution thread or threads that have been generated for processing the fragments in question.

Thus, in an embodiment, each list entry has associated with it identifiers for the execution thread(s) that have been generated for processing the fragments that the list entry relates to. In this case, the execution thread identifiers may comprise, for example, and in an embodiment, an identifier of the thread group (warp) to which the execution threads belong, and also, where appropriate, of the respective thread sub-group (e.g. quad) within the thread group (warp) in question (e.g. in the form of a thread group (warp) quad offset).

Other arrangements would, of course, be possible.

In an embodiment, further information (metadata), e.g., and in an embodiment, to facilitate the handling and using of the sub-region fragment lists, is also maintained and stored for (and in association with) the sub-region fragment lists. This list information (metadata) can comprise any suitable and desired data in this regard.

As discussed above, this list information (metadata) in an embodiment at least comprises, for a (and each) list, an indication of the position of the sub-region of the tile that the list relates to, in an embodiment such that an appropriate position derived from the position of a fragment or group of fragments can then be used to identify the tile sub-region list that the group of fragments should be added to (included in).

In an embodiment, a tail pointer is associated with (maintained for, and in an embodiment stored for) a (and each) sub-region fragment list, indicating (pointing to) the tail (end) of the list. In an embodiment each list also has an associated head pointer, indicating (pointing to) the head (start) of the list. The head pointer may be stored explicitly for a list, e.g. together with the tail pointer, or the next entry pointer of the newest (the tail) entry in a list could be used to store the head pointer for the list, for example. These pointers can then be, and are in an embodiment, used to identify the heads and tails of the respective lists, for example when using and/or updating the lists.

Other information could also be stored on a per-list basis, if desired. For example, the current tile that the newest (the tail) entry in a list belongs to could be tracked, to allow it to be identified when an entry to be added to a list relates to a different tile.

In an embodiment, a (and each) sub-region fragment list also has associated with it an indication (e.g. a flag) for indicating whether the list needs processing (e.g., and in an embodiment, scanning) to determine whether it needs updating. This indication can be, and is in an embodiment, set whenever a sub-region fragment list potentially needs updating, for example because an entry has been added to or removed from the list, or the state of an existing entry in the list has changed. This can then be, and is in an embodiment, used to trigger the appropriate updating of the sub-region fragment lists, as and when required.

In an embodiment, an appropriate record of the tile sub-region lists is maintained, which record in an embodiment has associated with it, and stores for each tile sub-region fragment list, the appropriate list information (metadata), in an embodiment indexed (and identifiable) by the position of the sub-region within the tile that the list relates to.

In an embodiment a record (a list) of tile sub-region fragment lists that are currently needing to be processed (scanned) to determine whether they need updating is maintained, e.g., and in an embodiment, indexed by the corresponding positions within the tile that the lists relate to, such that lists that may need updating can be identified. It can then be checked whether a list is already in the "to be updated" (to be scanned) list using the position of a fragment/associated with the corresponding execution thread (or fragment group/corresponding execution thread group) as an index into the list (record) of tile sub-region fragment lists to be updated (scanned), and the corresponding list information (metadata) for a list that is to be updated (scanned) can be identified (retrieved) using the position within the tile that the list relates to.

It could also or instead be determined whether and which lists need updating (scanning) by using a "needs scanning" indication (as discussed above) for each list, and checking the lists (e.g. in turn) and processing (scanning) any lists marked as "needing updating" (scanning).

Other arrangements would, of course, be possible.

The fragment processing operation eligibility information for the fragment list entries may be set to indicate that processing operations are eligible (or not) to be performed as desired, and based on any suitable and desired criteria. In an embodiment, the eligibility information is set (or not) in respect of a given group of fragments/execution threads (list entry) and processing operation or operations, to account for, and based on, and in an embodiment so as to enforce, ordering dependencies for processing operations between groups of fragments represented by different list entries (in the same sub-region fragment list).

Accordingly, in an embodiment, the eligibility information for an entry in a list for a sub-region is set based on, and in dependence on, the other (current) entries in the tile sub-region fragment list in question. In an embodiment, the eligibility information for an entry in a list for a sub-region is set based on whether the group of fragments/threads that the entry relates to has any processing ordering dependencies in respect of other entries in the sub-region fragment list in question, with the eligibility information being appropriately set depending on whether the group of fragments/threads for the entry does have an ordering dependency with another entry in the (same) list for the fragment processing operation or operations in question or not.

In the case where the group of fragments/threads for an entry in a list for a tile sub-region does not have any dependency for the fragment processing operation or operations in question on any other entries in the list in question, then the relevant eligibility information (indication) for the entry in question can be, and is in an embodiment, set to indicate that the fragment processing operation or operations are eligible to be performed for the list entry in question. On the other hand, in the case where the entry in question does have a processing order dependency on another entry in the list in question, then the eligibility information for the entry should be, and is in an embodiment, set to indicate that the processing operation or operations are not currently eligible to be performed for the entry in question (are not currently permitted to be performed for the entry in question).

In this regard, the dependency is in an embodiment whether the relevant processing operation or operations must be performed for another entry in the list before it or they can be performed for the entry in question (i.e. whether there is a processing order dependency that needs to be enforced).

It can be determined whether an entry in a fragment list for a tile sub-region has a dependency on any other entry in the list such that the order of processing for the entries needs to be enforced, and the entry processing eligibility information set accordingly, in any suitable and desired manner.

In an embodiment, it is determined whether an entry in a fragment list for a tile sub-region has a dependency on any other entry in the list, such that the entries need to perform their (relevant) processing in a particular order, and the entry processing eligibility information is set accordingly, based on one or more of, and in an embodiment plural of, and in an embodiment all of:

the part of the tile sub-region that the group of fragments/execution threads for the list entry applies to (covers) (the "coverage" information for the entry);

the processing operation or operations that the group of fragments/threads for the entry are indicated as applying to (the "should be considered for" information for the entry); and the position in the desired (primitive) processing order of the primitive that the fragments/threads that the entry relates to are for.

As will be discussed in more detail below, in embodiments, (in an embodiment in respect of colour read-only operations (specifically)), whether an entry for a tile sub-region has a dependency on any other entry in the list, such that the entries need to perform their (relevant) processing in a particular order, and the setting of the entry processing eligibility information accordingly, is (additionally) based on:

a classification (group) for the fragment(s) that the list entry applies to (in an embodiment wherein the classification is a Raster Order state (a Raster Order ID) for the fragment(s)).

In an embodiment, it is determined whether an entry in a fragment list for a tile sub-region has a dependency on any other entry in the list, and the entry processing eligibility information set accordingly, based on one or more of, and in an embodiment plural of (e.g. all of), the above factors, both for the entry for which the eligibility processing information is being set, and for one or more other entries that are already in the list for the tile sub-region in question (and in an embodiment for any earlier entries that are already in the list for the tile sub-region in question).

Thus, for example, and in an embodiment, it is determined whether an entry in a fragment list for a tile sub-region has a dependency on any other entry in the list such that the entry processing eligibility information needs to be set to indicate that a processing operation or operations should not be (currently) performed for the entry in question, by considering (and in an embodiment comparing) the parts of the tile sub-region that the list entries relate to (e.g., and in an embodiment, to see if there is any overlap between the entries), and/or the processing operation or operations that the list entries are indicated as applying to (e.g., and in an embodiment, to see if entries apply to the same processing operation(s) (for which a dependency may need to be enforced)), and/or the relative positions in the desired (primitive) processing order of the primitives that the groups of fragments/execution threads for the list entries relate to (e.g., and in an embodiment, to determine which entry should perform the (relevant) processing operation(s) first). In an embodiment all of these factors are considered for the determination.

In this regard, the parts of the tile sub-region that the list entries relate to can be, and are in an embodiment, determined from the (coverage) information indicating which part of the sub-region the one or more fragments/threads represented by the respective entries apply to.

The processing operation(s) that the fragments/threads that the entries relate to apply to can be, and is in an embodiment, determined from the fragment processing operation "should be considered for" indications for the list entries (as discussed above).

The relative positions in the primitive processing order of the groups of fragments/threads for the list entries could be determined from information to that effect that is provided for (e.g. in) the list entries. However, in an embodiment, this is determined from the relative positions of the entries in question in the sub-region list in question. In particular, in the case where new entries are always added at one end, such as the tail, of the sub-region fragment list, then it can be determined from the relative positions of the entries in question in the list in question, which entry is the older entry (relates to a primitive that should be processed earlier in the desired primitive processing order) and vice-versa, such that the relative order in which the entries should undergo the processing operation(s) in question can be determined from the (relative) positions of the entries in the lists.

(Indeed, it is an advantage of the use of lists indicative of fragments to be processed for tile sub-regions in the manner of the technology described herein that the desired relative processing order of fragments/threads for respective list entries can be determined simply from the relative positions of the entries in a list.)

In an embodiment, the eligibility information for a list entry is set based on assessment of all of these factors, i.e. whether the relevant fragment groups/threads overlap, whether the relevant fragment groups/threads are to be considered for the same processing operation(s) (for which a dependency may need to be enforced), and the relative positions of the primitives that the fragments/threads for the entries relate to in the desired primitive processing order.

In an embodiment, (at least for the first and second eligibility indications discussed above, in respect of colour writes and depth processing operations respectively) the eligibility for a list entry is set to indicate that the relevant processing operation(s) is not eligible to be performed for that list entry when the coverage of the group of fragments/execution threads for the list entry overlaps with the coverage of a group of fragments/threads for another list entry that is to be considered for the same processing operation(s) to which the eligibility information (indication) relates, and which other list entry must perform the processing operation(s) in question before the list entry in question (e.g., and in an embodiment, because the primitive from which the fragments/threads in the other list entry have been derived is an earlier primitive in the desired primitive processing order, such that fragments/threads from that primitive should undergo the relevant processing operation(s) before fragments/threads from the primitive to which the list entry for which the eligibility information is being set relates).

Thus in an embodiment, the eligibility of a list entry is set to indicate that the relevant processing operation(s) is not eligible (is not permitted) to be performed for that list entry when the coverage of the group of fragments/threads for the list entry overlaps with the coverage of a group of fragments/threads for an earlier entry in the list that is still to perform the same processing operation(s) to which the eligibility information (indication) relates.

Conversely, the eligibility of a list entry is in an embodiment set to indicate that the relevant processing operation(s) is eligible (is permitted) to be performed for that list entry when the coverage of the group of fragments/threads for the list entry does not overlap with the coverage of a group of fragments/threads for another list entry that is to be considered for the same processing operation(s) to which the eligibility information (indication) relates, and which other list entry must perform the processing operation(s) in question before the list entry in question.

Thus in an embodiment, the eligibility of a list entry is set to indicate that the relevant processing operation(s) is eligible (is permitted) to be performed for that list entry when the coverage of the group of fragments/threads for the list entry does not overlap (other than overlaps) with the coverage of a group of fragments/threads for an earlier entry in the list that is still to perform the same processing operation(s) to which the eligibility information (indication) relates.

The Applicant has recognised in this regard that if there is no overlap within a tile sub-region between the group of fragments/threads for a list entry and any other group of fragments/threads for a list entry that are still to perform the processing operation(s) in question, then there will be no need to enforce any processing order dependency between the entries in question for the operation(s) in question. Equally, even if there is an overlap of the coverage of the groups of fragments/threads for different entries, and the entries are (still) to perform the same processing operation(s) for which eligibility information is to be set, then the group of fragments/threads that relates to the earliest primitive can be permitted to proceed with the processing operation(s) in question (but any fragments/threads relating to later primitives should not be permitted to proceed with the processing operation(s) in question).

It will be appreciated in this regard that, at least in the case where the processing operation eligibility information is set based on, and in accordance with, the above criteria, there may be, and typically will be, plural list entries that are marked as eligible to perform the same processing operation(s) for a tile sub-region, for example where there are non-overlapping entries that are each to perform the same processing operation(s) in the list for a tile sub-region.

In an embodiment the eligibility information for a tile sub-region fragment list entry is set when the entry is first added to the list, but then the eligibility information for list entries can be, and is in an embodiment, updated, e.g. periodically, for example, and in an embodiment, as the fragments for entries in the list undergo fragment processing. For example, once a list entry that is marked as eligible to perform a particular processing operation has completed that processing operation, that may then allow other list entries relating to the same part of the tile sub-region to undergo the processing operation in question. It would therefore be desirable to update the eligibility information for list entries as the fragment processing for the list entries proceeds.

Thus, in an embodiment, the eligibility information for respective list entries can be, and is in an embodiment, updated after an entry has been added to the list, e.g., and in an embodiment, in dependence upon entries in the list undergoing fragment processing.

In an embodiment, the fragment processing operation "should be considered for" information (indications) for entries in a tile sub-region fragment list can also be, and is in an embodiment also, updated, e.g. periodically, e.g., and in an embodiment, as and when the relevant list entries complete the fragment processing in question. This may then be, and is in an embodiment, used, as discussed above, to update the eligibility information for entries in the list (where appropriate).

It will be appreciated from the above, that in embodiments of the technology described herein, the eligibility information will be, and is in an embodiment, set to indicate eligibility to perform a processing operation(s) for the (single) list entry that is (currently) permitted to perform the processing operation in question for the part of the tile sub-region in question (and so that will perform the processing operation in question for the part of the tile sub-region in question next), but with any other list entries that are to perform the processing operation in question for the part of the tile sub-region in question being marked as "not eligible" to perform that processing operation(s) (unless, as will be discussed further below, a group classification for the fragment(s)/thread(s) indicated in the list entry allows the processing operation(s) to be performed despite those list entries relating to the same part of the tile sub-region).

This is achieved, in embodiments of the technology described herein, by setting the eligibility information for the "oldest" entry in the list desiring to perform (still to complete) the processing operation(s) in question for the part of the tile sub-region in question as being eligible to perform the processing operation (and setting the eligibility information for all other entries in the list desiring to perform (still to perform) that processing operation(s) for that part of the tile sub-region as "not eligible" to perform the processing operation(s)). Thus, the eligibility information for the list entries is, in effect, and in an embodiment, set based on the "oldest" list entry desiring to perform the particular processing operation(s) for respective parts of the tile sub-region (that are covered by a list entry). (Although, as will be discussed below, where the fragment(s)/thread(s) represented by the list entries belong to the same group classification as an earlier entry, then the entry may still be considered as being "oldest" in respect of certain processing operations, e.g. such as colour buffer read operations, even if the coverage of those entries overlaps).

Correspondingly, as discussed above, there may be plural list entries identified as being the "oldest" desiring to perform (as being eligible to perform) a particular processing operation(s), where the list entries relate to different, non-overlapping, parts of the tile sub-region.

Correspondingly, where for a (and each) list entry, eligibility to perform a processing operation is indicated separately for one or more desired processing operations, the relevant (separate) eligibility indications will indicate whether the list entry in question is the list entry that is currently permitted to perform the corresponding processing operation for the part of the tile sub-region in question (is the oldest list entry for the processing operation for the part of the tile sub-region in question). Thus, for example, a list entry may be indicated as being the next list entry to perform a particular processing operation(s), but may not be permitted to perform another, different processing operation(s) for which an eligibility indication is provided, for example because the list entry may not be the first (oldest) list entry that wishes to perform that processing operation for the part of the tile sub-region in question.

As discussed above, the Applicant has recognised that fragment(s)/thread(s) represented by a list entry may be eligible to perform particular processing operation(s) for a particular part of a tile sub-region if they are the 'first' ('oldest') entry requiring that particular processing operation(s) for that particular part of the tile sub-region (and have recognised that any fragment(s)/thread(s) represented by subsequent entries requiring the same processing operation(s) and relating to overlapping parts of the tile sub-region may not be eligible to perform that processing operation(s)). The (first and second) eligibility indications in respect of colour processing (write) operations and depth processing operations (respectively) may be set accordingly for the list entry (entries).

However, the Applicants have further recognised that, whilst eligibility for colour buffer write operations may be determined in this manner (since colour buffer write operation dependencies tend to arise when a fragment(s)/thread(s) represented by an earlier list entry require colour processing in respect of an overlapping part of the tile sub-region as compared to the fragment(s)/thread(s) represented by a list entry in question), eligibility to perform colour buffer read operations may not be so limited.

As noted above, fragment(s)/thread(s) within certain groups of fragment(s)/thread(s) may be able to read the colour buffer in any order without dependencies arising, regardless of whether a colour buffer write dependency potentially exists (and regardless of whether those fragment(s)/thread(s) relate to overlapping parts of a tile sub-region).

Thus, in an embodiment, for certain, in an embodiment selected, in an embodiment defined, processing operations, such as, and in an embodiment, (at least) colour reads (that do not also involve colour writes), the setting of the eligibility information (indication) for those operations is (also) dependent on, and based on, a respective classification group of fragments/threads that the fragments/threads for the list entry belong to, with the arrangement in an embodiment being such that it will be assumed that there is no (that there can't be any) dependency (for the processing operation in question) between list entries for fragments/threads belonging to the same classification group (irrespective of whether the entries "overlap" in the tile sub-region) (but correspondingly that list entries for fragments/threads belonging to different classification groups can have processing dependencies between them if they overlap in the tile sub-region).

Thus, in an embodiment, respective groups of fragments/threads can be, and in an embodiment are, identified as never having any processing order dependency between them (in respect of particular, in an embodiment selected, processing operation(s)), with the fragments/threads of such groups then being identified as such, so that the processing operation eligibility indication(s) for the processing operation(s) in question can be set accordingly.

Accordingly, in embodiments, a (each) list entry is also provided with an indication of a group (a classification) to which the fragment(s)/thread(s) represented by the list entry belong. At least in the case of colour read operations, the group (classification) indicated in a (each) list entry in an embodiment comprises a Raster Order group (a Raster Order state), and the indication of the group may accordingly comprise a Raster Order group ID (a Raster Order state ID, "ROS ID").

In an embodiment the classification is determined (assigned) for a fragment prior to generating a list entry for the fragment, in an embodiment during (or after) rasterization of the fragment(s) in question. In an embodiment, the classification is selected based on a desired order of processing of fragments after rasterization (which in an embodiment corresponds to a desired primitive processing order), such that a set of one or more (and in an embodiment plural) fragments (primitives) which are desired to be processed earlier (in the desired processing order) are assigned a (particular) classification, whereas one or more subsequent (later) sets of fragments (in the desired processing order) are assigned one or more different classifications.

In an embodiment, a single classification is indicated per list entry in a tile sub-region list. In an embodiment, the indication in a list entry of the classification of the fragment(s) represented by the list entry is set when initially generating the list entry for a group of one or more fragments (based on the fragment classification assigned to those fragment(s)). In an embodiment, the fragment classification is independent of (does not depend on) any other eligibility indication and/or any other 'should be considered for' indication and/or any other indication that may be provided in a list entry. In an embodiment, a list entry can only represent fragment(s) having the same (group) classification.

The indication of the group classification that the fragment(s)/thread(s) represented by a list entry belong to is in an embodiment used to set the appropriate (corresponding) eligibility indication, such as, and in an embodiment, the (third) eligibility information in respect of colour read operations. Setting of the relevant eligibility information, e.g. such as the (third) eligibility information in respect of colour read operations, may also be based on one or more of (and in an embodiment all of) the factors discussed above, namely:

the part of the tile sub-region that the group of fragments/execution threads for the list entry applies to (covers) (the "coverage" information for the entry);

the processing operation or operations that the group of fragments/threads for the entry are indicating as applying to (the "should be considered for" information for the entry); and the position in the desired (primitive) processing order of the primitive that the fragments/threads that the entry relates to are for.

Thus in an embodiment, the relevant eligibility information, e.g. the (third) eligibility information in respect of colour read operations, for a list entry is set based on assessment of all of these factors, i.e. whether the relevant fragment groups/threads have the same or different (group) classification, whether the relevant fragment groups/threads overlap, whether the relevant fragment groups/threads apply to (are to perform) the same processing operation(s) (for which a dependency may need to be enforced), and the relative positions of the primitives that the fragments/threads for the entries relate to in the desired primitive processing order.

In an embodiment, the relevant eligibility information, e.g. the (third) eligibility indication in respect of colour read operations, will be set to "not eligible" (e.g. thus indicating that a colour read dependency potentially arises) for an entry requiring the processing in question (e.g. a colour read) if the coverage of the entry in question overlaps the coverage of an (any) earlier list entry representing fragment(s)/thread(s) requiring that processing operation and having a different group classification to the entry in question. (Whereas, the presence of an earlier entry in the list having the same fragment(s)/thread(s) group classification as the entry being considered will not be considered to give rise to a processing operation, e.g. colour read, dependency, and therefore will not cause the relevant, e.g. (third), eligibility indication to be set to "not eligible", regardless of whether or not the coverage of the earlier entry overlaps with the entry in question).

Conversely, the relevant eligibility information, e.g. the (third) eligibility indication in respect of colour read operations, of a list entry still to perform the processing operation in question (e.g. a colour read) is in an embodiment set to "eligible" (thus indicating that no, e.g. colour read, dependency arises) when the coverage of the group of fragments/threads for the list entry does not overlap with the coverage of a group of fragments/threads for another (any other)

earlier list entry having a different group classification and that is still to perform the processing operation in question, e.g. a colour read.

It will be appreciated in this regard that plural overlapping list entries can be (simultaneously) marked as eligible to perform the processing operation in question, e.g. colour buffer read operations, if they all belong to the same group classification.

As noted above, whether or not an entry is still to perform colour processing may be indicated by the (first) 'should be considered for' indication (in respect of colour buffer accesses generally) (which may accordingly be used when setting the (third) eligibility information in respect of colour buffer read operations).

Alternatively, as noted above, a separate 'should be considered for' indication in respect of colour buffer reads could be provided for a (each) list entry (and could instead be used when setting the (third) eligibility information in respect of colour buffer read (only) operations).

In embodiments, a (another separate) group classification is provided to indicate fragments/threads that require depth processing in respect of depth buffer read operations only (and do not require depth buffer writes). The (depth buffer read-only) group classification may be provided as part of a (any) list entry representing fragments/threads requiring depth buffer read-only operations.

In an embodiment, the depth buffer read-only group classification for a list entry is (e.g. a flag which is) set (e.g. to a first value, e.g. 1) if the fragments/threads represented by a list entry require depth buffer reads only (and is set to a second value, e.g. 0, or is not set, if the fragments/threads represented by that list entry (also) require depth buffer writes).

Similarly to the discussion above with regards to group classification, entries having the same depth buffer read-only group classification (and particularly indicating that depth buffer read-only processing is required, e.g. having a depth buffer read-only flag being set) will in an embodiment be permitted to perform their processing (depth buffer reads) in any order (regardless of whether the coverage of those entries overlap).

Similarly, to the discussion above, a depth buffer read-only group classification may be determined (assigned) for a fragment/thread prior to generating a list entry for the fragment/thread, e.g. based on a desired order of processing fragments, as may be enforced by e.g. an upstream processing stage. The depth buffer read-only group classification may be set (to indicate that depth buffer read-only processing is required) only for fragments/quads that will be represented by one or more entries at the head of a tile sub-region list (so as to guarantee that no earlier list entries can exist which require depth buffer writes).

In an embodiment, when adding a new entry to a list, for those fragments/threads requiring depth buffer reads only (e.g. having a depth buffer read-only flag being set), the (second) eligibility indication for depth processing will be set to be 'eligible'. Likewise, in an embodiment, when updating the (second) depth processing eligibility information for entries in a list, an (any) entry having a group classification indicating that it requires depth buffer reads only, will remain indicating that depth processing is 'eligible' to be performed (regardless of the coverage of that entry).

However, in an embodiment, the coverage of entries requiring depth processing read-only will still be considered when setting/updating the eligibility information for entries requiring depth processing writes (e.g. not having a depth buffer read-only flag being set). This can assist with enforcing write-after-read ordering dependencies. Therefore, when the (second) eligibility information in respect of depth processing is updated (e.g. during a scanning operation), the coverage of entries requiring depth processing read-only (and for which depth processing 'is to be considered') will still be considered (e.g. and will still be accumulated into the accumulated coverage for the purposes of setting depth processing eligibility information).

For list entries representing threads/fragments that require depth writes (e.g. not having a depth buffer read-only flag being set), the (second) eligibility information in respect of depth processing should be, and is in an embodiment, set in the manner described herein, i.e. based on the 'should be considered for' indication in respect of depth processing, the coverage of the entry in question and the coverage of the earlier entries in the list that are to be considered for depth processing.

The maintaining and updating of the sub-region fragment lists, for example, and in an embodiment, to add entries to or remove entries from the lists, and to set (and update) the eligibility information and "should be considered for" information, etc., for entries in the lists, can be performed in any suitable and desired manner.

As discussed above, in an embodiment, there is an appropriate tile sub-region fragment list "management" process/circuit (a fragment dependency manager) that maintains and controls the lists, at least including adding new entries to the lists, removing entries that are no longer required from the lists, and setting the relevant eligibility information and "should be considered for" information for entries in the lists (and updating that information for entries in the lists as fragment processing is performed for entries in the lists and/or as entries are added to and removed from the lists).

As discussed above, this "fragment dependency manager" is in an embodiment part of the thread/thread group (warp) manager of the graphics processor, that controls, inter alia, the execution of execution threads for performing fragment processing in the graphics processor.

It would be possible in this regard for the tile sub-region fragment lists to be updated as and when relevant events that trigger an update to the lists occur. However, in an embodiment, the maintenance and updating of the lists is performed more as a "background" operation, e.g., and in an embodiment, as a background scanning-type operation. In this case, as discussed above, the lists in an embodiment have associated with them appropriate indications (e.g. flags), to indicate when a list needs to be "scanned" to determine whether an update needs to be made to a list, such that the background scanning operation/circuit can determine when and which lists currently need to be "scanned".

Other arrangements for maintaining the sub-region fragment lists would, of course, be possible.

Once the rasteriser has rasterised primitives for a tile to fragments, the fragments for the primitives for the tile can, and in an embodiment do, undergo the appropriate fragment processing to render the fragments and generate rendered fragment data for the tile in question. The fragment processing can, and in an embodiment does, comprise any suitable and desired processing that fragments can undergo in graphics processing, such as, and in an embodiment, one or more of: and in an embodiment all of, colour shading, depth processing, blending, texturing, depth and/or stencil testing, etc., as desired.

In the technology described herein, the processing of fragments falling within a tile sub-region is controlled based on the information in the list entries for the sub-region indicating which part of the sub-region the fragments for the entries apply to and the information indicating whether one or more processing operations are eligible to be performed for fragments represented by entries in the list (and, in an embodiment, are not yet completed).

The processing of fragments falling within a sub-region of a tile may be controlled based on the information in the list entries for the sub-region indicating which part of the sub-region the fragments for the list entries apply to and the information indicating whether one or more processing operations to be performed for fragments represented by entries in the list are eligible to be performed in any suitable and desired manner.

In an embodiment, the processing of fragments falling within a sub-region of a tile is controlled by using the information in the list entries for the sub-region indicating which part of the sub-region the groups of fragments for respective list entries apply to, to set the eligibility information for the list entries (as discussed above), and using the eligibility information indicating whether one or more processing operations are eligible to be performed for fragments represented by entries in the list, to permit (allow) (or prevent) the respective processing operation(s) to which the eligibility information relates to be performed for the group of fragments for a list entry.

Thus, in an embodiment, the processing of fragments falling within a tile sub-region will be controlled based on the "coverage" and "eligibility" information in the list entries, by using the "coverage" information (at least in part) to set the "eligibility" information for the list entries, and then using the "eligibility" information for the list entries to permit processing operation(s) to be performed for the fragment groups for respective list entries or not.

Correspondingly, the fragment dependency list managing circuit and the control circuit are in an embodiment configured to control the processing of fragments to be processed for a sub-region of a tile based on the information in a list indicative of fragments that are to be processed for the sub-region of the tile indicating which part of the sub-region fragments that entries in the list represent apply to and the information indicating whether one or more processing operations are eligible to be performed for fragments that entries in the list represent by the fragment dependency manager using the information in the list entries for the sub-region indicating which part of the sub-region the groups of fragments for respective list entries apply to, to set the eligibility information for the list entries, and the control circuit using the eligibility information indicating whether one or more processing operations are eligible to be performed for fragments represented by entries in the list, to permit (allow) (or prevent) the respective processing operation(s) to which the eligibility information relates to be performed for the group of fragments for a list entry.

Thus, in an embodiment, the fragment dependency manager is configured to use the information in the list entries for the sub-region indicating which part of the sub-region the groups of fragments for respective list entries apply to, to set the eligibility information for the list entries.

Correspondingly, in an embodiment, the control circuit is configured to use the eligibility information indicating whether one or more processing operations are eligible to be performed for fragments represented by entries in the list, to permit (allow) (or prevent) the respective processing operation(s) to which the eligibility information relates to be performed for the group of fragments for a list entry.

In an embodiment, the controlling of the processing of fragments falling within a tile sub-region is performed such that a processing operation (for which eligibility information is provided) will only be performed for a group of fragments corresponding to a list entry when the corresponding eligibility information indicates that that processing operation is eligible to be performed for the group of fragments (for the list entry) in question.

Thus, in an embodiment, unless and until the eligibility indication for a list entry indicates that the processing operation(s) to which the eligibility indication relates is eligible to be performed for the group of fragments to which the list entry relates, the processing operation(s) in question will not be, and will be prevented from being, performed for the group of fragments to which the list entry relates.

It would be possible in this regard to prevent any and all desired processing operations from being performed for fragments represented by a list entry unless and until all the eligibility information for the list entry indicates that all the processing operations for which eligibility information is provided are eligible to be performed (i.e. such that any indication for a list entry of an operation not being eligible to be performed will prevent all other operations (at least for which eligibility information is provided) from being performed). In an embodiment, that is the case.

However, in an embodiment, where there are plural eligibility indications provided (each in respect of a different set of one or more processing operations), then in an embodiment the controlling of the processing of the fragments is performed for the respective sets of one or more processing operations separately, based on the corresponding eligibility information. This will then allow at least some processing to be performed for a group of fragments where the group of fragments is eligible for that processing, even if the group of fragments may not be eligible for other processing yet.

For example, where separate eligibility indications are provided for operations that access the colour buffer (colour shading) and operations that access the depth buffer (depth processing), then in an embodiment the performing of operations that access the colour buffer is controlled based on the eligibility indication(s) for "colour buffer" operations, but the performing of operations that access the depth buffer is controlled (separately) based on the eligibility indication for "depth buffer" operations.

In embodiments where separate eligibility indications are provided for colour buffer writes and for operations that only read colour, then in an embodiment the performing of colour write and read operations is controlled based on the respective colour operation eligibility indication.

The permitting or preventing of processing operations for fragments based on the eligibility information in the list entries for the tile sub-regions can be performed in any suitable and desired manner.

It should be noted here that when the eligibility indication for a list entry indicates that a processing operation(s) is eligible to be performed for the group of fragments to which the list entry relates, that need not, and does not necessarily, trigger the immediate performing of the relevant processing operation(s) for the group of fragments in question (although it can be used as a trigger for that). Rather, it is in an embodiment used to permit the relevant processing operation(s) to be performed for the group of fragments for the list entry in question as and when the processing operation(s) in question fall to be performed for the group of fragments in question in the normal manner.

Correspondingly, when the eligibility indication for a list entry indicates that a processing operation(s) is not eligible to be performed for the group of fragments to which the list entry relates, then that indication should be, and is in an embodiment, used to prevent the relevant processing operation(s) being performed for the group of fragments for the list entry in question as and when (and even when) the processing operation(s) in question fall to be performed for the group of fragments in question in the normal manner.

In an embodiment, fragments are issued for processing in the order that they are generated by the rasteriser (and thus in the order that the rasteriser receives primitives for rendering), but with the relevant list entries then being checked for respective fragments as and when those fragments fall to undergo a processing operation(s) for which eligibility information is included in the sub-region fragment list entries, with the relevant fragment processing then either being permitted to proceed, or the fragment processing being stalled appropriately, based on whether the particular processing operation is eligible to be performed for the fragment(s) in question or not.

Thus in this case, and in an embodiment, where fragments are processed by issuing respective execution threads that will perform fragment shading operations for the fragments, respective execution threads may be issued for fragments as they are issued by the rasteriser and fall to be processed, but then the fragment shading execution (fragment shader execution) will be appropriately stalled unless and until the fragment(s) (execution thread(s)) in question is or are indicated as being eligible to perform the relevant processing operation(s).

This may be and is particularly applicable in the case where the tile sub-region lists list, as discussed above, sets of execution threads corresponding to fragments to be processed. In this case, the eligibility information for the entries corresponding to execution threads to be/being executed can be, and is in an embodiment, used to control the execution of the execution threads in question (to thereby perform the desired fragment processing for the corresponding fragments).

Thus, for example, and in an embodiment, an execution thread may be issued for a fragment, with that execution thread beginning execution of a shader program to perform the desired fragment processing, but when the shader program is to perform, for example, an operation for which an eligibility indication is provided, such as a write to the colour buffer, the shader program execution will be controlled based on, and in accordance with, the relevant eligibility indication for the fragment in question (for the list entry in question), either to continue the shader program execution to perform the operation (e.g. colour writing), or stall the shader program execution for the fragment(s) in question until they are eligible to perform the operation (e.g. colour writing).

This operation may be achieved in any suitable and desired manner.

In an embodiment, execution threads, and in an embodiment groups of plural execution threads to be processed together (warps), that are created for performing the desired fragment processing for fragments to be rendered have associated with them appropriate dependency state indications for respective processing operations corresponding to the processing operation eligibility indications that are stored for the sub-tile list entries, with the corresponding dependency state indications for the threads (e.g., and in an embodiment, for the thread groups (warps)), being set (in an embodiment) when the threads/warps are created) based on the state of the processing operation eligibility indications for the list entry for the fragment/threads in question, and then being updated as and when the corresponding eligibility indications in the list entries change.

Thus, for example, for a list entry that is indicated as not being eligible to perform colour write operations, the corresponding execution threads (e.g., and in an embodiment, the corresponding thread group (warp) for that entry) will have a colour write dependency indication set to indicate that the threads in question (the thread group (warp) in question) has a colour write dependency and so is not currently eligible to perform colour write operations.

Then, when a processing operation for which eligibility information is provided is to be performed for an execution thread, the corresponding dependency state for the execution thread (e.g., and in an embodiment, for the thread group (warp) that the execution thread belongs to) may be, and is in an embodiment, checked to determine whether the execution thread can be permitted to proceed with the operation in question.

In an embodiment, in particular where the dependency state is set and indicated for thread group (warps) as a whole, the dependency state can, and in an embodiment does, include a dependency count, which in an embodiment indicates how many sub-groups of threads, e.g. thread quads, within the overall thread group (warp) have the relevant processing operation dependency, which dependency count can be set and updated accordingly as respective sub-sets of threads (e.g. thread quads) within an overall thread group (warp) become eligible for performing the processing operation in question. Thus, for example, and in an embodiment, a thread group (warp) will be permitted to proceed with the processing operation in question when its dependency count for that processing operation is zero, but not permitted to proceed with the processing operation in question when its dependency count is greater than zero.

Thus in an embodiment, the dependency state that is provided for threads/thread groups (warps) may comprise an indicator that the thread/thread group (warp) has the dependency in question, and/or a dependency count for the processing operation in question.

Other arrangements would, of course, be possible.

To facilitate this operation, in an embodiment particular, and in an embodiment selected, shader program instructions, relating to operations for which eligibility indications are provided (such as operations that access (e.g. read and/or update) the colour or depth buffer), are indicated as being guarded by a dependency (the compiler may insert such indications when compiling the shader program), such that when such a "dependency guarded" instruction is encountered, that triggers the appropriate checking of the dependency state information for the execution thread in question, with the instruction execution then either being allowed to proceed or being stalled before execution of the dependency guarded instruction, as appropriate. A "guarded" flag could be provided on the instruction preceding the instruction that performs the processing operation, for example. A "guarded" flag on a preceding instruction may be used to trigger checking of the eligibility indication for processing operation for a next instruction before fetching and decoding the next instruction (so as to avoid fetching and decoding instructions which are not yet eligible to be performed).

Thus in an embodiment, the processing operation eligibility indications for list entries are used to set corresponding thread, and in an embodiment thread group (warp), dependency state indications for threads (thread groups) corresponding to list entries, which thread dependency state indications are then used to control (and in particular to permit or prevent) the execution of particular shader program instructions by the execution threads. The thread/thread group dependency state indications are accordingly in an embodiment set based on, and in accordance with, the processing operation eligibility indications for the list entries.

In an embodiment, there is an appropriate thread group scheduler that is operable to schedule execution threads and thread groups for execution, and that operates to check the relevant dependency state information for threads to determine when threads can be released for and sent for execution. This thread group scheduler in an embodiment also sets the threads/thread group dependency state indications and updates them (in particular to clear them when there is no longer a dependency), e.g., and in an embodiment, in response to appropriate signals from the fragment dependency list managing circuit indicative of the dependency state for the threads/thread group in question.

Other arrangements would, of course, be possible.

In an embodiment, a pool of execution threads awaiting processing can be, and is in an embodiment maintained, with execution threads being added to the pool when they are created, and when their relevant processing needs to be stalled, and released appropriately from the pool for processing based on their processing operation dependency state. In this case, the thread group scheduler in an embodiment schedules threads from the pool for execution, and can check the relevant thread/thread group processing operation dependency state of threads/thread groups in the pool, to determine when threads in the pool can be released and sent for execution.

Other arrangements would, of course, be possible.

In alternative embodiments, where it is possible to issue fragments/execution threads for processing for smaller "units" of processing, then in an embodiment fragments are issued for the appropriate sequences of processing based on the relevant eligibility information. Thus, for example, a fragment may be issued to undergo processing, and undergo processing, that does not access the colour or depth buffers (and that can be performed in any order in relation to colour and depth buffer accesses), but when the fragment is to undergo operations that include colour or depth processing, the relevant eligibility information for the fragment will be checked to determine when and if the fragment can be issued for that processing.

Thus, in this case, respective different execution threads will be issued for performing subsets of the fragment processing operations to be performed for fragments, based on, and in accordance with, the eligibility information for the fragments (rather than stalling the execution of already existing execution threads based on the eligibility information for fragments).

Other arrangements would, of course, be possible.

As will be appreciated, the technology described herein has been described above primarily with reference to the processing of a single tile of a render output, but as discussed above, the operation in the manner of the technology described herein is in an embodiment performed appropriately for plural tiles of a render output, and in an embodiment for each and every tile of a render output that is being generated. Correspondingly, the operation in the manner of the technology described herein is in an embodiment performed for plural, in an embodiment for any and all, render outputs being generated, such as, and in an embodiment, for a sequence of render outputs, such as a sequence of frames being generated.

Subject to the particular operation in the manner of the technology described herein in relation to controlling the processing of fragments, the graphics processor and graphics processing pipeline that the graphics processor executes can otherwise operate in any suitable and desired manner, for example, and in an embodiment, in the normal manner for the graphics processor and graphics processing pipeline in question. Thus the graphics processor will otherwise render each rendering tile in the set of rendering tiles for a given render output, and output the respective rendering tiles (e.g. to a frame buffer in memory) for subsequent use (e.g. for display).

In an embodiment, each rendering tile is processed and rendered separately, i.e. the separate, individual tiles are rendered one by one (i.e. on at tile-by-tile basis). This rendering can be carried out in any desired manner, for example, by rendering the individual tiles in succession or in a parallel fashion, and storing the output for each tile, e.g., in the frame buffer (in (the) memory), e.g. for display.

Correspondingly, although the above has described in particular the relevant features, elements, etc., of the graphics processor and its operation that are in particular relevant to the operation in the manner of the technology described herein, it will be appreciated that the graphics processor and the graphics processing pipeline that the graphics processor executes may, and in an embodiment does, otherwise include any other suitable and desired processing circuits, processing stages, processing logic, components and elements, that a graphics processor and graphics processing pipeline may include, as appropriate.

Unless otherwise indicated, these processes can, and in an embodiment do, operate in the normal manner for the graphics processor and graphics processing pipeline in question.

Thus, for example, and in an embodiment, the graphics processor and graphics processing pipeline in an embodiment includes, and in an embodiment performs, a tiling operation to sort primitives for processing for a render output into respective render output regions, a rasteriser/rasterisation process for rasterising primitives to generate graphics fragments to be processed for rendering tiles, and a renderer/rendering process for rendering graphics fragments so as to generate rendered output data for (tiles of) a render output.

The tiling process/circuit (a tiler) should be, and is in an embodiment, operable to and configured to sort primitives for processing for a render output into respective render output regions and to thereby prepare appropriate lists of primitives (primitive lists) listing primitives to be rendered for the respective regions of the render output. The graphics processor and graphics processing pipeline that the graphics processor executes may, and in an embodiment does, correspondingly include an appropriate primitive assembly stage/circuit, and a vertex shading stage/circuit, to, inter alia, facilitate the tiling process.

Correspondingly, the graphics processor and graphics processing pipeline in an embodiment includes an appropriate primitive list reader that is operable to read primitive lists prepared by the tiler to identify primitives to be processed for a respective rendering tile, and to provide the primitives to be processed for a rendering tile to, inter alia, a rasteriser, for rasterising.

The graphics processor and graphics processing pipeline may, and in an embodiment does, correspondingly include an appropriate primitive (triangle) setup stage/circuit operable to and configured to generate appropriate primitive data for providing to the rasteriser/rasterisation process and the renderer/rendering process.

The rasteriser/rasterisation process should be, and is in an embodiment, operable to and configured to rasterise input primitives to generate graphics fragments to be rendered. As discussed above, each graphics fragment that is generated by the rasteriser should, and in an embodiment does, have associated with it a group of one or more sampling positions of the render output, and may be used to generate rendered graphics data for one or more of the sampling positions of the sampling positions associated with the fragment.

The rasteriser/rasterisation process may be configured to generate fragments for rendering in any suitable and desired manner. It may, e.g., receive primitives to be rasterised, test those primitives against (groups of) sampling positions of the render output, and generate fragments representing the primitives accordingly.

The fragments generated by the rasteriser will be provided to the rendering process/circuit (the renderer) to generate rendered fragment data for (covered) sampling positions that the fragments represent. The rendering process may, and in an embodiment does, derive the data, such as red, green and blue (RGB) colour values and an "a" (transparency) value, necessary to represent the primitive in question at the sampling positions (i.e. to "shade" each sampling position).

The renderer/rendering process should be, and is in an embodiment, operable to render (shade) graphics fragments it receives to generate output graphics fragment data. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc.

In an embodiment the renderer comprises a fragment shader (a shader pipeline) (i.e. a programmable pipeline stage that is operable to and can be programmed to carry out fragment shading programs on fragments in order to render them). As discussed above, this may, and in an embodiment does, include both colour shading and depth processing.

The graphics processor and graphics processing pipeline may, and in an embodiment does, also include one or more, and in an embodiment plural, culling testing stages/circuits, such as, and in an embodiment, one or more of an early depth and/or stencil (ZS) tester, and a late depth (Z) and/or stencil (S) tester.

The graphics processor and graphics processing pipeline should, and in an embodiment does, also include an appropriate tile buffer to which rendered fragment data (including both colour and depth data) for a tile can be stored while the tile is being processed, and from which the rendered fragment data for a rendering tile can be, and is in an embodiment, written out to other storage, such as a frame buffer in external memory, for use. The graphics processor and graphics processing pipeline may also include a downsampling stage/circuit for downsampling data that is written out from the tile buffer, if desired.

A (and each) processing stage (circuit) of the graphics processor and graphics processing pipeline can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling (shader) programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. (shader) programs) for performing the processes described herein. The graphics processor may also be in communication with a host microprocessor, and/or with a display for displaying images based on the data generated by the graphics processor.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The technology described herein and present embodiments relate to computer graphics processing.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline 10.

The graphics processing pipeline 10 shown in FIG. 1 is a tile-based renderer and will thus produce tiles of a render output data array, such as an output frame to be generated.

FIG. 1 shows the main elements and pipeline stages of the graphics processing pipeline. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuits/circuitry, processing logic, etc., for performing the necessary operation and functions.

The graphics processing pipeline 10 shown in FIG. 1 includes a number of stages, including vertex shader 200, a hull shader 201, a tesselator 202, a domain shader 203, a geometry shader 204, a tiler 205, a primitive list reader 80, a rasteriser 206, an early Z (depth) and stencil test stage 207, a renderer in the form of a fragment shading stage 208, a late Z (depth) and stencil test stage 209, a blending stage 210, a tile buffer 211 and a downsampling and writeout (multi-sample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline 1.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

The hull shader 201 performs operations on sets of patch control points and generates additional data known as patch constants. The tessellation stage 202 subdivides geometry to create higher-order representations of the hull, and the domain shader 203 performs operations on vertices output by the tessellation stage (similar to a vertex shader). The geometry shader 204 may (if run) generate primitives such as triangles, points or lines for processing.

Once all the primitives to be rendered have been appropriately processed, e.g. transformed, and/or, e.g., generated by the geometry shader, the tiler 205 then determines which primitives need to be processed for the tiles that the render output has been divided into for processing purposes. To do this, the tiler 205 compares the location of each primitive to be processed with the tile positions (e.g.), and adds the primitive to a respective primitive list applying to a tile that it determines the primitive could (potentially) fall within. Any suitable and desired technique for sorting and binning primitives into primitive lists, such as exact binning, or bounding box binning or anything in between, can be used for the tiling process.

Once the tiler has completed the preparation of the primitive lists, then each tile can be rendered.

To do this, each tile is processed by the graphics processing pipeline stages shown in FIG. 1 that follow the tiler 205.

Thus, when a given tile is being processed, each primitive that is to be processed for that tile (that is listed in a primitive list applying to that tile) is passed to the rasteriser 206 by a primitive list reader 80.

The rasterisation stage 206 of the graphics processing pipeline 10 operates to rasterise the primitives into individual graphics fragments for processing.

To do this, the rasteriser 206, particularly a primitive set-up stage 81 of the rasteriser 206, operates to determine, from the vertex shaded vertices provided to the primitive set-up stage 81, edge information representing each primitive edge of a primitive to be rasterised. This edge information is then passed to a rasterisation stage 82 of the rasteriser 206, which rasterises the primitive to sampling positions and generates graphics fragments having appropriate positions (representing appropriate sampling positions) for rendering the primitive. Each graphics fragment will, as discussed above, represent a set of one or more sampling positions of the render output being generated.

The rasteriser 206 also associates with each fragment a coverage mask in the form of a bitmap that indicates, for each sample position of the set of sample positions that is associated with the fragment, whether that sample position is covered by the primitive in question (i.e., in effect, whether the fragment is being used to render that sampling point (i.e. whether its data should be stored for that sampling point)).

(It will be appreciated that although FIG. 1 shows the primitive set-up stage 81 being part of a single rasterisation unit (the rasteriser 206 of FIG. 1), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader), and so is executed by and on an appropriate processing core (shader core).

There is then a "late" fragment Z and stencil test stage 209, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late Z and stencil test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 as rendered fragment data, from where the rendered fragment data can be written out to memory, for example, be output to a frame buffer 213 for display. The depth value for an output fragment is also written appropriately to a Z-buffer within the tile buffer 211. (The tile buffer stores colour and depth buffers that store an appropriate colour, etc., or Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 211 is input to a downsampling (multisample resolve) writeout unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile can be processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The graphics processing pipeline as illustrated in FIG. 1 will be executed on and implemented by an appropriate graphics processing unit (GPU) (graphics processor) that includes the necessary functional units, processing circuits/circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Figure 2:
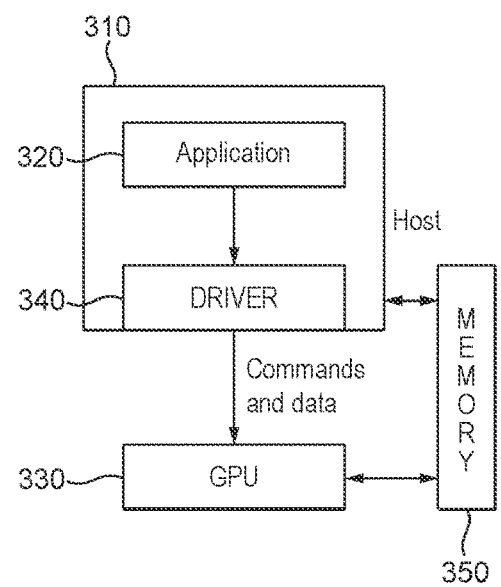
FIG. 2 illustrates schematically a computer graphics processing system.

Accordingly, as shown in FIG. 2 (which shows a typical computer graphics processing system), an application 320, such as a game, executing on a host processor 310 that requires graphics processing operations to be performed by an associated graphics processing unit (GPU) (graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320. To facilitate this, a set of instructions will be provided to the graphics processor 330 in response to instructions from the application 320 running on the host system 310 for graphics output (e.g. to generate a frame to be displayed).

The system will also include appropriate memory 350, that is accessible, inter alia, to the host (CPU) 310 and GPU 330.

It is assumed that in the present embodiments, the graphics processor is operable to perform, and supports, so-called Variable Rate Shading (VRS).

Variable rate shading (VRS) is a technique that allows different shading rates to be used to render a render output, i.e. such that a single colour (set of colour value data) can be sampled (rendered) for one of plural possible different sized areas in a render output. For example, a single colour may be sampled (from a single fragment) for an area of the render output corresponding to only a single output pixel, or a single colour (from a single fragment) may be sampled for an area of the render output corresponding to each pixel in a block of plural output pixels.

Sampling (rendering) a single colour and applying it to plural sampling positions will reduce the processing effort required for those sampling positions, as compared to sampling an individual colour for each sampling position, but will usually come at the expense of reduced image quality.

In Variable Rate Shading (VRS), there will typically be a set of plural possible shading rates that a graphics processor supports and is able to use. That is, there will typically be a set of plural possible different sized render output areas that a single colour (set of colour value data) can be sampled for (from a single fragment). The smallest possible of these render output areas may be referred to as a "fine pixel", and the other, larger render output areas may be referred to as "coarse pixels". Likewise, a (single) fragment which is sampled for the smallest render output area may be referred to as a "fine fragment" and a (single) fragment which is sampled for other, larger, render output areas may be referred to as a "coarse fragment".

Each "fine pixel" will typically be (each "fine fragment" will typically be rendered for) an area of the render output the same size and location as a pixel of the output display device. However, it is also possible for each "fine pixel" ("fine fragment") to effectively correspond to less than one pixel of the output display device, for example where downsampling is to be applied.

The area of each possible "coarse pixel" typically corresponds to (each "coarse fragment" will typically be rendered for an area of the render output which corresponds to) a block of plural "fine pixels" (such that each "coarse fragment" is rendered for an area that same size as the area rendered for a block of plural "fine fragments"). The different possible shading rates are then referred to in terms of the number of fine pixels (fine fragments) that the shading rate corresponds to. For example, a 1×1 shading rate will signify the finest possible shading mode in which a single colour should be sampled for a single fine pixel (a single fine fragment), whereas a 2×2 shading rate will signify that a single colour should be sampled for an area corresponding to a block of 2×2 fine pixels (2×2 fine fragments). A graphics processor may typically support 1×1, 1×2, 2×1, 2×2, 2×4, 4×2 and 4×4 shading rates, for example.

Figure 3:
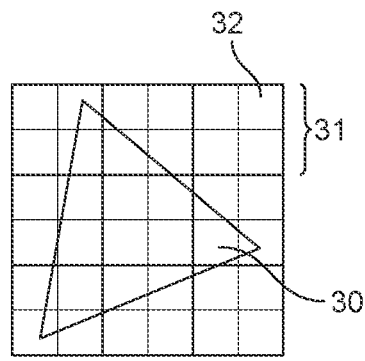
FIGS. 3, 4A and 4B illustrate variable rate shading (VRS)

FIG. 3 illustrates a comparison of an exemplary primitive 30 being rendered using 1×1 and 2×2 shading rates. FIG. 3 shows the location of the exemplary primitive 30 to be rendered relative to a 6×6 block of fine pixels 32. Each small square represents one of the fine pixels of the "variable rate shading" (VRS) process.

In the case of a 1×1 shading rate, the rendering process samples (renders) a single colour (set of colour value data) for each fine pixel that a primitive covers (and a corresponding "fine fragment" is rendered to produce each "fine pixel"). In this case, the primitive 30 is visible in (covers) 23 out of the 36 illustrated fine pixels 32, and so the rendering process will sample a total of 23 colours (sets of colour value data) (a total of 23 "fine fragments" will be rendered).

Each larger square 31 in FIG. 3 represents one coarse pixel that is used in the 2×2 shading rate process. Each coarse pixel encompasses a block of 2×2 fine pixels 32. In this case, the rendering process samples (renders) a single colour (set of colour value data) for each such coarse pixel 31 that a primitive covers (and a single "coarse fragment" is rendered to produce each "coarse pixel"). In this case, the primitive 30 covers 8 out of the 9 illustrated coarse pixels, and so the rendering process will sample only 8 colours (sets of colour values) (a total of 8 "coarse fragments" will be rendered).

Thus, it will be appreciated that a coarser shading rate is associated with a lower density of rendered colours (fewer fragments being rendered) as compared to a finer shading rate. Moreover, it will be appreciated that rendering the primitive 30 using a coarser shading rate will reduce processing requirements, as compared to rendering the primitive 30 using a finer shading rate. However, this will typically come at the expense of reduced image quality.

Variable Rate Shading (VRS) allows an application to select a shading rate, which means that groups of fine pixels (1×1, 1×2, 2×1, 2×2, 2×4, 4×2 or 4×4) are shaded once (as a single "coarse fragment") and the colour value is broadcast to all covered pixels in the "coarse pixel". This saves computational effort at the cost of some visual degradation. It is possible to only support the 1×1, 1×2, 2×1 and 2×2 shading rates. 4×2, 2×4 and 4×4 shading rates may be optional.

Figure 4A:
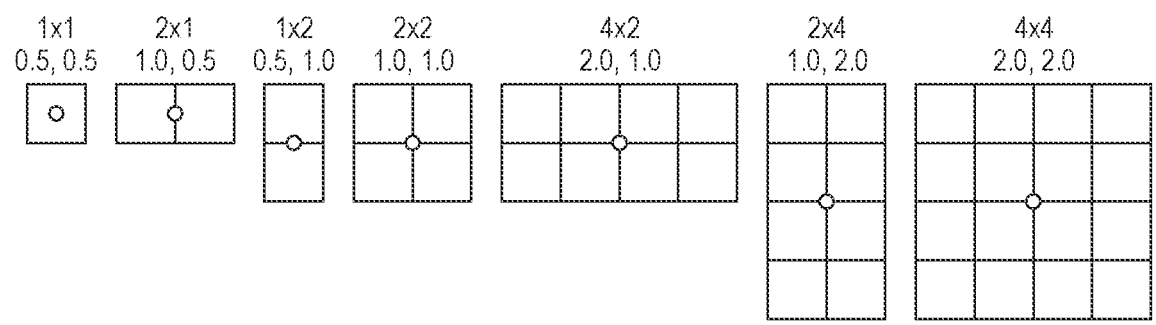

An effect of variable rate shading (VRS) is that fragments (and their corresponding execution threads) can have a variable screen space footprint. In VRS, shading can be done at a coarser granularity, which means that a single fragment (and execution thread) can be issued for several covered output pixels (where the output of this thread is broadcast to all covered sampling positions, i.e. to multiple pixels in the output render target). FIG. 4A shows various possible fragment sizes (and the corresponding position where the colour sample for the fragment is taken) when using different variable shading rates.

Moreover, in VRS, the shading rate can be varied per-drawcall, per-screen space location and per-primitive. The shading rate can also or instead be varied based on one or more other properties. This means that it is possible for primitives at the same location to have different shading rates. Thus, with VRS, on a particular fragment position, there may be fragments with different screen space footprints.

Figure 4B:
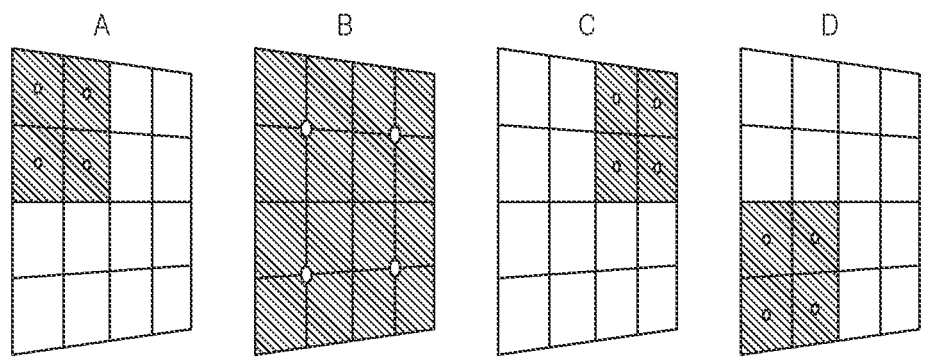

This is illustrated by FIG. 4B. FIG. 4B shows a sequence of fragment quads for processing in respect of a 2×2 patch of fragment quad positions. In particular, FIG. 4B shows a first quad of "fine fragments" (A) for a first primitive, followed by a quad of 2×2 "coarse fragments" (B) for a second, overlapping primitive, then a second quad of "fine fragments" (C) for a third primitive, and a third quad of "fine fragments" (D), e.g. also for the third primitive. In FIG. 4, the first quad of "fine fragments" (A) is the oldest. The quad of 2×2 "coarse fragments" (B) depends on the first quad of "fine fragments" (A) since it has overlapping coverage. The second quad of "fine fragments" (C) depends on the quad of 2×2 "coarse fragments" (B) since it has overlapping coverage. The third quad of "fine fragments" (D) does not depend on the second quad of "fine fragments" (C), but it does depend on the quad of 2×2 "coarse fragments" (B).

As discussed above, the technology described herein and the present embodiments relate in particular to mechanisms for ensuring that fragments from respective primitives to be rendered for a tile of a render output perform particular processing operations in the desired order (i.e. a mechanism for enforcing processing order dependencies between fragments to be processed for a tile). Such processing order dependencies may arise, for example, because it is necessary to process the fragments from respective different primitives in a particular primitive order (which will usually be the order in which the primitives are issued for processing), and may relate, for example, and in particular, to processing operations that access the colour and depth buffers in the tile buffer for a tile that is being rendered (such as for updates (writes) to the colour and/or depth buffers for a tile, and/or for reads of the colour buffer, for example).

In the present embodiment, such processing order dependencies are determined and enforced (where appropriate) by maintaining for each of plural sub-regions of a tile being rendered, a respective list indicative of fragments to be rendered for the tile sub-region in question. Each entry in a list represents a group of one or more fragments to be processed and has associated with it coverage information indicating the coverage within the tile sub-region of the group of fragments that the list entry relates to, and eligibility information indicating whether the group of fragments that the list entry relates to is currently eligible to perform a particular processing operation or operations or not. This coverage and eligibility information is used to identify potential processing order dependencies between fragments to be processed for a sub-region of a tile, and to, where appropriate, control the fragment processing such that any desired processing order dependencies are enforced.

As will be discussed in more detail below, in the present embodiments the tile sub-region lists list respective (sets of) execution threads to be executed for processing (for fragment shading) the corresponding fragments that they relate to, with the coverage information for each entry in the list indicating the coverage within the tile sub-region of the set of execution threads that the list entry relates to, and the eligibility information indicating whether the set of execution threads that the list entry relates to is currently eligible to perform a particular processing operation or operations or not. The coverage and eligibility information is then used to control the execution of the execution threads corresponding to the fragments to be processed for the tile sub-region, such that any desired processing order dependencies are enforced.

Figure 5A:
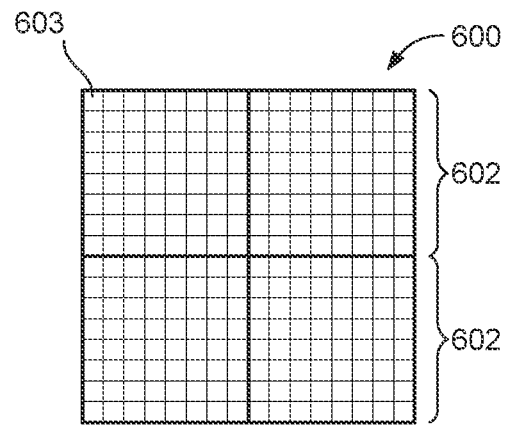
FIGS. 5A and 5B show schematically tiles of a render output divided into respective sub regions in an embodiment of the technology described herein.

FIG. 5A shows an exemplary render output 600, such as a frame to be displayed, that is divided into a 2×2 array of tiles 602 for rendering purposes. Although four tiles are shown in FIG. 5A, other suitable numbers of tiles could be used.

Figure 5B:
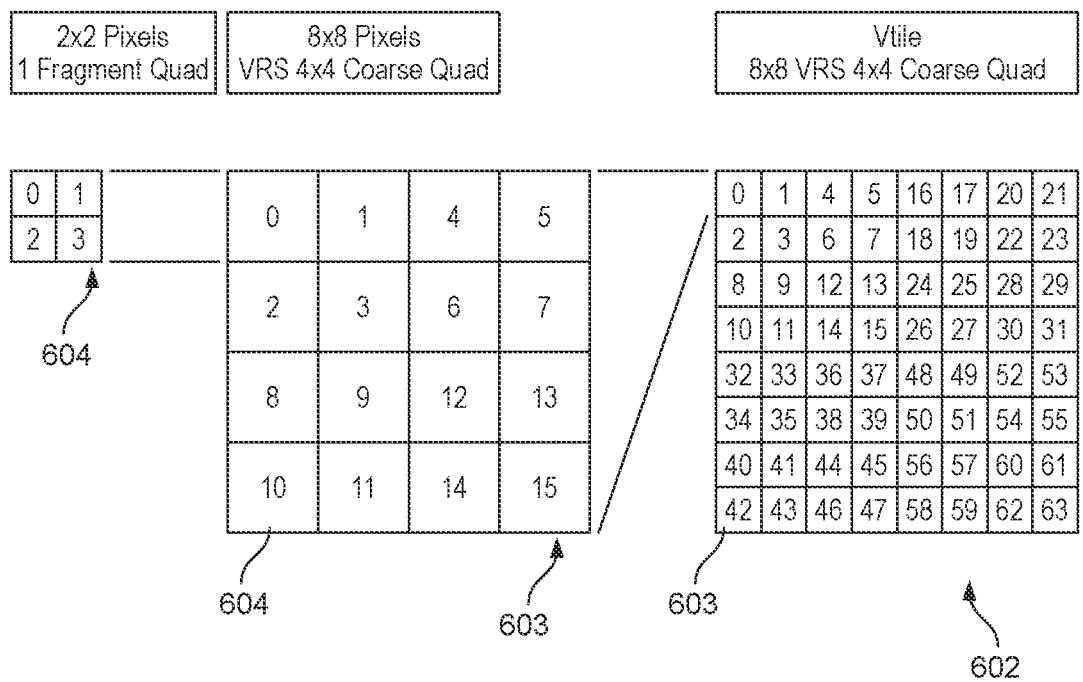

As shown in FIGS. 5A and 5B, each tile 602 in the render output 600 is divided into an 8×8 array of sub-regions 603 for fragment dependency tracking and management purposes. Each of the plurality of sub-regions 603 that a tile is divided into corresponds to a respective set of sampling positions for the tile.

In the present embodiments, it is assumed that each tile is a square of 64×64 VRS fine fragments (i.e. a square of 64×64 fine fragment positions). Each tile sub-region 603 correspondingly is a square of 8×8 VRS fine fragments (i.e. 8×8 fine fragment positions).

FIG. 5B illustrates that each tile sub-region 603 correspondingly corresponds to and has a size of 4×4 fine fragment 2×2 quads 604. As noted above, VRS may be used, with a maximum coarse fragment size of 4×4 fine fragments, in which case a tile sub-region 603 equally corresponds to and has a size of a single 4×4 coarse fragment quad. Other arrangements would, of course, be possible.

As also shown in FIG. 5B, each sub-region 603 that a tile 602 is divided into is given an index between 0 to 63 identifying the position of the sub-region within the tile. The sub-region position indices are used, as will be discussed further below, to identify the sub-region fragment lists to be used for fragments/execution threads based on the positions of the fragments/threads within the tile.

It should also be noted here that although in FIGS. 5A and 5B each tile 602 is shown as being divided into sixty-four sub-regions 603 for the purposes of fragment dependency tracking and management, it would, of course, be possible to divide the tiles into any desired number of sub-regions for this purpose.

Equally the size of the tile sub-regions may be selected as desired (e.g. in dependence upon the overall tile size, and/or the rates of variable rate shading that are supported by the graphics processor and graphics processing system in question).

In the present embodiments, the lists of fragments to be processed for the respective sub-regions of a tile are maintained as singly-linked lists, with each entry in the list representing a group of fragments to be processed for the tile sub-regions. In the present embodiments, each entry in a tile sub-region fragment list represents at least a 2×2 group (quad) of fragments to be processed for the tile sub-region in question. The fragments in the 2×2 group (quad) of fragments may be "fine fragments" or "coarse fragments" as discussed above. (As will be discussed further below, a 2×2 fragment quad is the minimum "group of fragments" that a list entry can represent in the present embodiments, but it can be possible to merge different fragment quads into the same list entry, such that a list entry may represent more than one fragment quad.)

Figure 6:
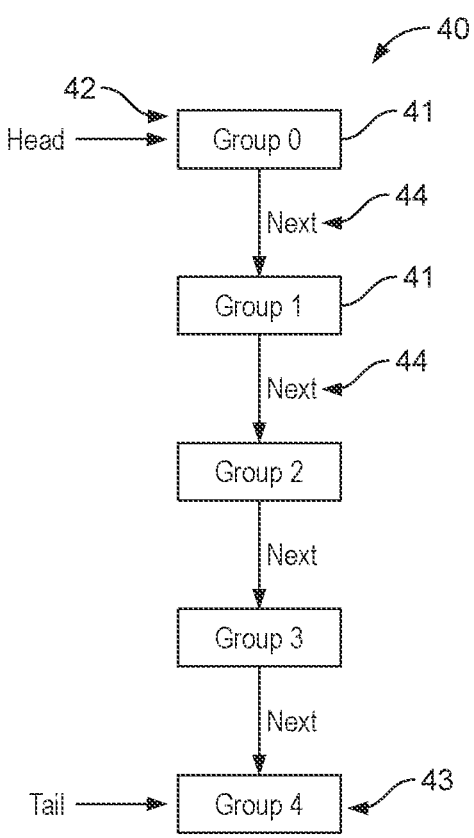
FIG. 6 shows an exemplary list of fragments to be processed for a tile sub region in an embodiment of the technology described herein.

FIG. 6 shows an exemplary singly-linked list 40 for a tile sub-region, comprising plural list entries 41, each list entry 41 representing a group of fragments to be processed for the tile sub-region. The singly-linked list 40 has a first list entry forming the head 42 of the list, and an end list entry forming a tail 43 of the list. Each list entry 41 has associated with it a pointer 44 which points to the next entry in the list (in the direction from head-to-tail of the list) (to thereby form the singly-linked list).

(Alternatively, if a doubly-linked list is used, then each list entry would have both a pointer to the next entry in the list and a pointer to the previous entry in the list.)

In the present embodiments, new list entries (corresponding to new fragment groups to be processed for a tile sub-region) are added to the tail 43 of the list. As such, the entries towards the head 42 of the list will represent "older" fragments to be processed (fragments from primitives earlier in the primitive processing order), whilst the entries towards the tail 43 of the list will represent "newer" fragments to be processed (fragments from primitives that are later in the desired primitive processing order).

FIG. 6 shows an exemplary list containing five list entries 41, but as will be appreciated by those skilled in the art, the list for a tile sub-region may contain as many entries as are required for that sub-region (e.g. depending upon the number of different fragment groups (currently) to be processed for the sub-region in question).

In the present embodiment, each entry 41 in the list for a tile sub-region, as well as containing a pointer 44 to the next entry in the list (in the direction from the head to the tail of the list), also includes other information relating to the entry.

In particular, each list entry 41 also has associated with it (includes) the identity of (an identifier for) the group of fragments that the list entry relates to. As will be discussed further below, in the present embodiments the identifier (identity) that is used for a list entry in this regard comprises an identifier (ID) for the particular quad of execution threads that are being used to perform the fragment shading for the fragments of the group of fragments that the list entry relates to. Other forms of identifier that can allow the particular fragments that a list entry relates to to be identified could, of course, be used, if desired.

Each entry 41 in the list 40 also comprises information indicating which part of the tile sub-region the group of fragments that the entry represents applies to (covers).

In the present embodiments, this coverage information comprises a coverage mask that represents the area of the tile sub-region that the list relates to, and that is set appropriately to indicate which part of the sub-region the group of fragments that the list entry relates to covers. In the present embodiments, the coverage masks for the list entries indicate the fragment coverage for the list entries at a resolution of 2×2 (fine) fragment quads. Thus each (fine) fragment quad position in the tile sub-region in question has a corresponding bit in the coverage mask that can be set to indicate whether the group of fragments for a list entry covers that (fine) fragment quad position or not.

Figure 7:
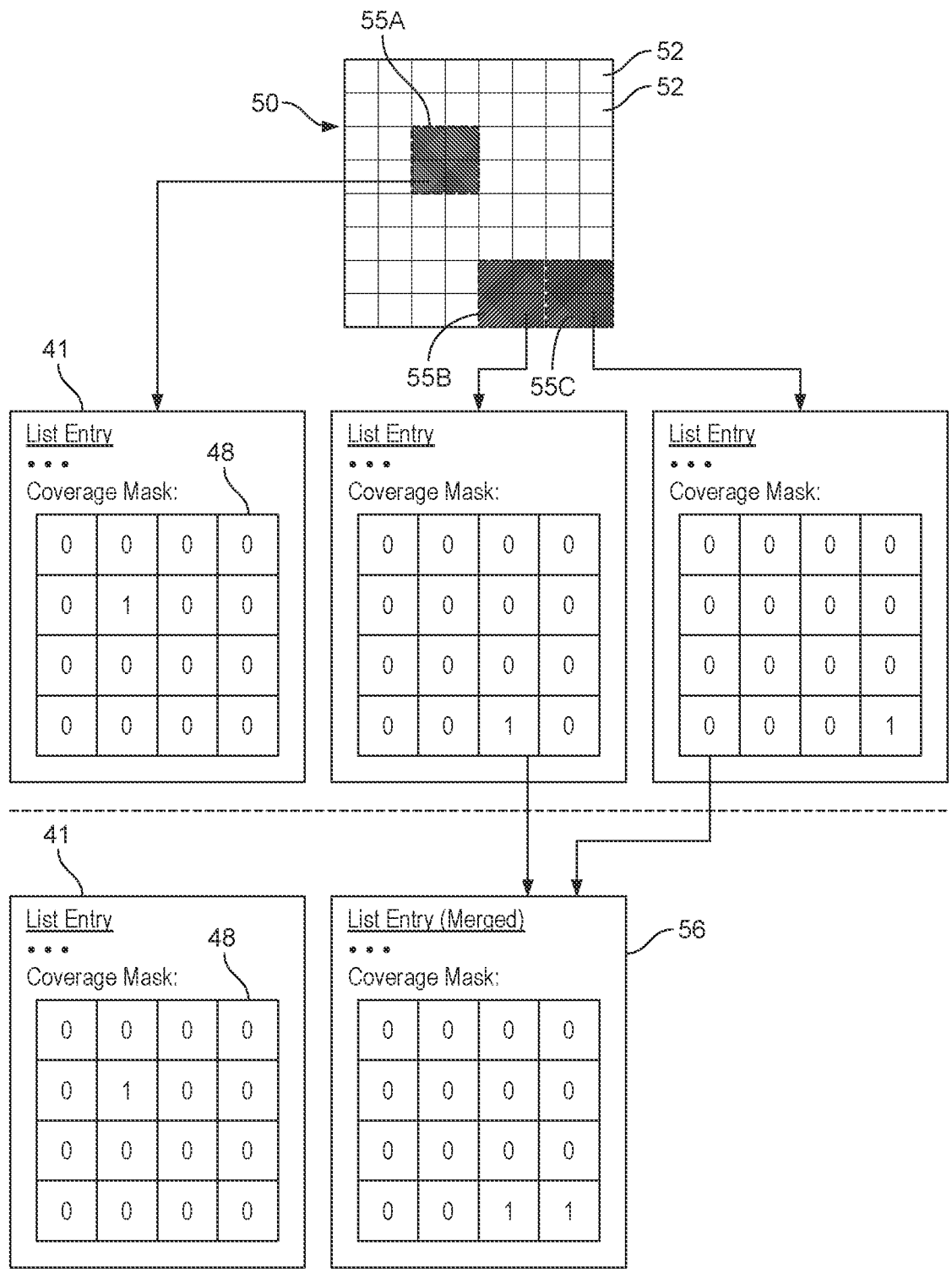
FIG. 7 shows exemplary coverage masks for fragment list entries in an embodiment of the technology described herein.

FIG. 7 illustrates this. FIG. 7 shows an exemplary tile sub-region 50 comprising 8×8 (fine) fragment positions 52. An exemplary set of (fine) fragment quads 55A, 55B, 55C to be processed for the tile sub-region 50 are also shown.

As shown in FIG. 7, each list entry 41 will have a corresponding coverage mask 48, which contains one position (entry) for each 2×2 (fine) fragment quad within the tile sub-region 51. FIG. 7 shows the corresponding coverage masks for respective fragment quads 55A, 55B and 55C.

FIG. 7 also shows the coverage mask 56 in the case where the fragment groups 55B and 55C are merged into a single list entry (this will be discussed in more detail below).

Other arrangements for the coverage information/masks would, of course, be possible.

In addition to the coverage information indicating which part of the tile sub-region the fragments represented by a list entry apply to, each list entry 41 also includes information indicating whether particular processing operations are eligible to be performed for the fragments represented by a list entry.

In the present embodiments, such processing operation eligibility information is provided separately for fragment processing operations that are to write to the colour buffer and processing operations that are to access the depth buffer. In this regard, accessing the depth buffer may include reading from and/or writing to the depth buffer.

Eligibility information is also provided for fragment processing operations which are (only) to read the colour buffer (without involving writing to the colour buffer). As discussed above, in this regard, the Applicant has recognised that using separate eligibility information for colour buffer read-only operations can help to avoid falsely enforcing dependencies for colour buffer read operations (e.g. as may occur where a group of entries need to perform colour buffer writes in a particular order, but can perform colour buffer reads in any desired order).

In particular, a separate flag is provided for each of colour buffer write accesses, depth buffer accesses, and colour buffer read-only operations, which can be set to indicate whether the list entry is currently eligible (permitted) to perform the relevant processing operation or not.

In addition to an indication of whether a list entry is eligible (is permitted) to perform particular processing operations (in the present embodiments colour buffer reads and writes and depth buffer accesses), each list entry also has associated with it information indicating whether the list entry in question is applicable to (should be taken into consideration for) processing operations for which eligibility information is provided. In the present embodiments, each list entry also has associated with it a "should be considered for" indication, separately for colour buffer accesses and depth buffer accesses (which indications can correspondingly be set to indicate whether the group of fragments that the list entry relates is applicable to colour buffer accesses and/or to depth buffer accesses, as appropriate).

In an embodiment, no additional "should be considered for" indication is provided for colour buffer read operations specifically. In this regard, only a (general) "should be considered for" colour buffer accesses indication is provided. When an entry "should be considered for" colour buffer accesses, read operations may be performed when the eligibility information for colour buffer read operations indicates that colour buffer read operations are "eligible" to be performed (regardless of whether the (general) colour buffer write access eligibility information indicates that colour buffer write accesses are eligible to be performed).

(Alternatively, a separate 'should be considered for' indication in respect of colour buffer reads could be provided for a (each) list entry (and could instead be used when setting the eligibility information in respect of colour buffer read (only) operations).)

In the present embodiments each of the eligibility and "should be considered for" indications are in the form of a flag that can be set to indicate when the group of fragments for the list entry in question is eligible (permitted) to perform the fragment processing operation(s) in question, and when the group of fragments to which the list entry relates should be considered for (is applicable to) the fragment processing (operation) in question.

As will be discussed further below, the processing operation eligibility flags for a list entry are set based on any processing order dependencies that need to be enforced between fragment groups of different list entries.

The processing operation "should be considered for" indications are set when the fragment group that the list entry relates to is to, and still needs to, perform the processing operation(s) in question. (Thus, as will be discussed further below, the processing operation "should be considered for" flags will be set to indicate that the group of fragments that a list entry relates is not applicable to the processing operation in question not only once the group of fragments has completed the processing operation in question (in the case where the group of fragments is to perform the processing operation in question), but also in the case where the processing operation is not to be performed for the group of fragments that the list entry relates to at all (in the first place), or where it becomes no longer necessary to perform the processing operation in question for the group of fragments (e.g. in response to those fragments being culled or their corresponding execution threads being otherwise terminated).)

Each fragment list entry may also have an indication of a group (classification) to which the fragments represented by the entry belong. This group (classification) is in an embodiment used when setting the eligibility information relating to colour buffer read-only operations. As noted above, the Applicant has recognised that groups of fragments may be able to perform colour buffer read operations in any order (despite having to perform colour buffer write operations in a particular order). As discussed herein, the group (classification) indicated in the fragment list entry can be used to identify such groups of fragments, and enforce dependencies accordingly.

In embodiments, the group (classification) for the fragment(s) corresponds to a Raster Order group (a Raster Order State), and the indication in the list entry comprises a Raster Order group ID (a Raster Order State ID, "ROS ID").

Each fragment list entry also has associated with it a "can be deleted" flag (a "retire" flag), that can be set to indicate that the list entry can be deleted (can be removed from the list in question). This deletion flag is set for a list entry when there are no longer any processing operations for which eligibility indications are provided still to be performed for the group of fragments that the list entry relates to.

FIG. 17 shows an exemplary tile sub-region fragment list entry. As shown in FIG. 17, the entry in a fragment list for a tile sub-region includes, as discussed above, an identifier 170 for the group of fragments (the thread quad) that the entry relates to), a pointer 171 to the next entry in the list, a coverage mask 172 for the entry, an indication 173 of whether the entry is applicable to (should be considered in relation to) colour processing, an indication 174 of whether the entry is applicable to (should be considered in relation to) depth processing, an indication 175 of the classification (ROS ID) for the entry, an indication 177 of whether the entry is eligible to write access the colour buffer (has a colour write dependency), an indication 178 to indicate whether the entry is eligible to access the depth buffer (has a depth buffer dependency), an indication 179 of whether the entry is eligible to read the colour buffer (whether a dependency arises as a result of the ROS ID), and an indicator 1710 to indicate if the entry can be deleted.

The entry may also include the identifier 176 of the tile to which the group of fragments/threads belong (this will be discussed in more detail below).

Some of this information, such as the ROSID and tile ID could instead be stored on a thread group (warp) basis rather than for individual list entries, if desired.

As will be appreciated from the above, a separate list of fragments to be processed is maintained for each sub-region that a tile is divided into. Accordingly, the graphics processor in the present embodiments maintains an appropriate set of plural tile sub-region fragment lists, one for each tile sub-region (for which a fragment is to be processed).

In order to facilitate the maintaining and managing of the lists for the tile sub-regions (and in particular the updating of the lists as new fragment groups fall to be processed for a tile sub-region and as fragment groups complete processing), suitable "management" information (metadata) is also maintained for each of the tile sub-region lists, which list "management" information is, in the present embodiments, indexed and identified by means of an appropriate "position", corresponding to the sub-region of the tile that the list relates to.

As will be discussed further below, this then allows the relevant tile sub-region fragment list for a group of fragments (and the "management" information for that list, to thereby allow the list itself to be accessed) to be identified using an appropriate position for a group of fragments, for example when a new group of fragments needs to be added to a list or when the list entry for a group of fragments needs to be checked and/or updated (for example).

In the present embodiments, the list management data comprises appropriate data that can allow the list itself to be accessed, and thus in the present embodiment the list management information comprises a head pointer pointing to the memory location of the head of the list in question, and a tail pointer indicating the memory location of the current tail of the list. (The head pointer could instead be stored in the next pointer field for the tail entry of a list, if desired.)

In the present embodiments, the list management data also comprises a flag to indicate whether the list is "active" (i.e. there is at least one entry in the list) or not, the identity of the tile (the tile ID) of the newest entry in the list (which can then be used to identify when an entry on to a list is for a different tile), the classification group ID (ROS ID) of the newest entry in the list (which can then be used to identify when a new entry being added to a list is changing the group (ROS ID) classification), and a flag to indicate when there has been a ROS ID change on the linked list.

FIG. 18 shows the table of sub-region list management information in the present embodiments. As shown in FIG. 18, each sub-region list is indexed by its position 180 (the position 180 indicative of the (relative) position of the relevant sub-region in the tile, e.g. such as the index 0 to 63 illustrated in FIG. 5B). Each sub-region list also has stored for it a head pointer 181 and a tail pointer 182 (with the head being the oldest entry in the list and the tail being the most recent (newest) entry in the list), an active flag 186 to indicate that the list is active (i.e. that there is at least one entry in the linked list), the tile ID 183 of the newest entry in the list (the entry at the tail of the list), the raster order sync ID 184 of the oldest entry in the list (the entry at the head of the list) and a ROS ID change flag 185.

As well as a set of list management data to allow the relevant sub-region tile list to be accessed when required, in the present embodiments a list (record) of tile sub-region fragment lists that need to be processed (scanned) to determine whether they need updating is maintained, that lists the sub-region fragment lists that currently require checking to see if they need updating or not. (As will be discussed further below, in the present embodiments the fragment lists for the tile sub-regions are updated using a background scan which checks and updates the lists. The list of sub-region fragment lists that need checking is used to identify which lists need checking (scanning) to see if they need updating, and to control the corresponding list scanning operation.)

Other arrangements would be possible for this, such as each list having an associated "needs scan" flag or similar, that can be set to indicate whether the list currently requires checking and updating or not.

The list of tile sub-region fragment lists that currently need to be checked (scanned) is again in the present embodiments indexed by means of an appropriate "position", corresponding to the sub-region of the tile that the list relates to. This then again allows the relevant tile sub-region fragment list management information (and thus the list itself) to be identified and accessed from the information in the record of lists that need checking. It also facilitates identifying whether a sub-region fragment list is already listed as needing checking when there is an event relating to a fragment for a list that would trigger the need for a scan, as the appropriate position for the group of fragments in question can then be used to check whether the relevant tile sub-region list is already listed in the list of tile sub-region lists that need to be checked (scanned).

As discussed above, the present embodiments relate in particular to using the tile sub-region fragment lists to set and enforce any desired fragment processing order dependencies. Thus, the tile sub-region fragment lists and the information in them are in particular used in the present embodiments to control the operation of the fragment shader 208.

As discussed above, in the present embodiments, the fragment shader 208 is in the form of a programmable fragment shader that will execute fragment shader programs to perform fragment shading of fragments issued by the rasteriser 206. Thus fragments issued by the rasteriser 206 will be processed as respective execution threads by the fragment shader 208.

The fragment shader 208 accordingly comprises an appropriate processing core (shader core) which includes, inter alia, processing circuits for generating execution threads for executing fragment shading programs for performing fragment shading for respective fragments issued by the rasteriser, together with an appropriate execution engine or engines that execute the fragment shading programs for respective execution threads to thereby perform the desired fragment shading operations.

Figure 8:
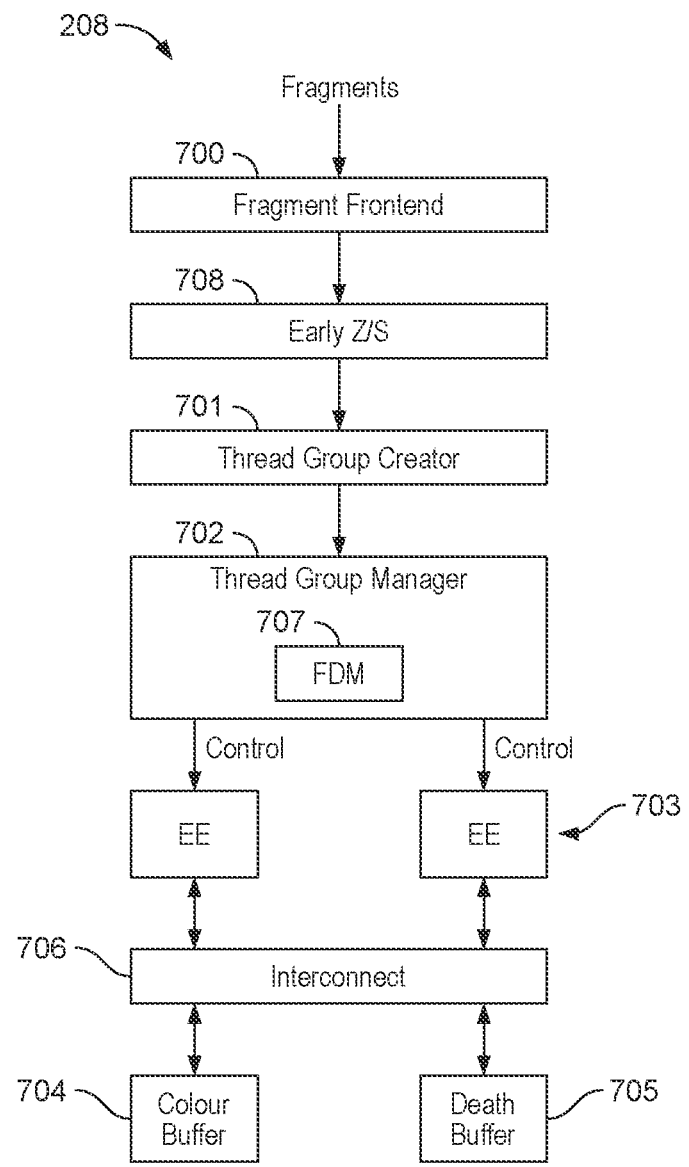
FIG. 8 illustrates schematically a shader core of a graphics processor in an embodiment of the technology described herein.

FIG. 8 shows schematically the layout of the fragment shader core (the fragment shader) 208 in the present embodiments.

As shown in FIG. 8, the fragment shader includes a fragment frontend 700 that receives fragments from the rasteriser 206. The fragments then undergo an early depth and stencil test 708.

The early depth and stencil test stage (block) 708 controls a thread group (warp) creator (spawner) 701 to correspondingly generate (spawn) groups (warps) of execution threads for execution corresponding to the fragments that pass the early depth and stencil test.

There is then a thread group (warp) manager 702 that is operable, inter alia, to issue thread groups (warps) created by the thread group creator 701 to a respective execution engine 703 for execution.

As shown in FIG. 8, the execution engines 703 have appropriate access to a colour buffer 704 and depth buffer 705 (which will be part of the tile buffer 211) via an appropriate interconnect/message fabric 706 to thereby be able to read values from and write values to those buffers when executing a fragment shader program for a fragment. (Although not shown in FIG. 8 for the sake of readability, the early depth and stencil testing stage 708 also has access to the depth buffer).

In the present embodiments, an execution thread is created and executed for each fragment generated by the rasteriser that survives the early depth and stencil tests.

In the present embodiments, groups of execution threads are issued to the execution engines 703 for execution together, with the threads in one group of execution threads ("warp") each then executing the shader program in question in lockstep, e.g. one instruction at a time. Grouping execution thread into groups in this manner can improve the execution efficiency of the execution engine 703, because it is possible to share instruction fetch and scheduling resources between all the threads in the group.

The execution engines 703 execute shader programs for execution threads issued to them, to generate appropriate render output data, including colour (red, green and blue, RGB) and transparency (alpha, a) data, for the fragment that an execution thread corresponds to. The shader program is provided by the application 320 and may be complied for execution by the driver 340.

In the present embodiments, the fragments are organised into 2×2 blocks of fragments (fragment "quads"). Each fragment "quad" is processed by four corresponding execution threads within a same thread group "warp". A thread group "warp" in an embodiment comprises sixteen threads, which may accordingly correspond to four thread "quads" to be processed. Thus, groups of four thread "quads" are processed in the fragment shader 208 as respective thread groups ("warps"), with each thread group ("warp") including a total of sixteen threads corresponding to sixteen fragments (four 2×2 "quads" of fragments). The sixteen threads in a thread group ("warp") then execute the fragment shader program in lockstep, e.g. one instruction at a time. Other groupings of threads would of course be possible.

Typically, each thread (and its corresponding fragment) will correspond to, and calculate render output data for, a fixed set of one or more sampling positions in the render output. However, in the present embodiments, the number of sampling positions (e.g. pixels) that a thread (and its corresponding fragment) corresponds to depends on the (variable) shading rate that is used.

To facilitate this, the thread group creator 701 operates to generate thread groups ("warps") based on a shading rate.

For example, when a 1×1 shading rate is to be used, fragments and corresponding execution threads which will each execute the shader program to generate render output data for one or more sampling positions in the render output corresponding to a respective single fine pixel are generated. When a 1×2 shading rate is used, however, fragments and corresponding execution threads that will each execute the shader program to generate render output data for sampling positions in the render output corresponding to a respective 1×2 coarse pixel are generated. Other shading rates will be handled in a corresponding manner.

Thus, the execution engines 703 can execute execution threads that represent fine VRS fragments and, where a coarser shading rate is being used, execution threads that represent VRS coarse fragments. Correspondingly, the thread group manager 702 issues threads appropriately to the execution engines 703 for execution. The thread group manager 702 also stores information indicating the shading rates associated with threads and thread groups ("warps") issued to an execution engine 703.

The execution engines 703 execute the execution threads within thread groups ("warps") appropriately so as to perform the appropriate shading operations and generate the appropriate render output data for each execution thread, i.e. including colour (red, green and blue, RGB) and transparency (alpha, a) data.

Output data generated by an execution engine 703 is then written appropriately to the colour buffer 704 and/or depth buffer 705.

The shading rate information may be used to control this writing out of data. For example, in the case of a 1×1 shading rate, a single set of output data values will be written to one or more sampling positions in the colour or depth buffer corresponding to a (only) single fine fragment. In the case of a coarser shading rate, a single set of output data values will be written to sampling positions in the colour or depth buffer corresponding to a block of plural fine fragments. For example, in the case of a 1×2 shading rate, a single set of output data values will be written to sampling positions corresponding to a block of 1×2 fine fragments. Other shading rates will be handled in a corresponding manner.

It will be appreciated that FIG. 8 shows the shader core 208 schematically, including the main elements of the core that are relevant to the operation in the manner of the present embodiments. There will, of course, be further elements, connections, etc., of the shader core 208 that are not shown in FIG. 8.

As shown in FIG. 8, the thread group manager 702 also includes a fragment dependency manager 707 which, as will be discussed in more detail below, manages and maintains the tile sub-region fragment lists of the present embodiments, and causes the processing of threads and thread groups by the execution engines 703 to be controlled based on those lists.

Thus, in the present embodiments, the managing and maintaining of the tile sub-region fragment lists, and the use of those lists to control fragment processing operations (to enforce any desired fragment processing order dependencies) is performed by a fragment dependency manager (circuit) 707 that is part of the thread group (warp) manager 702 of the (fragment) shader core 208. In particular, the fragment dependency manager 707 causes the execution of execution threads for performing fragment shading processes by the execution engines 703 to be controlled based on the tile sub-region fragment lists, in order to enforce the desired fragment processing order dependencies, and in particular to ensure that fragment quads that will generate output data for the same set of one or more sampling positions are processed by an execution engine 703 in the correct, desired order.

Figure 9:
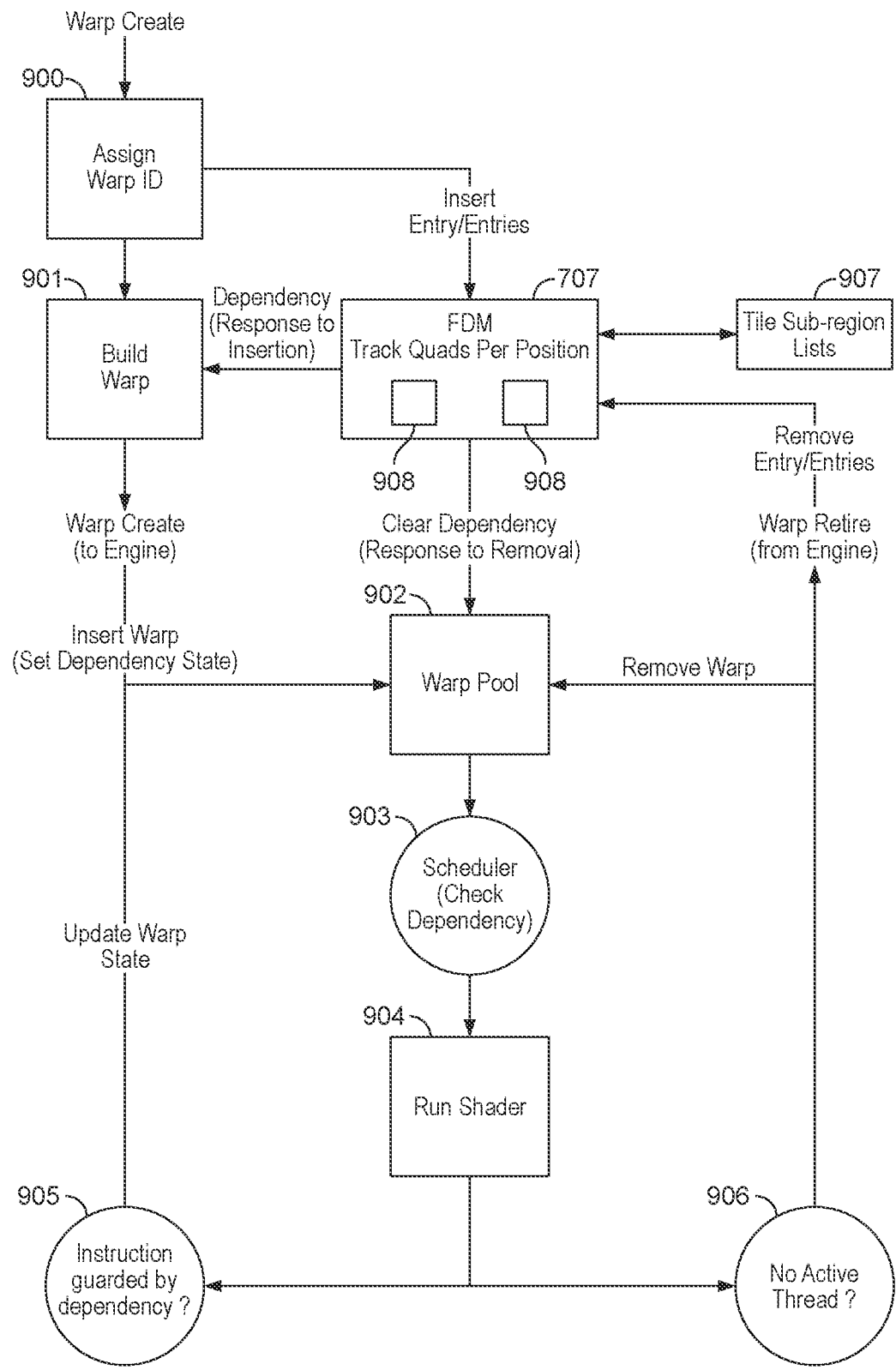
FIG. 9 shows the operation of the thread group manager and fragment dependency manager of a shader core in an embodiment of the technology described herein in more detail.

FIG. 9 shows the operation of the thread group manager 702 and fragment dependency manager 707 in more detail.

As shown in FIG. 9, when the thread group manager 702 is to create a new thread group (warp), the new thread group is assigned 900 a warp ID and the warp is built 901.

The new thread group with its warp ID is also input to the fragment dependency manager 707, which will then operate to add an entry or entries to the corresponding tile sub-region fragment list 907 held by the FDM 707 for the fragment (thread) quad(s) in the thread group (this will be discussed in more detail below).

The FDM 707 will also determine whether the thread quads in the thread group (warp) have any processing operation dependencies (in the present embodiment colour write, colour read only, or depth dependencies) and based on that determine a "dependency count" for the thread group (warp) for each of the respective processing operations that fragment processing order dependencies are being tracked for.

In the present embodiments, each thread group (warp) that is generated for processing fragments has a corresponding dependency state associated with it, indicating whether it has any dependency for the particular processing operations for which processing operation eligibility information is provided. Thus in the present embodiments, each thread group (warp) that falls to be processed has three associated dependency state indications, indicating whether it has a dependency for colour writes, colour reads and depth buffer accesses, respectively.

For each such dependency which is tracked, a thread group (warp) also has a corresponding dependency count set for it, which is a count of the number of thread quads within the overall thread group (warp) that have the dependency in question. Thus, in the present embodiments where thread groups (warps) comprise four thread quads, the dependency count for a given dependency state can be from zero (no dependency) to four (each thread-quad within the thread group (warp) is dependent on another thread quad).

The dependency counts for a thread group (warp) are indicated to the thread group (warp) creation process 901 by the FDM 707 when it adds relevant entries to the sub-tile lists to allow the corresponding dependency state and counts to be set for a thread group (warp). The FDM 707 also signals appropriate updates to thread group dependency states and counts as it updates the tile sub-region lists as fragments and threads are processed.

Once a thread group (warp) has been built, and its corresponding dependency state and counts set, it is added to a pool of thread groups (warps) 902 waiting to be issued to an execution engine for execution.

A scheduler 903 is configured and operable to issue thread groups (warps) from the warp pool 902 to an execution engine for execution 904. The scheduler 903 is operable to check the dependency state and counts of thread groups in the pool 902 to determine whether they have any dependencies that mean that they are not currently eligible to be (permitted to be) processed, and to only issue thread groups from the pool 902 when they are eligible to be processed.

In particular, the scheduler 903 will check whether a respective thread group has a dependency for a processing operation in question based on the corresponding dependency state for the thread group (warp), and if so, only issue the thread group from the pool 902 for performing that processing operation when the corresponding dependency count for the thread group (warp) for that dependency is zero (thereby indicating that none of the active-thread quads within the thread group (warp) have a dependency for the processing operation in question).

Once a thread group (warp) has been issued from the pool 902 by the scheduler 903, it will then be processed 904 by the appropriate execution engine.

As shown in FIG. 9, when during execution of a thread group, a shader program instruction that is guarded by a dependency is encountered 905, the shader program execution for the thread group is stalled, and the thread group is returned to the pool 902 so that the scheduler can check whether the dependency has been met (as discussed above). The thread group state is also appropriately updated.

In particular, the scheduler will check whether the dependency state for the thread group (warp) indicates that the thread group has a dependency for the shader program instruction in question, and if so what the thread group's (warp's) current dependency count for that dependency is. If the dependency count is greater than zero, then the warp will be stalled and retained in the pool until its dependency count for the guarded instruction operation has fallen to zero.

(On the other hand, if the dependency state for the thread group (warp) indicates that the thread group does not have a dependency for the guarded instruction, or the dependency count for the thread group (warp) is zero, then the thread group is free to execute the guarded instruction, and so can be appropriately reissued for execution to continue execution of the shader program when desired.)

An instruction can be indicated as "guarded" for a dependency in any suitable and desired manner. This is in an embodiment done by adding appropriate flags within the shader program execution to indicate that an instruction is guarded. For example, the compiler could identify instructions that perform colour buffer reads or writes, and depth buffer accesses, and indicate the presence of such instructions in a shader program to be executed appropriately, so that those instructions will be interpreted as being "guarded", to thereby trigger the corresponding dependency state and count checks for thread groups before they execute those instructions.

Other arrangements would, of course, be possible.

If no instruction guarded by a dependency is encountered during execution of the shader program, then the thread group can be executed to completion and the relevant execution threads retired.

Threads in a respective thread group may also otherwise be terminated, for example because they (the fragments that they relate to) have been culled (discarded) from further processing (for example for hidden surface removal purposes).

Thus, threads can become no longer active within a thread group either because they have completed the fragment shader program execution, or because they have otherwise been culled (discarded) from further processing. As shown in FIG. 9, once there are no remaining active threads in a thread group, then a thread group can be, and is, retired 906.

In this regard, in embodiments, it is possible for some, but not all, threads in a thread group (warp) to be permitted to complete their processing or be otherwise terminated, without retiring the entire thread group (warp) (otherwise referred to herein as a "partial retire" of the thread group (warp)). For example, individual quads within a thread group (warp) may be retired independency of each other. The tile sub-region list entries can be updated accordingly, e.g. by removing entries and updating dependencies indicated in entries as appropriate, in the manner disclosed herein. Such "partial retires" can assist with freeing up processing dependencies, and may allow other threads (e.g. in another thread group (warp)) to proceed.

When a thread group is retired, it is, as shown in FIG. 9, removed from the thread group pool 902. The fragment dependency manager 707 is also informed of the thread group retirement, so that it can remove the thread group from the entry or entries for the relevant tile sub-region fragment list.

As shown in FIG. 9, the fragment dependency manager 707 will also appropriately clear dependencies of thread groups in the pool 902 as thread groups undergo processing (and, e.g., are retired and removed from tile sub-region fragment lists).

In particular, the fragment dependency manager 707 will, as will be discussed in more detail below, update the tile sub-region fragment list as thread groups undergo processing.

For example, the fragment dependency manager 707 may update the tile sub-region fragment list as threads complete various processing operations that are being tracked using the tile sub-region fragment list entries (e.g. relating to depth processing, colour writes, and colour reads). The completion of processing operations may be signalled to the fragment dependency manager 707 by the appropriate processing circuit (unit) that has performed the processing operation, e.g. with depth updates being performed by and signalled to the fragment dependency manager by the relevant depth testing circuit (unit).

Likewise, the processing circuit performing colour writes could signal completion of colour write for a fragment/thread to the fragment dependency manager. However, since colour writes tend to be the last operation required to be performed for a group of fragments/threads (and so, once colour write has been performed for a group of fragments/threads, the threads will generally have completed all of their processing and will be retired), once colour write has been completed the fragment dependency manager 707 could (instead) simply be informed that the group of fragments/threads is to be retired.

As will be discussed in more detail below, the fragment dependency manager 707 will also update the processing operation eligibility information for entries in the list as thread groups undergo processing.

When the FDM 707 determines that a given entry in a sub-tile list no longer has a processing operation dependency (is now eligible to perform a particular processing operation) it will, as shown in FIG. 9, signal that appropriately, such that the dependency count of the corresponding thread group (warp) in the warp pool 902 can be and will be updated accordingly.

As discussed above, this will in particular comprise decrementing a dependency count for a thread group (warp) as respective thread quads within the thread group (warp) become eligible to perform a processing operation in question, such that it can, in time, be identified when the thread group (warp) no longer has any dependency for the processing operation in question, and can therefore be released from the warp pool 902 for performing that processing operation.

As shown in FIG. 9, the fragment dependency manager 707 operates to insert appropriate entries into tile sub-region fragment lists for thread groups that are created, and to remove entries from the tile sub-region fragment lists for thread groups that are retired, and to, correspondingly and otherwise, determine and update any changes to the fragment list entries, e.g. in relation to processing order dependencies, as appropriate (and to correspondingly trigger any corresponding changes need to the dependency states and counts of thread groups (warps) being executed/awaiting execution).

The managing and maintaining of the tile sub-region fragment lists, and the setting and updating of the entries in the lists, by the fragment dependency manager 707 in the present embodiments, will now be described in more detail with reference to FIGS. 10 to 16.

As discussed above, when a new thread group (warp) is created for processing fragments generated by the rasteriser, the fragment dependency manager 707 adds appropriate entries (one for each quad in the warp) to the appropriate tile sub-region fragment list.

Figure 10:
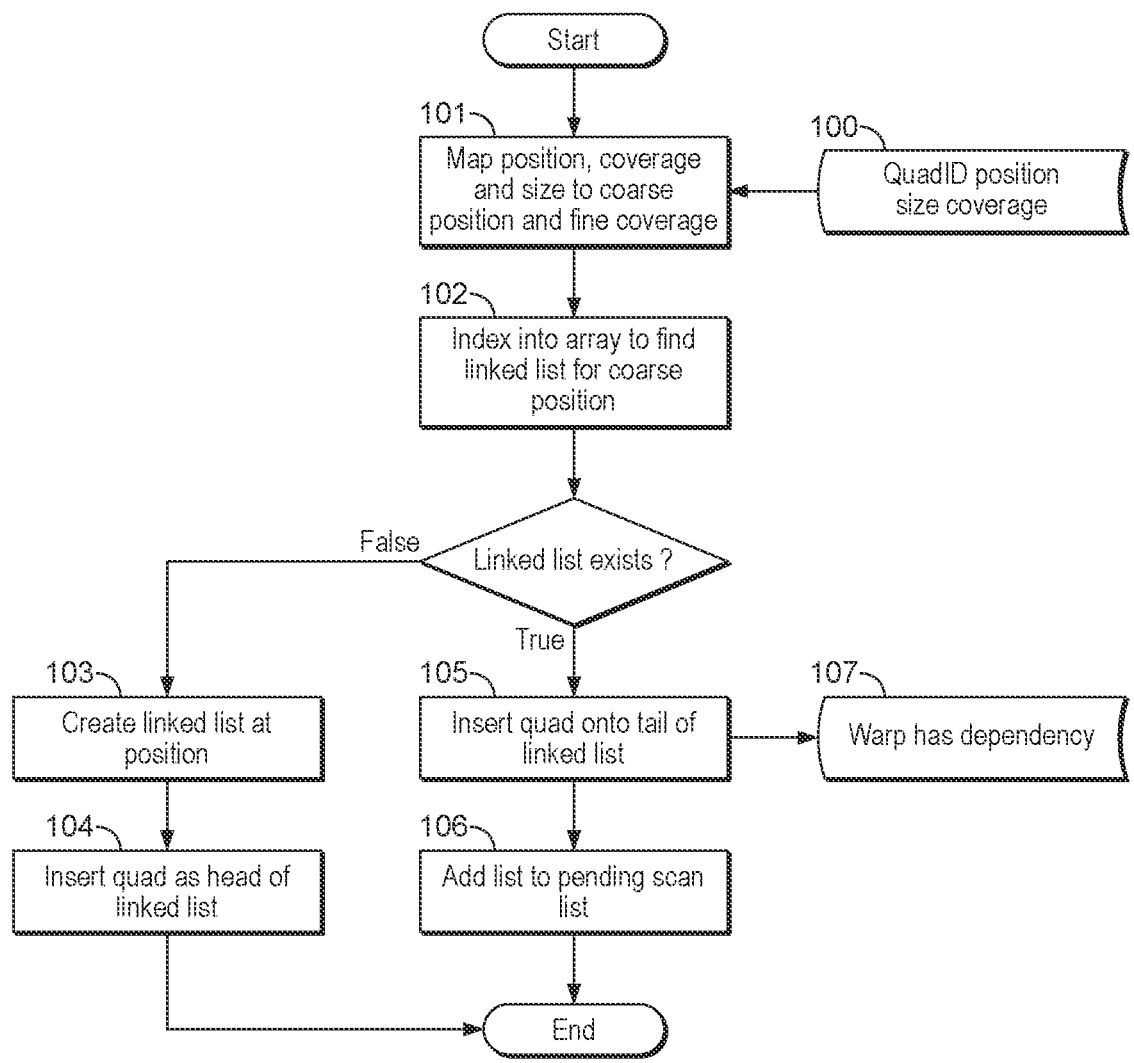
FIG. 10 shows the operation of a fragment dependency manager of a shader core in an embodiment of the technology described herein when adding a new entry to a tile sub region fragment list.

FIG. 10 shows the operation when a new fragment quad needs including in an appropriate tile sub-region fragment list.

As shown in FIG. 10, the input 100 to the process when adding a quad as a new entry in an appropriate tile sub-region fragment list comprises an identifier for the quad (quad ID), which in the present case comprises the identity (the warp ID) of the thread group (warp) that the thread quad belongs to, together with, where appropriate, a "quad" "offset" to indicate which quad of the thread group (warp) the quad is (an offset for the quad within the thread group (warp)). Thus for the case where there are multiple quads within a thread group (warp), the quad ID is (warp ID, quad offset). The quad position, the VRS rate (quad size) and the quad coverage (in terms of the sampling positions that are covered) are also provided.

As shown in FIG. 10, the quad position, together with the size (the VRS rate) and coverage of the quad are used to determine a "coarse" position (within the tile) for the quad that can then be used to identify the tile sub-region that the quad falls within (e.g. wherein the coarse position corresponds to a position at a granularity ("coarseness") corresponding to the size of a tile sub-region) and also to determine a "fine" coverage mask (the coverage information) for the quad (as discussed above) (step 101).

The determined "coarse" position for the quad is then used to identify the tile sub-region fragment list that the quad should be added to (step 102) (as discussed above, this will be determined by using the "coarse" position for the quad to index into the list (array) of tile sub-region fragment list management information, to retrieve the appropriate data for retrieving the sub-region fragment list in question).

As shown in FIG. 10, in the case where there is not currently a fragment list for the tile sub-region that the new quad falls within, then a new list is created for that tile sub-region (step 103), with the new quad being set as the head of the list (step 104).

As part of this process, the appropriate list management information, such as head and tail pointers, for the new sub-region list will be generated and stored in association with (indexed by) the relevant "coarse" position in the array of tile sub-region fragment list management data, so that the new list can be appropriately identified and accessed.

The list entry that is added will, as discussed, include an appropriate identifier for the quad that it relates to, together with a coverage mask indicating the coverage of the quad within the tile sub-region in question. The coverage mask is, as discussed above, derived based on the indicated coverage for the fragments in the quad, the quad position within the tile (and particularly within the tile sub-region), and the size of the tile area (and correspondingly of the tile sub-region area) that the quad covers (which may be based on the variable rate shading rate that is being used, for example).

The appropriate processing operation eligibility indications, processing operation "should be considered for" indications, and ROS ID for the quad are also set for the list entry.

In this case, as the quad is being inserted as the head of the sub-tile fragment list (i.e. a new fragment sub-tile fragment list is being created), then the eligibility information is set to indicate that all the desired processing operations are eligible (are permitted) to be performed for the quad/fragment group in question (as there cannot be any dependency on an earlier quad/group of fragments in the tile sub-region in question).

The fragment processing operation "should be considered for" indications are also set accordingly. In the case where the quad is to execute (the fragment group is to undergo) the relevant processing operation, then the "should be considered for" indication for the processing operation in question is set to indicate that the fragment group should be considered for (tracked for) the processing operation in question.

On the other hand, in the case where the quad/fragment group is not intended to undergo the relevant processing operation at all, then the "should be considered for" indication for that processing operation is set to indicate that the quad/fragment group in question does not need to be considered (tracked) for the processing operation in question.

The ROS ID (classification) for the list entry is also set, based on the ROS ID (classification) of the fragments represented by the list entry. This ROS ID (classification) may have been determined for the fragments prior to creating the list entry, e.g. during rasterization.

On the other hand, where a sub-region fragment list already exists for the tile sub-region that the new quad falls within, then the new quad is added to the end (tail) of the linked list for the tile sub-region in question (step 105). (The current tail of the list is identified from the tail pointer for the list.)

Figure 11:
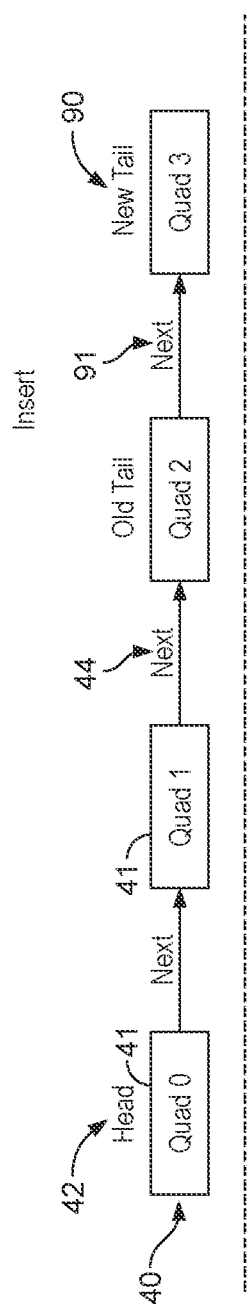
FIG. 11 illustrates the adding of a new entry to a tile sub region fragment list in an embodiment of the technology described herein.

FIG. 11 shows the adding of a new quad to a sub-region list. As shown in FIG. 11, an entry 90 for the new fragment quad is added to the tail of the list, with the next pointer 91 for the old tail entry being set to point to the new tail entry. The list tail pointer is also updated to point to the new tail of the list.

As discussed above, the list entry for the new quad will include an identifier for the quad, and a coverage mask indicating the coverage of the quad within the tile sub-region in question.

The appropriate processing operation eligibility indications and processing operation completion indications for the quad are also set for the list entry.

In this case, as there will be earlier entries in the already existing list for the tile sub-region in question, the eligibility information for the new entry is set to indicate that the new entry has a dependency on earlier entries in the list for the processing operations for which the eligibility information is maintained, such that the new quad is indicated as not being eligible (permitted) to perform the processing operations in question (as at this stage (when the quad is first added to the tile sub-region list) it has not yet been determined whether the new quad actually does have any processing order dependencies on earlier entries in the list in question, and so as a precaution the new quad is indicated as not being eligible to perform the processing operations that are being tracked).

Correspondingly, as shown in FIG. 10, the fragment dependency manager 707 signals 107 to the thread group (warp) creation process (as discussed with reference to FIG. 9) that the thread group (warp) that the thread quad for the new entry belongs to has the relevant dependencies, so that the dependency state and dependency count associated with the thread group (warp) can be set accordingly.

It should be noted in this regard that when an entry is added to an existing list, it is not immediately checked whether the entry actually has any dependencies on earlier entries in the list, but rather the entry is simply set to indicate that it does have dependencies (even though they may in fact be false dependencies) on earlier entries in the list, and the eligibility information will then later be updated appropriately (and if necessary) once it has been actually (properly) determined whether the new entry does have any dependencies on earlier entries in the list.

The fragment processing operation "should be considered for" indications are also set accordingly. In the case where the quad is to execute (the fragment group is to undergo) the relevant processing operation, then the "should be considered for" indication for the processing operation in question is set to indicate that the fragment group should be considered for (tracked for) the processing operation in question.

On the other hand, in the case where the quad/fragment group is not intended to undergo the relevant processing operation at all, then the "should be considered for" indication for such that processing operation is set to indicate that the quad/fragment group in question does not need to be considered (tracked) for the processing operation in question.

In this case, the tile sub-region list that the new fragment group (thread quad) has been added to is also indicated as needing to be scanned for an update (step 106). As discussed above, in the present embodiment this is done by maintaining a list (an array) of sub-region fragment lists needing to be scanned, and checking whether the sub-region list that the quad/fragment group has been added to is already in the list of sub-region lists to be scanned, and if not, adding it to the list of sub-region lists to be scanned.

Figure 12:
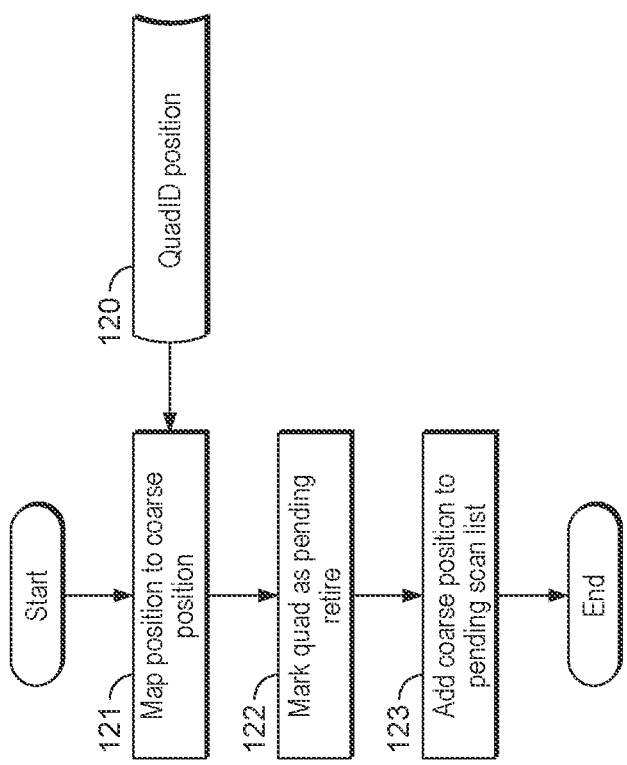
FIG. 12 shows the operation of the fragment dependency manager of a shader core in an embodiment of the technology described herein when a tile sub region list entry falls to be deleted.

FIG. 12 shows the operation when a thread quad (for a group of fragments) is retired (as discussed above), and accordingly can be removed from a sub-region fragment list.

In this case, as shown in FIG. 12, the identity and the position of the "retired" quad are provided 120 (to the fragment dependency manager), with the quad position then being used to identify the tile sub-region that the quad belongs to and thereby access the corresponding fragment dependency list for that sub-region (step 121).

The fragment dependency manager then identifies the relevant quad in the sub-region list (using the quad ID), and marks the quad to be retired (deleted) (step 122). The relevant sub-region list is also added to the list of sub-region lists that need to be scanned (as discussed above) (step 123).

In this regard, whilst a list entry may be marked for deletion in response to a quad being retired (or otherwise completing its processing operations which are being tracked by that list entry), the list entry is not deleted at this stage but the list is instead added to the list of sub-regions lists that need to be scanned. The entry can then be deleted from the list during the (separate) scanning operation (process). This can facilitate re-mapping of pointers for the remaining entries in the list, and can allow processing dependencies that may change as a result of deletion of the list entry to be accounted for.

As discussed above, in order to update the fragment lists for sub-regions of a tile, a record of the sub-region fragment lists that need scanning is maintained, and sub-region lists are added to the list of sub-region lists to be scanned when there are any changes to a list, such as the addition or removal of entries in the list, or a change of state for an entry in the list, that could result in an update to the list being required.

The fragment dependency manager is thus configured to scan any lists that are included in the list of sub-region fragment lists that need to be scanned. In the present embodiments, the fragment dependency manager 707 works through the "to be scanned" list in a round robin fashion, so as to thereby scan any sub-region fragment lists that need scanning in turn. Other arrangements would, of course, be possible.

As shown in FIG. 9, in order to perform the tile sub-region fragment list scanning operations, the fragment dependency manager 707 includes one or more scanners (scanning circuits) 908, that are each respectively operable to scan a tile sub-region fragment list. Having multiple scanners will allow the lists to be scanned more quickly. The Applicant has found that two scanners (such that two lists can be scanned simultaneously) is a suitable number of scanners for allowing the tile sub-region fragment lists to be kept up-to-date while ensuring sufficient throughput of fragments and execution threads.

Figure 13:
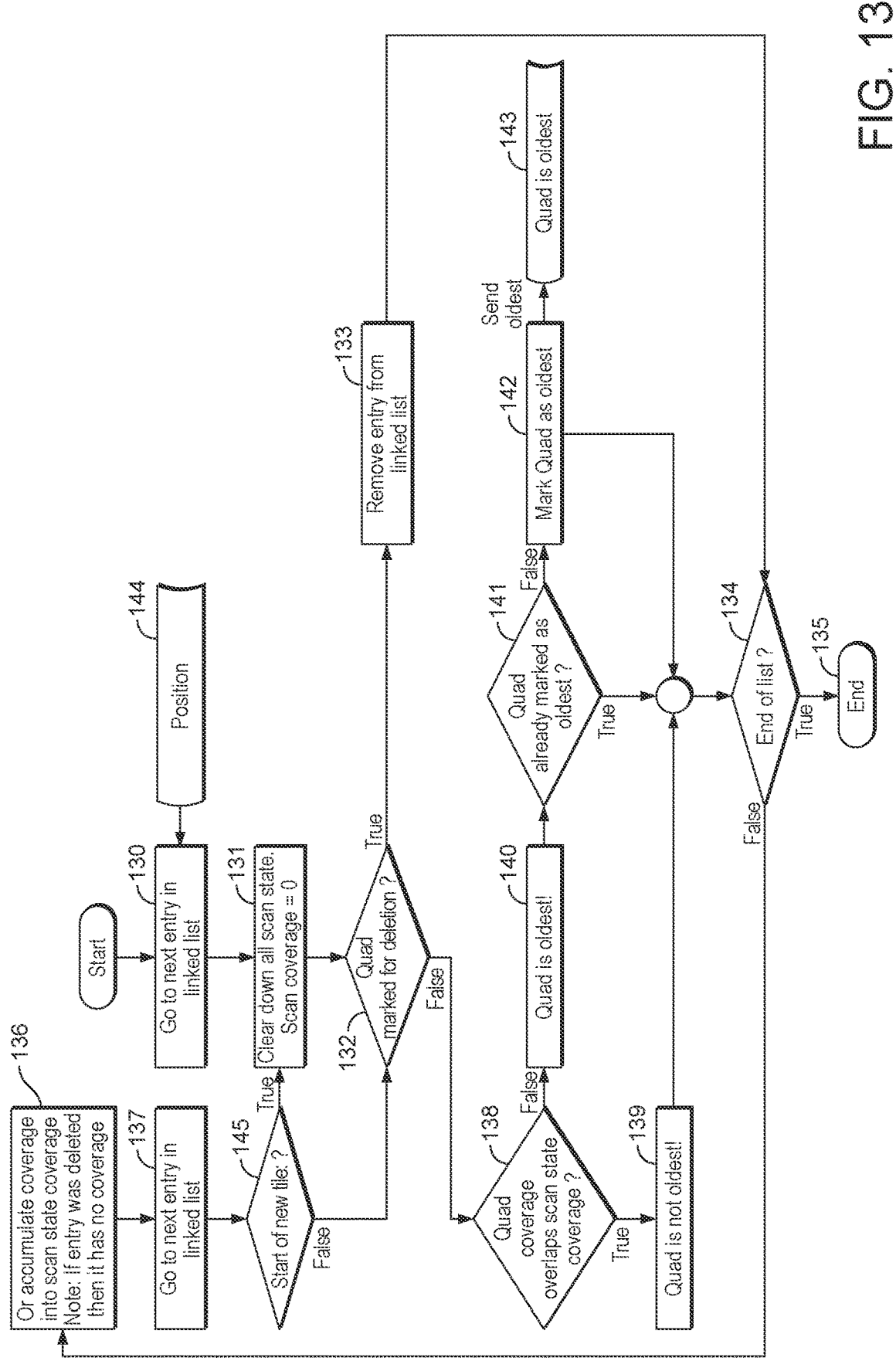
FIG. 13 shows the scanning operation of the fragment dependency manager of a shader core in an embodiment of the technology described herein to update the entries in a tile sub region fragment list.

FIG. 13 shows the scanning operation when a sub-region fragment list is being scanned.

The scanning process shown in FIG. 13 could be performed separately in respect of each of the different processing operation(s) for which an eligibility indication can be provided. Thus in the present embodiments, where separate eligibility indications are provided for colour buffer write accesses, ZS buffer accesses, and colour buffer read-only operations, the (scanner of) fragment dependency manager could scan a list that is being scanned three times, once in respect of the colour buffer read eligibility information, once again in respect of the colour buffer write access eligibility indication and once again in respect of the ZS buffer access eligibility indication.

Alternatively (and in an embodiment), the scanner/scanning process scans (traverses) a given tile sub-region list once, but during that (single) scan, accumulates (and maintains) multiple separate accumulated coverage masks, for each of colour reads, colour buffer write accesses and depth buffer accesses, and sets the eligibility indications for colour buffer reads, colour buffer write accesses and ZS buffer accesses based on the respective separate accumulated coverage masks accordingly.

When performing the scanning process, the scanner works its way along the linked list from head to tail, and, in effect, determines which entries in the list are the first entries that are due to perform the processing operation in question for the part of the tile sub-region that the group of fragments that the entry relates to applies to, and sets the relevant process operation eligibility indications for the entries in the list accordingly.

As shown in FIG. 13, when performing a scan of a tile sub-region fragment list, for example in respect of colour buffer updates, the fragment dependency manager scanner will identify the list to be scanned from the appropriate position 144 input to the scanner.

The scanner will then fetch the first entry in the list (using the head pointer for the list) (step 130) and will clear any existing scan state and set any accumulated scan coverage to zero (step 131).

The scanner will check whether the entry in question is marked for deletion (step 132) (as may be indicated by the indicator 1710 for the entry in question, as illustrated in FIG. 17). If the entry is marked for deletion, the scanner will remove the entry from the list for the tile sub-region in question (step 133) (this operation will be discussed in more detail below), and then determine if the scan has reached the end of the list 134. If the scan has reached the end of the list, then the scan is finished (step 135).

On the other hand, if the end of the list has not been reached, then the indicated coverage in the tile sub-region for the entry that was just checked is accumulated with the existing coverage state for the scan (step 136) (again, this will be discussed in more detail below), and the scan moves to the next entry in the list (step 137).

If an entry is deleted from the list, then it is assumed that its coverage is zero and so there will be no accumulation of coverage for the deleted entry into the accumulated scan coverage. Similarly, if an entry is indicated as not to be considered for (as not applicable to) a processing operation for which the scan is being performed, then it is assumed that its coverage is zero and so there will be no accumulation of coverage for the entry into the accumulated scan coverage (for the processing operation in question).

It is then checked whether the next entry in the list belongs to a new tile (step 145), e.g. by comparing the Tile ID for that entry with the Tile ID of the entry previously considered by the scanne (the scanner stores the Tile ID of the previously considered entry for this purpose). If the entry belongs to a new tile, the scanner will clear any existing scan state and set any accumulated scan coverage to zero (step 131). If the entry does not belong to a new tile, then any existing scan state and any accumulated scan coverage will be maintained.

It is then again checked whether the next entry in the list is marked for deletion (step 132) (and if so the entry is deleted without accumulating any coverage for the entry and the scan moves on to the next entry in the list (if any) (steps 133, 134, 136 and 137)).

In the case where an entry is not marked for deletion, then as shown in FIG. 13, it is then determined whether the entry is to be considered for (tracked for) the relevant processing operation for which the scan is being performed, e.g. by checking the 'should be considered for' flag 173 for the colour processing to determine whether the entry is applicable to colour processing (or in the case that the depth processing is being considered, checking the indication 174 for depth processing 'should be considered for').

In an embodiment, when considering colour read-only operations, the (general) colour processing 'should be considered for' indication 173 is checked (rather than having a separate colour read 'should be considered for' indication, although this could be provided instead if desired).

If the entry is not to be considered for (is not applicable to) the relevant processing operation for which the scan is being performed, then the scan simply moves on to the next entry in the list (if any) without accumulating any coverage for the entry that is not to be considered for the processing operation in question.

If the entry is to be considered for the processing operation in respect of which the scan is being performed, then the scanning process compares the coverage in the tile sub-region indicated for the entry being considered with the currently accumulated scan coverage (for the processing operation in question) (step 138) to determine whether the entry currently being considered overlaps with the accumulated scan coverage (this effectively determines whether the entry currently being considered overlaps with the coverage of any preceding entry in the list that is (still) to perform the processing operation in question).

In the case where the entry being considered does overlap with the (appropriate) accumulated scan coverage, thereby indicating that there is an earlier entry in the list that is to perform the processing operation in question for the part of the tile sub-region that the entry covers, it is determined accordingly that the entry has a processing dependency for the operation in question on the earlier entry (step 139) and therefore should not perform the processing operation until that earlier entry has performed the processing operation. Accordingly, the processing operation eligibility indication for the entry being considered is set to indicate (is left as indicating) that the entry is not currently permitted (is not currently eligible) to perform the processing operation in question.

On the other hand, if there is no overlap between the coverage in the tile sub-region for the group of fragments (quad) for the current list entry being considered with the accumulated coverage of the earlier list entries, then it can be determined that the current list entry being considered is the first (an or the oldest) list entry in the list that is to perform the fragment processing operation in question for that part of the tile sub-region (step 140). This being the case, the entry can be marked as being permitted to (eligible to) perform the processing operation in question.

In this case it is therefore checked whether the entry (quad) is already marked as being eligible (permitted) to perform the processing operation (step 141), and if the list entry is not so marked, then the relevant eligibility indication for the list entry is updated to indicate that the entry is eligible to (permitted to) perform the processing operation in question (step 142).

In this latter case (i.e. where the list entry is updated to indicate the entry is eligible to (is permitted to) perform the processing operation in question, then as shown in FIG. 13, the FDM 707 also sends an appropriate signal 143 to allow the dependency count for the thread group (warp) in question to be updated (and in particular to be decremented), as the thread quad or quads in question no longer has a dependency for the processing operation in question.

In either case, it will then be determined whether the end of the list has been reached, and if not, the coverage of the latest list entry will be appropriately accumulated into the current scan coverage (step 136), and then the next entry in the list considered (step 137), and so on. As discussed above, this scanning process will be repeated for each different processing operation eligibility indication that can be set for the list entries. Thus in the present embodiments, the scan process illustrated in FIG. 13 will be performed once to set the colour buffer read-only eligibility indications for the entries of a list that is being scanned, and then performed a second time to set the colour buffer write access eligibility indications for the entries of a list that is being scanned, and then performed a third time to set the depth buffer access eligibility indications for the entries in the list that is being scanned (or in any other desired order).

In the present embodiments, the scanners (scanning process) is configured to operate as a background scanning operation whilst the fragment processing (thread execution) is being performed, with the scanner, as shown in FIG. 13, when performing a scan of a list, walking the entries in the list from the head to the tail of the list, and, if necessary, updating the information associated with an entry or deleting the entry, as appropriate, in turn. The scanner may, for example, be configured to walk the lists at a rate of one entry per cycle.

In order to facilitate the scanning operation, the scanner maintains an appropriate set of scanning and management information (metadata) for a list that is being scanned. This data (scanning management information) comprises in particular the appropriate accumulated coverage mask or masks for the processing operation(s) in question (as discussed above). The scanner (scanning process) also keeps track of the entry that is currently being/to be scanned, and the previous entry in the list to that entry. This then allows the scanner to keep track of where it has reached in the scan of the list, and also to keep the list intact when an entry in the list is deleted.

The scanner/scanning process may also track other list information, if desired, such as the identity of the tile that the last scanned entry belonged to, and/or the ROS ID of the last scanned entry.

It will be appreciated in this regard, that the scanning operation effectively identifies whether a list entry is an or the "oldest" entry in the list for a particular processing operation for a particular part of the tile sub-region, and if so, sets that list entry as being eligible to perform the processing operation in question. This, in combination with the fact that newer fragments to be processed are always added to the end of the list for a tile sub-region, then has the effect of ensuring that the relevant processing operations (in the present embodiments the colour buffer updates and depth buffer updates) will be performed in the desired and correct order for the fragments (execution threads) in question. This will then ensure that fragment/thread quads that will generate output data for the same set of one or more sampling positions in a tile are processed by the execution engines 703 in the correct, desired order.

Figure 14:
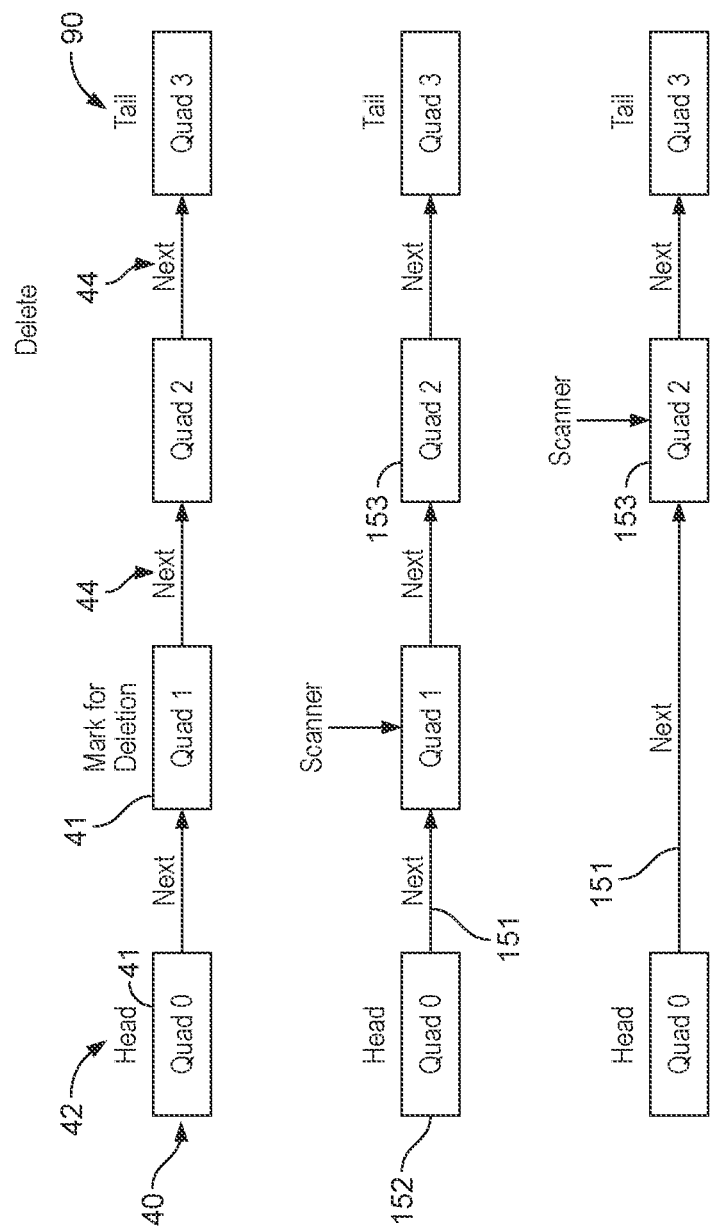
FIG. 14 shows the removal of an entry from a tile sub region fragment list in an embodiment of the technology described herein.

FIG. 14 illustrates in more detail removing (deleting) an entry from a tile sub-region list (as in step 133 in FIG. 13). It should be noted here that, in comparison to adding entries to a list (where entries are always added to the tail of the list), when entries are no longer needed, they can be removed regardless of their position in the list (and an entry at any position in a list can fall to be deleted).

In the example shown in FIG. 14, it is assumed that the second entry 150 (Quad 1) in the list is marked for deletion. As discussed above, during the background scan, the scanner will identify the entry as being marked for deletion and remove the entry.

The scanner will also signal to the list maintaining circuit/process to update the next pointer 151 of the previous entry 152 to point to its new next entry 153 in the list (to the same next entry as the removed entry had pointed to).

If the removed entry was the head or tail of the list, then the head pointer or tail pointer for the list, as appropriate, will also be updated to point to the new head or tail of the list.

FIG. 14 shows an example of removing an entry from a singly-linked list, performed as part of a scanning operation. However, if a doubly-linked list is instead used, then it may be possible for an entry to be deleted (e.g. immediately) in response to that entry no longer being required (e.g. in response to the fragments/threads represented by that entry competing their desired processing or being retired), rather than as part of a scanning operation. In that case, the previous entry (as pointed to by 'previous' pointer of the entry being deleted) can be updated to point to the next entry in the list (as pointed to by the 'next' pointer of the entry being deleted). This may reduce the processing burden of the scanner, which would no longer need to remove that entry from the list.

Figure 15:
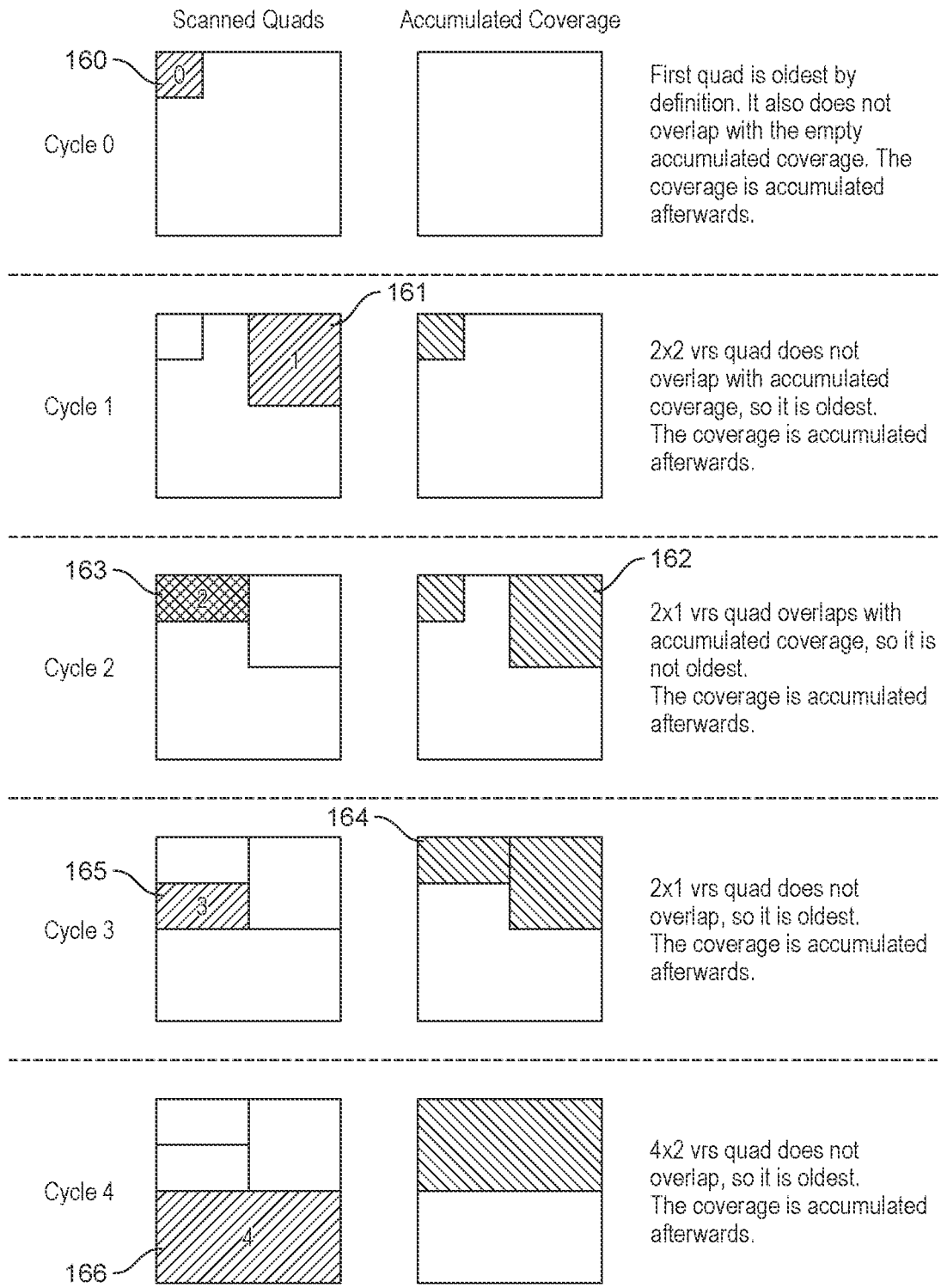
FIG. 15 shows the accumulation of coverage masks for tile sub region fragment list entries in an embodiment of the technology described herein.

FIG. 15 shows an example of the accumulation of coverage masks for list entries during a scan of a list (step 136 in FIG. 13).

The accumulation of coverage masks described with regards to FIG. 15, in the present embodiments, will be done separately for colour buffer write accesses, and depth buffer accesses. (The accumulation of coverage masks is done slightly differently for colour buffer read-only operations, as will be discussed later with regards to FIG. 16).

As shown in FIG. 15, in a first cycle (Cycle 0), the scanner considers the first entry 160 in the list which represents a first group of fragments (quad 0). The group fragments represented by the first entry in the list is necessarily the oldest entry in the list and so its eligibility indication will be set to indicate that the entry is eligible to perform the processing operation in question. The accumulated coverage mask is then updated to include the coverage of the group fragments (quad 0) for the entry.

The scanner then considers the next entry 161 in the list, which in this case is assumed to be a 2×2 VRS quad (quad 1). Since the coverage of this group of fragments (quad) does not overlap with the accumulated coverage (from entry 160), the list entry 161 is 'oldest' for the processing in question for the part of the tile sub-region to which it relates, and so the list entry is also set to indicate that that processing is 'eligible' to be performed. The accumulated coverage mask 162 is then updated to include the coverage of the (new) group of fragments.

The scanner then considers the next entry 163 in the list, which in this case is assumed to be a 2×1 VRS quad (quad 2). Since the coverage of this group of fragments overlaps with the accumulated coverage 162, the list entry 163 is not 'oldest' for the processing in question for the part of the tile sub-region to which it relates, and so the list entry is set to indicate that that processing is 'not eligible' to be performed. The accumulated coverage mask 164 is then updated to include the coverage of the (new) group of fragments.

Similar processing is performed by the scanner for the next entries 165, 166 in the list. In each case, the coverage for the group of fragments represented by the entry being considered is compared to the accumulated coverage map, and the entry is updated to indicate that processing in question is 'eligible' to be performed if no overlap exists with the accumulated coverage map (and conversely 'not eligible' if an overlap exists with the accumulated coverage map). The accumulated coverage map is also updated accordingly.

As discussed above, in the present embodiments, the depth or colour accumulated coverage map is only updated to include coverage for an entry if that processing is actually desired to be (is yet to be) performed for the fragments represented by the entry (as indicated by the indications 173, 174 discussed with regards to FIG. 17). In this regard, if depth or colour processing has already been performed for an entry (or is otherwise not desired to be performed for the list entry), it will not cause dependency issues for later entries in the list, and so the coverage for the entry does not need to be incorporated into the depth or colour, as appropriate, accumulated coverage mask.

For example, each list entry might typically go through 3 stages:
1. Wanting to write zs buffer (depth processing desired), wanting to write colour buffer (colour processing desired);
2. Wanting to write colour buffer (colour processing desired) (no longer desiring z processing) (colour is usually the last write);
3. Finished accessing buffers (neither of colour and depth processing desired).

For entries in stage 1, the scan coverage accumulation will happen for colour and depth.

For entries in stage 2, the scanner will only accumulate colour coverage

For entries in stage 3, the scanner will not accumulate any coverage (such entries are essentially marked as 'retired' (for deletion) and will be removed from the linked list).

The use of separate depth and colour accumulated coverage masks allows desired depth and colour processing to be tracked independently.

Figure 16:
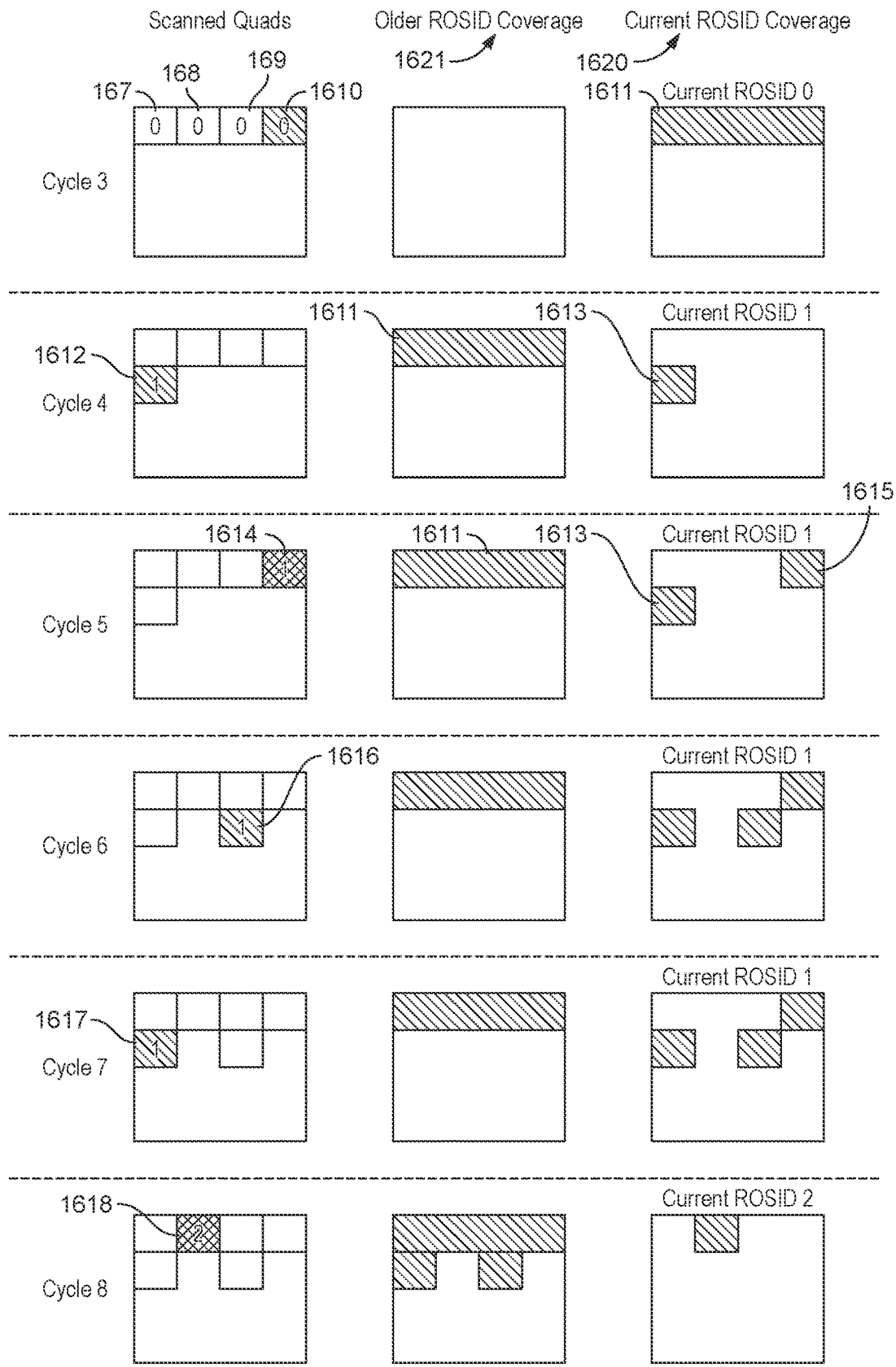
FIG. 16 shows the accumulation of coverage masks for tile sub region fragment list entries in an embodiment of the technology described herein.

FIG. 16 shows an example of the accumulation of coverage masks for updating colour read-only operation eligibility information during a scan of a list.

As noted above, to assist with managing the dependencies of colour read operations, each list entry indicates a group classification (the ROS ID) for the fragments represented by the list entry. Fragments falling within the same classification group (having the same ROS ID) are allowed to perform colour read operations in any fragment order (regardless of whether or not those fragments relate to overlapping parts of the tile sub-region, and regardless of whether other colour processing, e.g. write, dependencies may exist among those fragments). However, fragments falling within different classification groups (having different ROS IDs) will be processed according to their classification group (ROS ID) order when they relate to overlapping parts of a tile sub-region.

Therefore, when setting the colour read-only operation eligibility information, the coverage of an entry representing one or more fragments with a (current) ROS ID is compared against an accumulated coverage for any earlier entries having different (earlier) ROS IDs. If the entry in question (with the current ROS ID) overlaps the accumulated coverage for the earlier ROS ID(s), then the eligibility indication for colour read operations will be set to "not eligible" for that entry (and the entry in question is thus considered not to be an "oldest" entry for the processing in question for the part of the tile sub-region to which the entry relates).

Conversely, if the entry in question does not overlap the accumulated coverage for earlier ROS IDs, then the entry in question will be marked as "eligible" to perform colour read operations (and is thus considered to be an "oldest" entry for the processing in question for the part of the tile sub-region to which the entry relates).

In order to facilitate this operation, when performing scanning for updating colour read-only eligibility information, a first accumulated coverage for accumulating the coverage of earlier entries having a different (earlier) ROS ID is (therefore) maintained. A second accumulated coverage is also maintained for accumulating the coverage for earlier entries having the 'current' ROS ID. Then, when a new ROS ID is encountered, the 'current' ROS ID accumulated coverage is added to 'earlier' ROS ID accumulated coverage. This allows the 'earlier' ROS ID coverage to be tracked and updated. This is shown in FIG. 16.

As shown in FIG. 16, in the first four cycles (up to Cycle 3), the scanner considers in turn entries 167, 168, 169, and 1610 in the list for the tile-subregion, which each represent a group of fragments. Each of these entries have the same ROS ID (which is 0), and so their coverage 1611 is accumulated into the "current" ROS ID accumulated coverage 1620 (which is currently accumulating coverage for ROS ID 0 entries). The colour read-only eligibility indication (the ROS dependency 179 shown in FIG. 17) for each of these entries is set to indicate that these entries are eligible to perform colour reads (that no dependency arises as a result of ROS IDs), since the entries do not overlap with any "older" ROS ID coverage 1621, which is currently empty).

The scanner then considers the next entry 1612 in the list, which has a ROS ID of 1. Due to this new ROS ID, the previous "current" ROS ID accumulated coverage 1611 is added to (OR'd into) the "older" ROS ID accumulated coverage 1621 (such that the "older" ROS ID accumulated coverage now shows the coverage for ROS ID 0). The "current" ROS ID accumulated coverage is then updated so as to accumulate the coverage 1613 for the ROS ID 1 entry 1612 (only). Since the coverage of the entry 1612 does not overlap the "older" ROS ID accumulated coverage 1611, the colour read-only eligibility indication for the entry 1612 is set to "eligible" (the ROS dependency information for the entry 1612 is set to indicate that no ROS dependency exists).

The scanner then considers the next entry 1614 in the list, which has ROS ID of 1. The coverage 1615 for the new entry is therefore accumulated into the "current" ROS ID coverage which is being maintained for ROS ID 1. The coverage of the entry 1614 overlaps with the accumulated coverage for the "older" ROS ID 1611, and so the colour read-only eligibility indication for the entry 1614 is set to "not eligible" (the ROS dependency for entry 1614 is set to indicate that a ROS dependency exists).

The scanner then considers the next entry 1616 in the list, which has ROS ID of 1. The coverage for entry 1616 is therefore accumulated into the "current" ROS ID" accumulated coverage which is being maintained for ROS ID 1. The coverage of the entry 1616 does not overlap with the accumulated coverage for the "older" ROS ID, and so the colour read-only eligibility indication for the entry 1616 is set to "eligible" (the ROS dependency for entry 1616 is set to indicate that a ROS dependency does not exist).

The scanner then considers the next entry 1617 in the list, which has ROS ID of 1. The coverage for entry 1617 is therefore accumulated into the "current" ROS ID accumulated coverage which is being maintained for ROS ID 1. The coverage of the entry 1617 does not overlap with the accumulated coverage for the "older" ROS ID, and so the colour read-only eligibility indication for the entry 1617 is set to "eligible" (the ROS dependency for entry 1617 is set to indicate that a ROS dependency does not exist). The fact that an earlier entry having the same ROS ID and position (i.e. the coverage of entry 1617 overlaps the "current" ROS ID accumulated coverage) does not cause any colour read processing dependency (ROS dependency) to arise.

The scanner then considers the next entry 1618 in the list, which has ROS ID of 2. Due to this new ROS ID being encountered by the scanner, the previous "current" ROS ID accumulated coverage is added to (OR'd into) the "older" ROS ID accumulated coverage (such that the "older" ROS ID accumulated coverage now includes the coverage for ROS IDs 0 and 1). The "current" ROS ID accumulated coverage is then updated so as to accumulate the coverage for ROS ID 2 entries (only). Since the coverage of the entry 1618 overlaps with the "older" ROS ID accumulated coverage, the colour read-only eligibility indication for the entry 1618 is set to "not eligible" (the entry 1618 is set to indicate that a ROS dependency exists).

Similarly to the discussion above, in the present embodiments, accumulated coverage maps for colour read-only operations (the "current" ROS ID and "older" ROS ID accumulated coverage maps) are only updated to include coverage for an entry if colour processing is actually desired to be (is yet to be) performed for the fragments represented by the entry.

In an embodiment, whether colour processing is desired to be performed is indicated in the (general) colour processing 'should be considered for' indication (indication 173 discussed with regards to FIG. 17). Alternatively, if desired, a separated 'should be considered for' indication could be provided specifically for colour buffer read-only operations.

FIGS. 19 to 23 show an example sequence of groups of fragments/threads ("quads") being added to a tile sub-region fragment list, with the corresponding states of the list entries and the list management information, and the information that is output by the fragment dependency manager, as the entries are added to the list.

Figure 19:
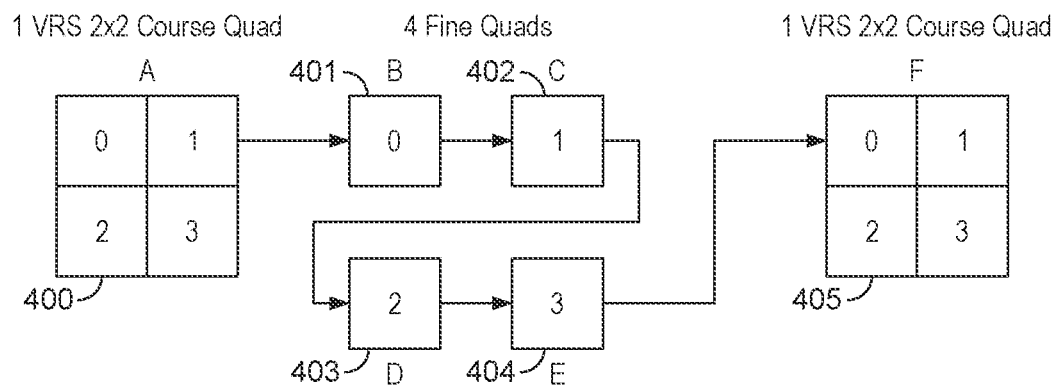
FIGS. 19 to 23 show the adding of an exemplary sequence of fragments to be processed to a tile sub region fragment list in an embodiment of the technology described herein.

As shown in FIG. 19, in this example it is assumed that there is a first group of fragments for a first primitive corresponding to a single VRS 2×2 coarse quad 400 "A" covering the "fine quad" positions "0, 1, 2 and 3" in the tile sub-region in question, followed by a sequence of four fine quads 401 "B", 402"C", 403 "D", and 404 "E", for a second, overlapping primitive, covering the fine quad positions 0, 1, 2 and 3, respectively, followed by a further VRS 2×2 coarse quad 405 "F" for a third primitive that covers all of the positions 0, 1, 2 and 3.

Figure 20:
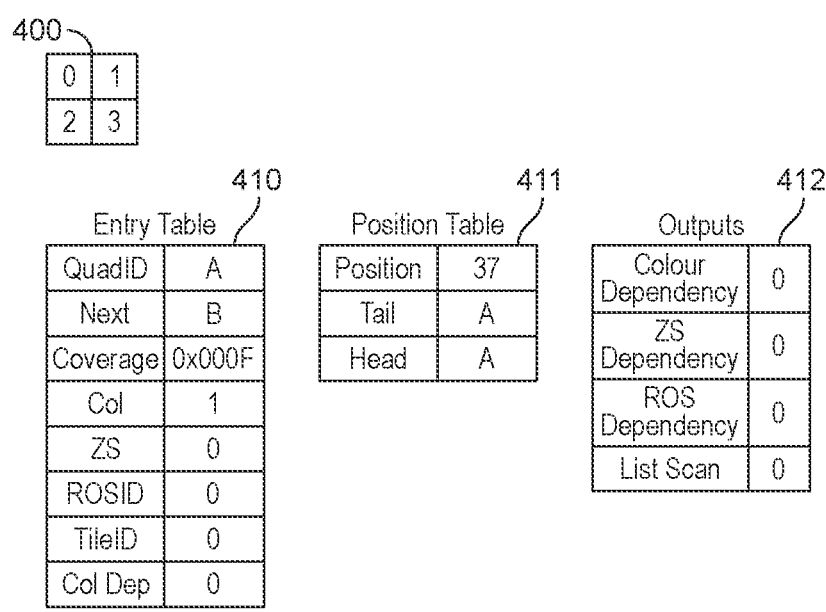

FIG. 20 shows the list entry and list information (metadata) that are generated for the first VRS 2×2 coarse quad 400 A.

As shown in FIG. 20, the list entry 410 for this 2×2 coarse quad 400 (which will be the first entry in the list) includes the relevant identifier "A" for the quad. The next pointer for the entry is set to point, as shown in FIG. 20, to itself (as there are no other entries in the list at this stage). The coverage mask is set to show that all four positions 0, 1, 2 and 3 are covered.

In the present case, it is assumed that the quad 400 only wishes to perform colour updates, so the "should be considered for colour" flag ("Col") (but not the should be considered for depth flag ("ZS"), for example) is set to 1. Also, as this is the first entry in the list, it cannot have any dependency for its colour write update on any other entry in the list and so it is set to indicate that it has no such dependency (that it is eligible to perform colour updates) by setting the "Col Dep" indicator to 0 (no dependency).

With reference to FIG. 20, the sub-region list management table (position table) 411 is updated to set the tail and head pointers for the relevant sub-region position "37" (e.g.) to point to this first entry.

The fragment dependency manager also outputs 412 an indication of the dependencies that the entry has (which in this case is none) (for the purpose of setting the corresponding thread group (warp) dependency state and counts, as discussed above), and whether the tile sub-region list needs scanning to see if it needs updating (which it does not).

Figure 21:
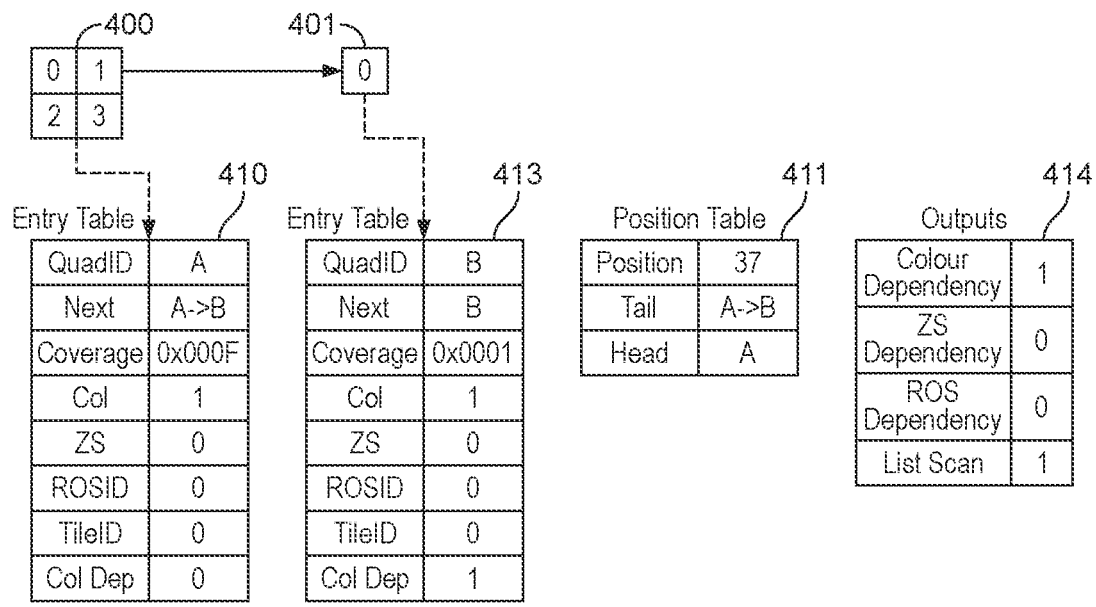

FIG. 21 shows the addition of the first fine quad 401 "B" (having position "0") to the list. In this case, as shown in FIG. 21, a new entry 413 for that quad (having the identity "B") is added, with the next pointer for the entry set to point to itself, the coverage mask appropriately set (but covering position "0" only) and again it being indicated (and assumed) in this case that the quad only wishes to perform a colour update. In this case, as there is the earlier entry 410 (for the quad 400 "A") in the list, the entry 413 for the quad 401 is set to indicate that that quad has a colour dependency (as shown in FIG. 21).

The fragment dependency manager also accordingly outputs 414 for the quad 401 an indication that it has a colour dependency (for the purpose of setting the corresponding thread group (warp) dependency state and counts, as discussed above), and also that the tile sub-region list has been updated and so should be scanned.

As shown in FIG. 21, the next pointer in the entry 410 for the quad 400 "A", and the tail pointer for the list information 411 are also correspondingly updated to point to the entry for the new quad "B".

Figure 22:
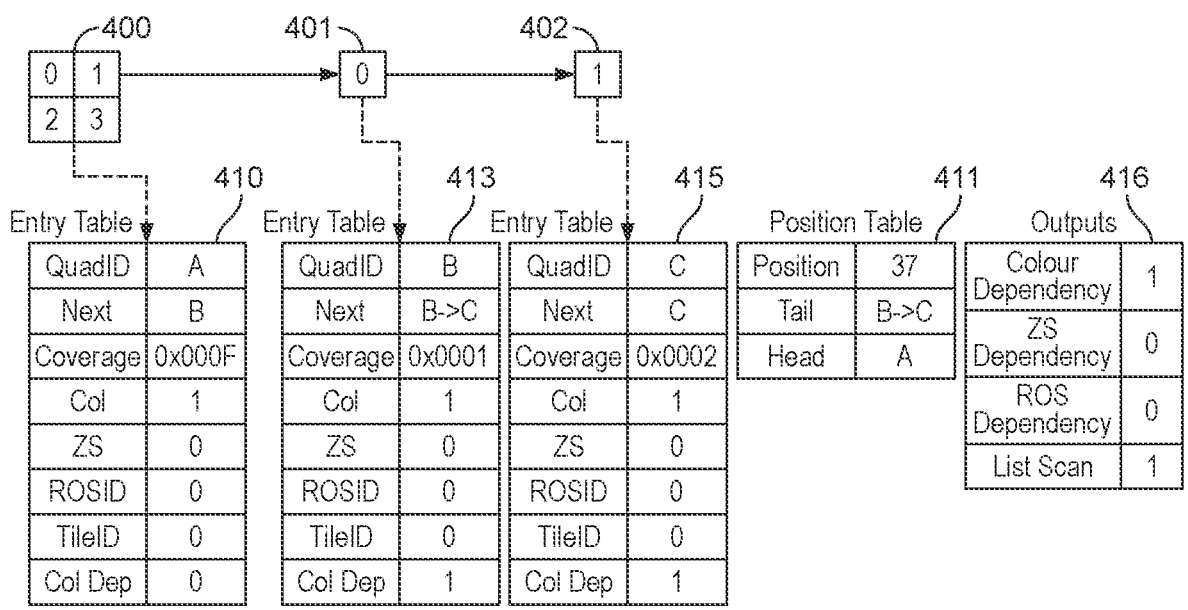

FIG. 22 shows the addition of the second fine quad 402 "C" (having position "1") to the list. In this case, as shown in FIG. 22, a new entry 415 for that quad (having the identity "C") is added, with the next pointer for the entry set to point to itself, the coverage mask appropriately set (but covering position "1" only) and again it being indicated (and assumed) in this case that the quad only wishes to perform a colour update. In this case, as again there are earlier entries in the list, the entry 415 for the quad 402 is set to indicate that that quad has a colour dependency.

The fragment dependency manager also accordingly outputs 416 for the quad 402 an indication that it has a colour dependency, and also that the tile sub-region list has been updated and so should be scanned.

As shown in FIG. 22, the next pointer in the entries 413 for the quad 401 "B" and the tail pointer for the list information 411 are also correspondingly updated to point to the entry for the new quad 402 "C".

The further fine quads 403 and 404, "D" and "E", having the positions "2" and "3" will correspondingly be added to the list.

Figure 23:
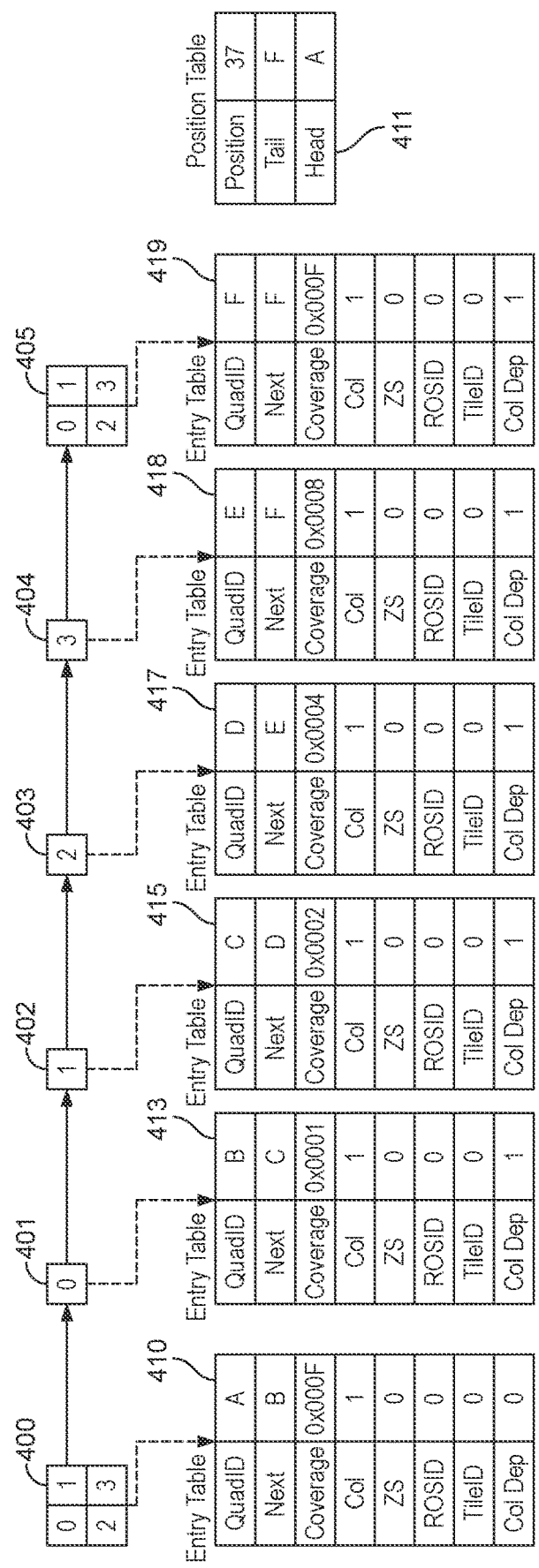

FIG. 23 shows the state of the list after the final, larger, VRS 2×2 coarse quad 405 "F" (covering all four positions 0, 1, 2 and 3) has been is added to the list.

The information associated with the data entries in an embodiment corresponds to that described with regards to FIG. 17. However, for the sake of readability, the "ZS Dep", "ROS Dep" and "Retire" indications are not shown in FIGS. 20 to 23.

In the example of FIGS. 20 to 23, since the fragment/execution threads quads "A", "B", "C", "D", "E" and "F" do not wish to perform depth processing (as indicated by the ZS indication being set to 0), for each of these entries, no depth processing eligibility information is set.

In the example of FIGS. 20 to 23, the entry at the head of the list is indicated by the "head" pointer in the list information 411. Alternatively, the "next" pointer of the entry at the tail of the list could be used to point to (indicate) the entry which is at the head of the list.

Figure 25:
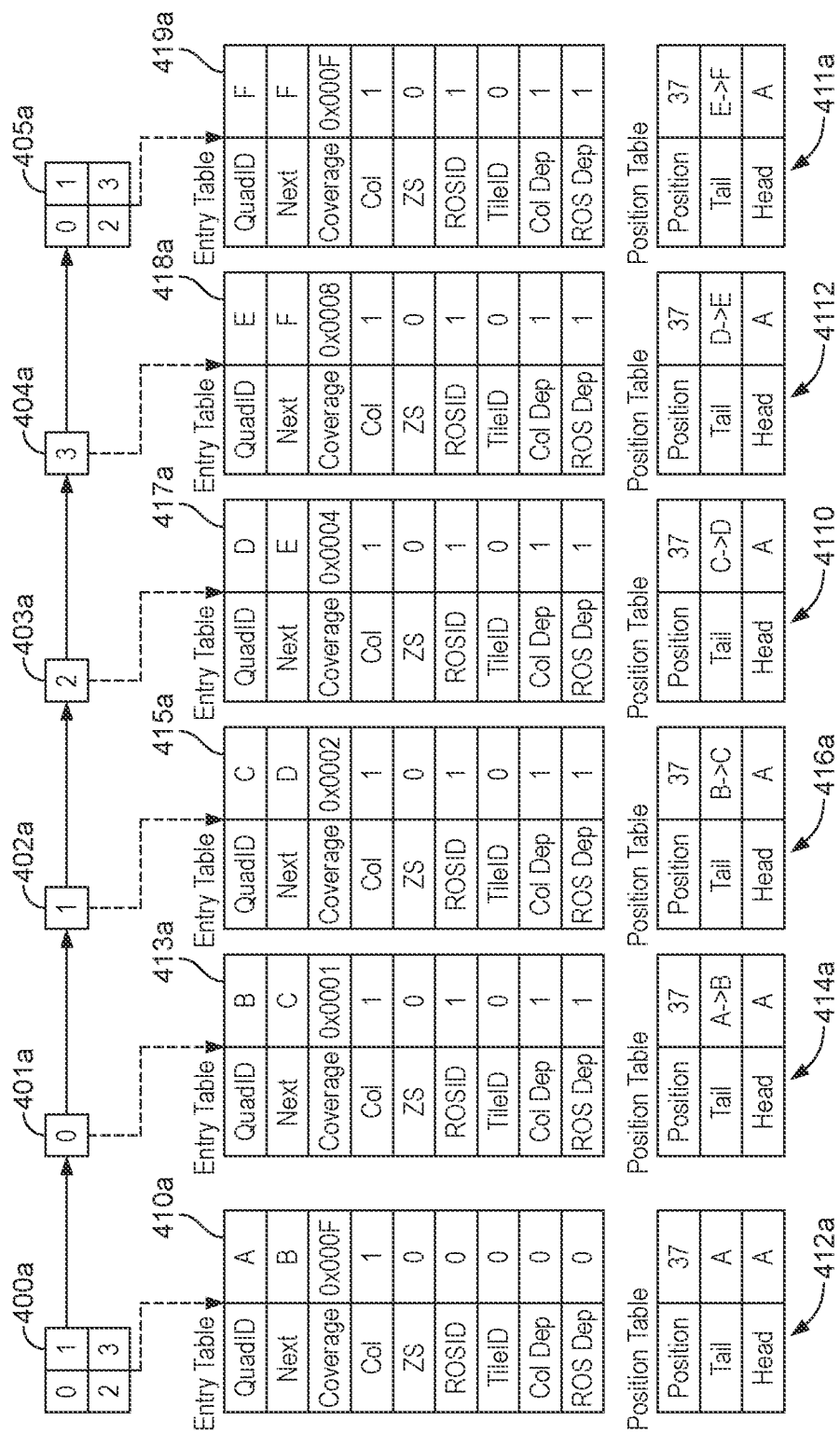
FIG. 25 shows the adding of an exemplary sequence of fragments to be processed to a tile sub-region fragment list in an embodiment of the technology described herein in which a Raster Order State is provided for the list entries.

FIG. 25, similarly to FIG. 23 shows a state of a list as entries for various quads 400a ("A"), 401a ("B"), 402a ("C"), 403a ("D"), 404a ("E"), 405a ("F") are added to the list. The next pointer ("next"), coverage indication ("coverage"), colour 'should be considered for' indication ("Col"), Z 'should be considered for' indication ("ZS"), and colour eligibility information ("Col Dep.") for each of the entries is set in a similar manner as discussed with regards to FIG. 23. Similarly to the discussion with regards to FIG. 23, when each next entry is added, the metadata for the list ("position table") 412a, 414a, 416a, 4110, 4112, 411a, is updated to point to the new tail of the list.

Additionally, FIG. 25 shows setting the colour read-only eligibility information (ROS Dep) as entries are added to the list. In particular, for the first entry in the list 410b the colour read-only eligibility information is set to be "eligible" (i.e. the ROS dependency information is set to indicate that no dependency exists), whereas for all subsequent entries in the list 413a, 415a, 417a, 418a, 419a, the colour read eligibility information is set to be "not eligible" (the ROS dependency information is set to indicate that a dependency (potentially) exists).

Alternatively (or additionally), the ROS dependency information for a new entry added to the list may be set to indicate that no ROS dependency exists when the ROSID change flag (e.g. flag 185 described with respect to FIG. 18) for the list indicates that no change in ROSID exists within the list (all list entries relate to the same ROSID). Conversely, the ROS dependency information for a new entry may be set to indicate that a ROS dependency (potentially) exists when the ROSID change flag for the list indicates that a change in ROSID exists within the list (i.e. if entries in the list relate to plural different ROS IDs). The ROSID change flag may be updated, e.g. when entries are added to the list, e.g. being set to indicate that a ROSID change exists in response to a new entry being added having a ROSID which is different from the ROSID of the entry at the head of the list (as indicated by the ROSID indication 184 for the list described with respect to FIG. 18)

Figure 24:
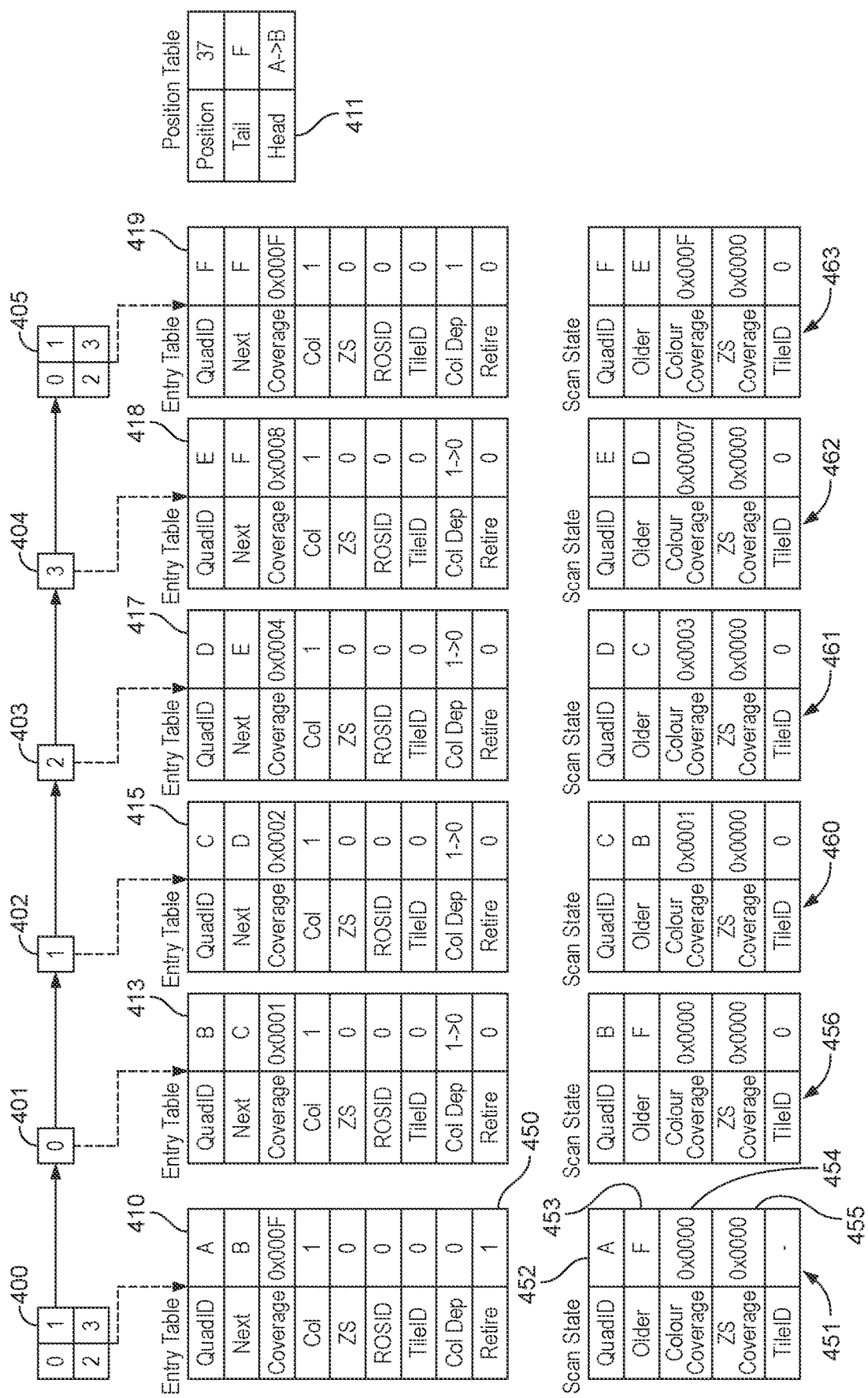
FIG. 24 illustrates the removal of an entry from a tile sub region fragment list in an embodiment of the technology described herein.

FIG. 24 shows the operation of a scan of the sub-region list shown in FIG. 23 when the first coarse VRS quad 400 "A" has finished its processing and so is marked 450 in its entry as to retire. The marking in the entry 410 for the quad 400 to retire will, as discussed above, trigger a scan of the sub-region list in question.

FIG. 24 shows the list entries and corresponding scan state that is maintained by the scanner as each entry in the list is scanned.

As shown in FIG. 24, at the start of the first scan cycle, when the entry 410 for the quad 400 will be scanned, the corresponding scan state 451 before that entry 410 has been scanned indicates that the entry for the first quad 400 "A" is the entry that is to be/being scanned and that the previous entry 453 in the list that was scanned (which in this case will be the tail of the list (from the previous scan)) was the entry for quad 405 "F". The scan state 451 also include the accumulated colour coverage 454 and depth coverage 455 for the scan. As the scan is currently at the first entry in the list, as shown in FIG. 24 there is no accumulated coverage at this stage of the scan for colour or depth before the first entry 410 is scanned.

The scan of the entry 410 for the first quad 400 A will identify that that entry can be deleted (as indicated by the Retire flag being set to 1), and so the scanner will operate to delete that entry from the tile sub-region list.

As shown in FIG. 24, the list management information 411 is also updated to show that the head of the list is now the entry for the second quad 401 "B" as the entry for the first quad 400 "A" has been deleted from the list.

The scanner will then move on to the next entry 413 for the second quad 401

As shown in FIG. 24, the scan state 452 when beginning the scan for the entry for the second quad 401 "B" indicates that it is the entry 413 for quad "B" that is to be/being scanned, and that the previous entry is the tail quad 405 F (as the head quad 400 "B" that was the entry prior to the entry 413 for the second quad 401 "B" has been deleted, and so the preceding entry in the list is now the tail of the list). The scan state 452 also indicates that there is no accumulated coverage yet for colour or depth (as the first entry 410 in the list for the first quad 400 "A" has been deleted, and so there is no coverage for either colour or depth for the list yet). The scan state 456 also indicates the Tile ID of the previously considered list entry which is "0".

In this case, the entry 413 for the second quad 401 "B" does not indicate that that entry is to be deleted, and so, as the entry 413 for the second quad 401 "B" indicates that that quad is to be considered for colour processing, the scan will compare the indicated coverage in the entry 413 for the quad 401 "B" with the accumulated scan coverage for colour in the scan state 456.

This comparison will determine that the second quad 401 "B" does not overlap with the accumulated colour coverage (as the accumulated colour coverage is zero at this point in the scan), and so does not overlap with any preceding entry in the list, and so, as shown in FIG. 24, the scan will change the colour dependency eligibility setting for the quad 401 "B" in its list entry 413 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 401 "B", to thereby decrement the colour update dependency count for the thread group (warp) in question.

The scan will also accumulate the coverage for the second quad 401 "B" into its accumulated colour coverage (as the quad "B" is to perform colour updates). However, as the quad "B" is not indicated as applicable to depth updates, the coverage for the quad "B" will not be added to the accumulated depth coverage (that will remain as "zero" coverage for depth). The Tile ID of the second quad 401 "B" is "0", which is the same as the Tile ID currently stored in the scan state 456, and so the Tile ID stored in the scan state remains "0".

The scanner will then move on to the next entry 415 for the third quad 402

As shown in FIG. 24, the scan state 460 when beginning the scan for the entry for the third quad 402 "C" indicates that it is the entry 415 for quad "C" that is to be/being scanned, and that the previous list entry is the preceding quad 401 "B". The scan state 460 also indicates the coverage of quad "B" as the accumulated coverage for colour (and zero accumulated coverage for depth).

As the entry 415 for the third quad 402 "C" does not indicate that that entry is to be deleted, and as the entry 415 for the third quad 402 "C" indicates that that quad is to undergo colour processing, the scan will compare the indicated coverage in the entry 415 for the quad 402 "C" with the accumulated scan coverage for colour in the scan state 460.

This comparison will determine that the third quad 402 "C" does not overlap with the accumulated scan colour coverage (as the accumulated colour coverage is just the coverage of the second quad 401 "B" at this point in the scan), and so does not overlap with any preceding entry in the list, and so, as shown in FIG. 24, the scan will change the colour dependency eligibility setting for the quad 402 "C" in its list entry 415 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 402 "C".

The scan will also accumulate the coverage for the third quad 402 "C" into its accumulated colour coverage (as the quad "C" is to perform colour updates). However, as the quad "C" is not indicated as performing depth updates, the coverage for the quad "C" will not be added to the accumulated depth coverage (that will remain as "zero" coverage for depth).

The scanner will then move on to the next entry 417 for the fourth quad 403 "D".

As shown in FIG. 24, the scan state 461 when beginning the scan for the entry for the fourth quad 403 "D" indicates that it is the entry 417 for quad "D" that is to be/being scanned, and that the previous list entry is the preceding quad 402 "C". The scan state 461 also indicates the coverage of quads "B" and "C", 401, 402 as the accumulated coverage for colour (and zero accumulated coverage for depth).

As the entry 417 for the fourth quad 403 "D" does not indicate that that entry is to be deleted, and as the entry 417 for the fourth quad 403 "D" indicates that that quad is to undergo colour processing, the scan will compare the indicated coverage in the entry 417 for the quad 403 "D" with the accumulated scan coverage for colour in the scan state 461.

This comparison will determine that the fourth quad 403 "D" does not overlap with the accumulated scan colour coverage (as the accumulated colour coverage is the coverage of the second quad 401 "B" and the third quad 402 "C" at this point in the scan), and so does not overlap with any preceding entry in the list, and so, as shown in FIG. 24, the scan will change the colour dependency eligibility setting for the quad 403 "D" in its list entry 417 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 403 "D".

The scan will also accumulate the coverage for the fourth quad 403 "D" into its accumulated colour coverage (as the quad "D" is to perform colour updates). However, as the quad "D" is not indicated as performing depth updates, the coverage for the quad "D" will not be added to the accumulated depth coverage (that will remain as "zero" coverage for depth).

The scanner will then move on to the next entry 418 for the fifth quad 404 "E".

As shown in FIG. 24, the scan state 462 when beginning the scan for the entry for the fifth quad 404 "E" indicates that it is the entry 418 for quad "E" that is to be/being scanned, and that the previous list entry is the preceding quad 403 "D". The scan state 462 also indicates the coverage of quads "B", "C" and "D", 401, 402, 403 as the accumulated coverage for colour (and zero accumulated coverage for depth).

As the entry 418 for the fifth quad 404 "E" does not indicate that that entry is to be deleted, and as the entry 418 for the fifth quad 404 "E" indicates that that quad is to undergo colour processing, the scan will compare the indicated coverage in the entry 418 for the quad 404 "E" with the accumulated scan coverage for colour in the scan state 462.

This comparison will determine that the fifth quad 404 "E" does not overlap with the accumulated scan colour coverage (as the accumulated colour coverage is the coverage of the second quad 401 "B", the third quad 402 "C" and the fourth quad 403 "D" at this point in the scan), and so does not overlap with any preceding entry in the list, and so, as shown in FIG. 24, the scan will change the colour dependency eligibility setting for the quad 404 "E" in its list entry 418 to indicate that it no longer has any dependency for colour updates on any earlier entry in the list (i.e. is now the oldest entry for colour updates for the position in question), and so is eligible (permitted) to perform colour updates. The scanner will also send an is "eligible (permitted) to perform colour updates" (an "is oldest") signal for the quad 404 E.

The scan will also accumulate the coverage for the fifth quad 404 "E" into its accumulated colour coverage (as the quad "E" is to perform colour updates). However, as the quad "E" is not indicated as performing depth updates, the coverage for the quad "E" will not be added to the accumulated depth coverage (that will remain as "zero" coverage for depth).

The scanner will then move on to the next entry 419 for the sixth quad 405 "F".

As shown in FIG. 24, the scan state 463 when beginning the scan for the entry for the sixth quad 405 "F" indicates that it is the entry 419 for quad "F" that is to be/being scanned, and that the previous list entry is the preceding quad 404 "E". The scan state 463 also indicates the coverage of quads "B", "C", "D", and "E", 401, 402, 403, 404, as the accumulated coverage for colour (and zero accumulated coverage for depth).

As the entry 419 for the sixth quad 405 "F" does not indicate that that entry is to be deleted, and as the entry 419 for the sixth quad 405 "F" indicates that that quad is to undergo colour processing, the scan will compare the indicated coverage in the entry 419 for the quad 405 "F" with the accumulated scan coverage for colour in the scan state 463.

This comparison will determine that the sixth quad 405 "F" does overlap with the accumulated scan colour coverage, and so does overlap with a preceding entry in the list. Thus, in this case, as shown in FIG. 24, the scan does not change the colour dependency eligibility setting for the quad 405 "F" in its list entry 419, but rather leaves that entry as indicating that the quad 405 "F" has a dependency for colour updates on an earlier entry in the list (i.e. is not eligible (permitted) to perform colour updates) (and does not send an is "eligible (permitted) to perform colour updates" (an "is oldest") signal for the quad 405 "F").

This completes this scan of the list.

Whilst depth (ZS) processing eligibility information is not discussed with respect to FIG. 24, it would be set in a similar manner as the colour eligibility information (by accumulating coverage for those entries indicated as 'should be considered for' for depth processing, and setting the eligibility indication for entries to be considered for depth processing to indicate that depth processing is eligible to be performed if the coverage of the entry in question does not overlap with the accumulated coverage for depth processing). For instance, in the example shown in FIG. 24, none of the entries are applicable to depth processing, and so no coverage will be accumulated into the depth accumulated coverage, and none of the entries will be marked as 'eligible' to perform depth processing.

Figure 26:
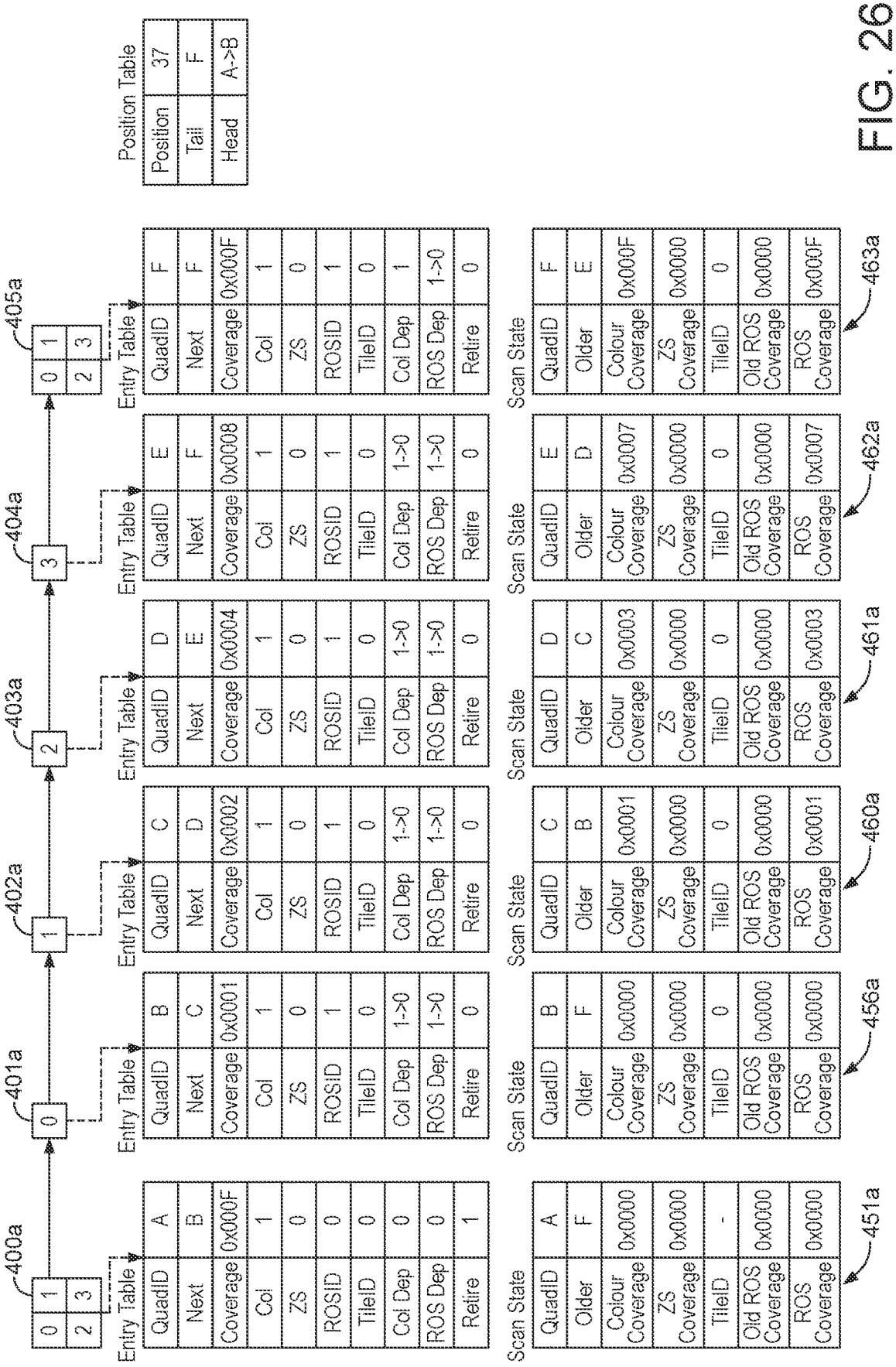
FIG. 26 illustrates the removal of an entry from a tile sub region fragment list in an embodiment of the technology described herein where a Raster Order State is provided for the list entries.

FIG. 26 is another example of a scanning process, showing in particular the updating of ROS dependency information for the list entries.

In the example shown in FIG. 26, similarly to FIG. 24, the lists entries representing quads 400b ("A"), 401b ("B"), 402b ("C"), 403b ("D"), 404b ("E"), 405b ("F") are considered in turn and the colour processing eligibility information ("Col. Dep") and depth processing eligibility information ("Z Dep") (not shown) are updated.

Regarding colour read-only processing eligibility information ("ROS dep"), when considering the first entry in the list (in respect of quad 400a ("A")), since the list entry is marked for deletion 450a, the coverage for the list entry is not accumulated into the current ROS accumulated coverage maintained by the scanner 451a (which accordingly remains empty (0x0000) as shown at 456a). The old ROS accumulated coverage also remains empty.

Similarly to FIG. 24, since the first list entry is marked for deletion, it is deleted from the list by the scanner, and the position table 411a for the list is updated to show the new head of the list (which is quad "B").

When considering the next entry 413a in the list (in respect of quad 401a ("B")), the ROS ID of this list entry is 1, and does not overlap with the old ROS coverage maintained by the scanner 456a (which is empty), and so the scanner determines that the entry is eligible to perform colour read operations (no ROS dependency exists), and updates the list entry 413a accordingly (to indicate that no ROS dependency exists). The scan state is then updated 460a to accumulate the coverage of list entry 413a into the current ROS accumulated coverage (which is tracking coverage for ROS ID 1), such that the current ROS coverage is 0x0001.

When considering the next entry 415a in the list (in respect of quad 402a ("C")), the ROS ID of this list entry is 1, and does not overlap with the old ROS coverage maintained by the scanner 460a, and so the scanner determines that entry is eligible to perform colour read operations (no ROS dependency exists) and updates the list entry 415a accordingly (to indicate that no ROS dependency exists). The scan state is then updated 461a to accumulate the coverage of list entry 415a into the current ROS accumulated coverage (which is tracking coverage for ROS ID 1), such that the current ROS coverage is 0x0003.

Similarly, list entries 417a and 418a have the same ROS ID of 1 and do not overlap the old accumulated ROS coverage, and so the scanner determines that these entries are eligible to perform colour read operations (no ROS dependency exists for these list entries), and the scan state is updated to accumulate the coverage of these list entries into the current ROS accumulated coverage.

When considering the final entry 419a in the list (in respect of quad 405a ("F")), the ROS ID of this list entry is 1. This entry does not overlap with the old ROS accumulated coverage maintained by the scanner 463a, and so the scanner determines that the entry is eligible to perform colour read operations (no ROS dependency exists), and updates the list entry 415a accordingly (to indicate that no ROS dependency exists). The fact that the entry overlaps with the current ROS accumulated coverage indicated in scan state 463a does not affect the eligibility to perform colour read operations (and indeed, the coverage of the entry is only compared against the old ROS accumulated coverage, and not the current ROS accumulated coverage for the purpose of determining eligibility).

In an alternative scenario, if the final entry 419a in the list had a ROS ID of 2 instead, in view of a new ROS ID being encountered by the scanner, the current ROS accumulated coverage maintained by the scanner 463a (which is currently fully covered, being 0X000F) would be added to (OR'd into) the old ROS accumulated coverage so that the old ROS accumulated coverage would become 0x000F. Then, since the list entry would overlap with the old ROS accumulated coverage, and so a ROS dependency would exist, the list entry 419a would be updated to indicate that a ROS dependency exists.

A number of additions, alterations and modifications to the described embodiments of the technology described herein would be possible, if desired.

For example, although the above embodiments have simply described adding a new group of fragments (a new thread quad) as a new entry at the end of an existing tile sub-region list (or starting a new tile sub-region list for the new entry), the Applicant has recognised that in certain circumstances it may be possible to merge a new group of fragments (a new thread quad) into an existing entry in a list, and that doing so would reduce the number of entries in a list (thereby, potentially, leading to improved efficiency in the handling and using of the lists). Thus in an embodiment, when a new group of fragments/corresponding execution threads falls to be added to an existing sub-region list, it is first determined whether the new group of fragments/threads can be added to (merged into) the existing tail entry of the list.

This is in an embodiment based on whether the new set of execution threads (for the new group of fragments) belong to the same thread group (warp) as the execution threads represented by the existing entry at the tail of the list. If so, then the new group of fragments/execution threads can be, and is in an embodiment, merged into the existing list entry (but if not, then a new list entry is created for the new group of fragments/execution threads).

The Applicant has recognised in this regard that fragment groups/execution threads which are to be processed within a same thread group (warp), should not (will not) not overlap one another and so will not be dependent on one another, and can therefore be tracked using (merged into) the same list entry.

When merging into an existing entry, the coverage mask for the existing entry is updated to additionally represent the coverage of the new group of fragments/threads that has been merged into the existing entry (as discussed with regards to FIG. 7 for example).

For the merged entry, the information indicating whether the entry should be considered for depth and colour processing operations is also updated to reflect whether the processing operation in question is to be considered for the new fragment group/threads.

When merging into a non-head merged entry, the information indicating whether processing is eligible to be performed for particular processing operations (e.g. depth and colour processing operations) may already be set to indicate that a (potential) dependency issue exists (as discussed above) and so, in that case, when adding (merging) a new group of fragments/threads into the list entry, the information indicating whether processing is eligible to be performed for particular processing operations will remain indicating that a dependency potentially exists (and the list will retain its indication of needing scanning).

Alternatively, if the non-head merged entry does not already indicate that a (potential) dependency issue exists, then when adding (merging) a new group of fragments/threads into the list entry, since a dependency may potentially arise due to the newly represented (merged) group of fragments/threads, the information indicating whether processing is eligible to be performed for depth and colour processing is set to indicate that a (potential) dependency issue exists. As discussed above, this is in an embodiment done without actually determining whether a dependency actually exists. The list is also indicated as needing a background scan.

However, similarly to the above discussion, if the new fragments/threads are to be merged into a head of the list, then no dependency issue will exist, and so the eligibility information may be set accordingly (to indicate or remain indicating that no dependency exists).

To help identify whether or not an entry contains (represents) multiple (merged) fragment groups/threads, an indication of the "merged" fragment groups/thread (quads) may also or instead be maintained for the "merged" list entry. This indication may comprise a mask (e.g. a bitmap) identifying the threads (quads) within a thread group (warp) which are represented by (merged into) the list entry (wherein each thread, or in an embodiment each quad, is represented by a different data element (bit) in the mask (bitmap), which is accordingly set (e.g. to 1) when that thread (quad) is represented by the list entry).

When a fragment quad represented by a list entry has finished its processing (or is otherwise no longer required to perform processing) and is to be retired, in the case that the list entry represents (can represent) a single fragment quad only, the list entry will be marked for deletion (indicated as being able to be deleted) (e.g. by setting the indication 1710 shown in FIG. 17 appropriately).

Alternatively, in the case that a list entry represents (can represent) plural fragment quads, then in an embodiment the list entry is marked for deletion (e.g. by setting indication 1710) only when all fragments/thread indicated as being represented by the merged entry have completed their processing.

Similarly although the present embodiments has been described above with particular reference to the processing in respect of a single tile of a render output being generated, it will be appreciated that the operation in the manner of the present embodiments will be repeated for each tile of a render output that is being generated (where appropriate).

In this case, a set of tile sub-region fragment lists could be maintained separately for each tile that is to be generated (and in one embodiment that is what is done).

However, in other embodiments, it would be possible simply to have single set of tile sub-region fragment lists, with the fragments/execution threads for different tiles simply being added to the existing sub-region lists as and when new tiles are started and new fragments/execution threads fall to be processed for new tiles.

In this case, a single set of tile sub-region fragment lists will be used to track and manage dependencies for plural successive tiles to be rendered, for example. This may be particularly useful where, for example, the graphics processor is operable to begin processing for a (new) tile to be rendered before rendering is complete for a previous tile. Accordingly, in this case each list can contain list entries relating to a same sub-region (area) of one or more different (e.g. successive) tiles.

In this case, as shown in FIG. 17 for example, each entry in a tile sub-region fragment list in an embodiment also identifies 176 the tile that the group of fragments/execution threads in question belong to. This can then be, and is in an embodiment, used to determine whether a new entry, for example, belongs to the same tile as a preceding entry in a tile sub-region fragment list, and whether and when the tile "changes" when walking (traversing) a list.

In this case therefore when a new group of fragments/corresponding execution threads falls to be added to an existing sub-region list, it will first be determined whether the new group of fragments belongs to the same tile as the existing tail entry of the list. If so, then the new group of fragments/execution threads can be simply added in the manner discussed above (with the appropriate tile identifier included in the entry).

On the other hand if it is determined that the new group of fragments/threads to be added to the list relates to a new (different) tile (compared to the existing tail entry of the list), then the new list entry which is added will be treated as if it is a "first" entry in the list (since it is, in effect, the first entry for its tile). In particular, the information for the new list entry (for the new tile) will be set as discussed above when starting a new list.

Thus, in particular, since a new entry for the new tile will not depend on any previous entries in the list (since processing of different tiles is not dependent on one another), the information indicating whether processing is eligible to be performed for the new entry will be set to 'eligible'. Adding a new entry for a new tile will also not require a background scan to be pushed for the list.

Correspondingly, when a tile sub-region list of this form is being scanned, the scanner will additionally keep track of which tile respective entries in a list that it is scanning relate to, and in particular determine whether the entry that is currently being considered (scanned) relates to the same tile as the previous entry or not.

In particular, if the next entry in the list is for a different tile, then the accumulated coverage mask for the scan will be cleared and the new coverage mask started for the new tile. (On the other hand, if the next entry relates to the same tile as the previous tile, then the accumulated coverage masks will be retained for use when considering that next entry.)

Other variations, additions and modifications would also or instead be possible, if desired.

For example, in addition to the information associated with the list entries and with the list discussed above, additional information may be stored and used for the purposes of the dependency tracking and managing the dependency lists.

For example, the total number of entries in a list may be tracked (e.g. using a counter which is incremented each time a new entry is added to a list and decremented when an entry is removed from the list).

Additionally, a total number of fragment groups which have outstanding (desired) processing (which is not yet completed) and for which the processing is not yet eligible to be performed (dependency not cleared) may be tracked (e.g. using a counter). A separate counter may be maintained for outstanding depth processing and for outstanding colour processing.

It can be seen from the above that the technology described herein, in embodiments, provides more efficient mechanisms for handling and enforcing fragment processing order dependencies when performing tile-based rendering. This is achieved, in embodiments, by maintaining for respective sub-regions of tiles to be rendered, lists indicative of fragments to be processed for the respective sub-regions, with each list entry including, inter alia, at least an indication of the coverage within the tile sub-region of the group of fragments that the list entry represents, and an indication of whether the group of fragments that the list entry represents is eligible to undergo particular processing operations. The coverage information and eligibility information for the list entries is then used to control the processing of fragments for sub-regions of a tile, in such a way as to ensure that processing order dependencies are enforced and met.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when rendering an output using tile based rendering, in which a plurality of tiles of a render output being generated are rendered separately, and the rendered tiles are combined to form the render output, the method comprising:
   for a tile of the render output being generated:
      maintaining for each of plural sub-regions of the tile, each sub-region of the tile relating to plural sampling positions of the tile being generated, a list indicative of fragments that are to be processed for the sub-region of the tile for generating the render output, each entry in the list representing a group of one or more fragments;
   wherein each entry in the list for a sub-region has associated with it:

information indicating which part of the sub-region the one or more fragments that the entry represents apply to; and information indicating whether one or more processing operations are eligible to be performed for the one or more fragments that the entry represents;

the method further comprising:

controlling the processing of fragments to be processed for a sub-region of the tile based on the information in the list indicative of fragments that are to be processed for the sub-region of the tile indicating which part of the sub-region fragments that entries in the list represent apply to and the information indicating whether one or more processing operations are eligible to be performed for fragments that entries in the list represent;

wherein the information indicating whether one or more processing operations are eligible to be performed for the one or more fragments that the list entry represents comprises plural indications of fragment processing eligibility for the list entry, each fragment processing eligibility indication relating to a different set of one or more processing operations;

wherein the plural fragment processing eligibility indications for the list entry comprise:

a first eligibility indication indicating whether operations that relate to updating a colour value for one or more sampling positions are eligible to be performed for the one or more fragments that the list entry represents; and a second different eligibility indication indicating whether operations that relate to determining or updating a depth value for one or more sampling positions are eligible to be performed for the one or more fragments that the list entry represents.

2. The method of claim 1, wherein each group of fragments represented by a list entry comprises at least one 2×2 quad of fragments.

3. The method of claim 1, wherein when an entry in the list represents plural fragments, the plural fragments have non-overlapping coverage of the sub-region; and when an entry in the list represents plural fragments, the first eligibility indication and the second eligibility indication for the list entry apply to all of the plural fragments represented by the list entry.

4. The method of claim 1, wherein each list maintained for a sub-region of the tile is a singly-linked list, for which new entries are added at the tail of list.

5. The method of claim 1, wherein the plural fragment processing eligibility indications for the list entry comprise:

a further eligibility indication indicating whether operations that relate to reading a colour value for one or more sampling positions are eligible to be performed for the one or more fragments that the list entry represents.

6. The method of claim 1, wherein controlling the processing of fragments to be processed for a sub-region of the tile based on the information in the list indicative of fragments for the sub-region of the tile indicating which part of the sub-region fragments that entries in the list represent apply to and the information indicating whether one or more processing operations are eligible to be performed for fragments that entries in the list represent comprises:

using the information associated with the list entries for the tile sub-region indicating which part of the tile sub-region the groups of fragments for respective list entries apply to, to set the eligibility information for list entries for the tile sub-region; and permitting or preventing performing of one or more processing operations for a group of one or more fragments represented by a list entry based on the eligibility information associated with the list entry in question.

7. The method of claim 1, wherein each entry in the list for a sub-region also indicates whether the entry is to be considered for the respective operations for which eligibility information is provided.

8. The method of claim 1, wherein:

the maintaining for each of plural sub-regions of the tile, each sub-region of the tile relating to plural sampling positions of the tile being generated, a list indicative of fragments that are to be processed for the sub-region of the tile for generating the render output, each entry in the list representing a group of one or more fragments;

wherein each entry in the list for a sub-region has associated with it:

information indicating which part of the sub-region the one or more fragments that the entry represents apply to; and information indicating whether one or more processing operations are eligible to be performed for the one or more fragments that the entry represents;

comprises:

maintaining for each of plural sub-regions of the tile, each sub-region of the tile relating to plural sampling positions of the tile being generated, a list of execution threads that are to be processed for the sub-region of the tile for generating rendered output data for fragments that are to be processed for the sub-region of the tile, each entry in the list representing a set of one or more execution threads;

wherein each entry in the list for a sub-region has associated with it:

information indicating which part of the sub-region the one or more execution threads that the entry represents apply to; and information indicating whether one or more processing operations are eligible to be performed for the one or more execution threads that the entry represents;

and the controlling the processing of fragments to be processed for a sub-region of the tile based on the information in the list indicative of fragments for the sub-region of the tile indicating which part of the sub-region fragments that entries in the list represent apply to and the information indicating whether one or more processing operations are eligible to be performed for fragments that entries in the list represent comprises:

controlling the processing of execution threads to be processed for a sub-region of the tile based on the information in the list of execution threads for the sub-region of the tile indicating which part of the sub-region execution threads that entries in the list represent apply to and the information indicating whether one or more processing operations are eligible to be performed for execution threads that entries in the list represent.

9. The method of claim 1, wherein the controlling the processing of fragments to be processed for a sub-region of the tile based on the information in the list indicative of fragments for the sub-region of the tile indicating which part of the sub-region fragments that entries in the list represent apply to and the information indicating whether one or more processing operations are eligible to be performed for fragments that entries in the list represent comprises:
issuing one or more execution threads to be used for executing processing operations for the one or more fragments respectively that a list entry represents; and
stalling execution of the one or more execution threads when the list entry indicates that one or more processing operations are not eligible to be performed.

10. The method of claim 1, wherein the controlling the processing of fragments to be processed for a sub-region of the tile based on the information in the list indicative of fragments for the sub-region of the tile indicating which part of the sub-region fragments that entries in the list represent apply to and the information indicating whether one or more processing operations are eligible to be performed for fragments that entries in the list represent comprises:
when one or more processing operations are indicated as being eligible to be performed for the group of one of more fragments represented by a list entry, issuing one or more execution threads to be used for executing the one or more processing operations indicated as being eligible to be performed for the group of one or more fragments represented by the entry.

11. The method of claim 1, wherein when an entry in the list represents plural fragments, the plural fragments have non-overlapping coverage of the sub-region; and/or
wherein when an entry in the list represents plural fragments, the first eligibility indication and the second eligibility indication for the list entry apply to all of the plural fragments represented by the list entry.

12. A graphics processor configured to perform tile-based rendering, in which a plurality of tiles of a render output being generated are rendered separately, and the rendered tiles are combined to form the render output, the graphics processor comprising:
a fragment list managing circuit configured to:
maintain for each of plural sub-regions of a tile of a render output being generated, each sub-region of the tile relating to plural sampling positions of the tile being generated, a list indicative of fragments that are to be processed for the sub-region of the tile for generating the render output, each entry in the list representing a group of one or more fragments;
wherein each entry in the list for a sub-region has associated with it:
information indicating which part of the sub-region the one or more fragments that the entry represents apply to; and
information indicating whether one or more processing operations are eligible to be performed for the one or more fragments that the entry represents, comprising plural indications of fragment processing eligibility for the list entry, each fragment processing eligibility indication relating to a different set of one or more processing operations;
wherein the plural fragment processing eligibility indications for the list entry comprise:
a first eligibility indication indicating whether operations that relate to updating a colour value for one or more sampling positions are eligible to be performed for the one or more fragments that the list entry represents; and
a second eligibility indication indicating whether operations that relate to determining or updating a depth value for one or more sampling positions are eligible to be performed for the one or more fragments that the list entry represents;
the graphics processor further comprising:
a control circuit configured to control the processing of fragments to be processed for a sub-region of a tile;
wherein the fragment list managing circuit and the control circuit are configured to control the processing of fragments to be processed for a sub-region of a tile based on the information in a list indicative of fragments for the sub-region of the tile indicating which part of the sub-region fragments that entries in the list represent apply to and the information indicating whether one or more processing operations are eligible to be performed for fragments that entries in the list represent.

13. The graphics processor of claim 12, wherein the fragment list managing circuit and the control circuit are configured to control the processing of fragments to be processed for a sub-region of a tile based on the information in a list indicative of fragments for the sub-region of the tile indicating which part of the sub-region fragments that entries in the list represent apply to and the information indicating whether one or more processing operations are eligible to be performed for fragments that entries in the list represent by:
using the information associated with list entries for a tile sub-region indicating which part of the tile sub-region groups of fragments for respective list entries apply to, to set the eligibility information for list entries for the tile sub-region; and
permitting or preventing performing of one or more processing operations for a group of one or more fragments represented by a list entry based on the eligibility information associated with the list entry in question.

14. The graphics processor of claim 12, wherein:
the fragment dependency list managing circuit is configured to:
maintain for each of plural sub-regions of a tile of a render output being generated, each sub-region of the tile relating to plural sampling positions of the tile being generated, a list of execution threads that are to be processed for the sub-region of the tile for generating rendered output data for fragments that are to be processed for the sub region of the tile, each entry in the list representing a set of one or more execution threads;
wherein each entry in the list for a sub-region has associated with it:
information indicating which part of the sub-region the one or more execution threads that the entry represents apply to; and
information indicating whether one or more processing operations are eligible to be performed for the one or more execution threads that the entry represents;
the control circuit is configured to control the processing of execution threads to be processed for a sub-region of a tile;
and
the fragment list managing circuit and the control circuit are configured to control the processing of execution threads to be processed for a sub-region of a tile based on the information in a list of execution threads for the sub-region of the tile indicating which part of the sub-region execution threads that entries in the list represent apply to and the information indicating whether one or more processing operations are eligible to be performed for execution threads that entries in the list represent.

15. The graphics processor of claim 12, wherein the control circuit is configured to:
   issue one or more execution threads to be used for executing processing operations for the one or more fragments respectively that a list entry represents; and
   stall execution of the one or more execution threads when the list entry indicates that one or more processing operations are not eligible to be performed.

16. The graphics processor of claim 12, wherein the control circuit is configured to:
   when one or more processing operations are indicated as being eligible to be performed for the group of one of more fragments represented by a list entry, issue one or more execution threads to be used for executing the one or more processing operations indicated as being eligible to be performed for the group of one or more fragments represented by the entry.

17. A non-transitory computer readable storage medium storing computer software code which when executing on a processor performs a method of operating a graphics processor when rendering an output using tile based rendering, in which a plurality of tiles of a render output being generated are rendered separately, and the rendered tiles are combined to form the render output, the method comprising:
   for a tile of a render output being generated:
      maintaining for each of plural sub-regions of the tile, each sub-region of the tile relating to plural sampling positions of the tile being generated, a list indicative of fragments that are to be processed for the sub-region of the tile for generating the render output, each entry in the list representing a group of one or more fragments;
      wherein each entry in the list for a sub-region has associated with it:
         information indicating which part of the sub-region the one or more fragments that the entry represents apply to; and
         information indicating whether one or more processing operations are eligible to be performed for the one or more fragments that the entry represents;
   the method further comprising:
   controlling the processing of fragments to be processed for a sub-region of the tile based on the information in the list indicative of fragments that are to be processed for the sub-region of the tile indicating which part of the sub-region fragments that entries in the list represent apply to and the information indicating whether one or more processing operations are eligible to be performed for fragments that entries in the list represent;
   wherein the information indicating whether one or more processing operations are eligible to be performed for the one or more fragments that the list entry represents comprises plural indications of fragment processing eligibility for the list entry, each fragment processing eligibility indication relating to a different set of one or more processing operations;
   wherein the plural fragment processing eligibility indications for the list entry comprise:
   a first eligibility indication indicating whether operations that relate to updating a colour value for one or more sampling positions are eligible to be performed for the one or more fragments that the list entry represents; and
   a second eligibility indication indicating whether operations that relate to determining or updating a depth value for one or more sampling positions are eligible to be performed for the one or more fragments that the list entry represents.

\* \* \* \* \*